US012641049B2

(12) United States Patent
Kinsella et al.

(10) Patent No.: US 12,641,049 B2
(45) Date of Patent: May 26, 2026

(54) AI AGENT INTERFACES AND CONTROLS FOR EMAIL AND OTHER ELECTRONIC COMMUNICATIONS

(71) Applicant: Microsoft Technology Licensing, LLC, Redmond, WA (US)

(72) Inventors: Sheila Rosari Kinsella, Sligo (IE); Evgeny Ivanov, Dublin (IE); Gerard Murphy, Wicklow (IE)

(73) Assignee: Microsoft Technology Licensing, LLC, Redmond, WA (US)

( * ) Notice: Subject to any disclaimer, the term of this patent is extended or adjusted under 35 U.S.C. 154(b) by 36 days.

(21) Appl. No.: 18/827,594

(22) Filed: Sep. 6, 2024

(65) Prior Publication Data

US 2025/0358255 A1      Nov. 20, 2025

Related U.S. Application Data

(60) Provisional application No. 63/647,790, filed on May 15, 2024, provisional application No. 63/647,866, (Continued)

(51) Int. Cl.
| | |
|---|---|
| *H04L 51/42* | (2022.01) |
| *G06F 3/0481* | (2022.01) |
| *G06F 3/0482* | (2013.01) |
| *G06F 3/0484* | (2022.01) |
| *G06F 3/04847* | (2022.01) |

(Continued)

(52) U.S. Cl.
CPC ............ *H04L 51/42* (2022.05); *G06F 3/0481* (2013.01); *G06F 3/0482* (2013.01); *G06F* *3/0484* (2013.01); *G06F 3/04847* (2013.01); *G06N 5/043* (2013.01); *G06Q 30/015* (2023.01)

(58) Field of Classification Search
CPC ....... H04L 51/42; H04L 51/02; G06F 3/0481; G06F 3/0482; G06F 3/0484; G06F 3/04847; G06N 5/043; G06N 3/006; G06N 20/00; G06Q 30/015
See application file for complete search history.

(56) References Cited

U.S. PATENT DOCUMENTS

| | | | |
|---|---|---|---|
| 12,456,020 B1 * | 10/2025 | Mishra | .................. G06F 40/40 |
| 2006/0074833 A1 | 4/2006 | Gardner | |

(Continued)

OTHER PUBLICATIONS

U.S. Appl. No. 63/647,892, filed May 15, 2024.

(Continued)

*Primary Examiner* — El Hadji M Sall
(74) *Attorney, Agent, or Firm* — Workman Nydegger

(57) ABSTRACT

Systems and methods are provided for managing AI (Artificial Intelligence) agents interactions with electronic communications that are displayed at an electronic communications interface, such as an email interface. The systems parse electronic communications to determine whether they correspond to new or existing requests and actions to be performed when responding to the request(s). The systems also generate notifications identifying the set of actions with visual identifiers that visually distinguish the set of actions based on whether they have been completed or not and whether they need authorization to be completed. The systems also display selectable controls for controlling how the AI agent performs the actions.

20 Claims, 35 Drawing Sheets

Related U.S. Application Data filed on May 15, 2024, provisional application No. 63/647,884, filed on May 15, 2024, provisional application No. 63/647,880, filed on May 15, 2024, provisional application No. 63/647,875, filed on May 15, 2024, provisional application No. 63/647,892, filed on May 15, 2024.

(51) Int. Cl.
G06N 5/043 (2023.01)
G06Q 30/015 (2023.01)

(56) References Cited

U.S. PATENT DOCUMENTS

| | | | |
|---|---|---|---|
| 2019/0370600 A1 | 12/2019 | Deng | |
| 2021/0288927 A1* | 9/2021 | Wang | G06K 7/1417 |
| 2021/0304000 A1 | 9/2021 | Rasoolinejad | |
| 2021/0357695 A1 | 11/2021 | Kuruma | |
| 2024/0177119 A1* | 5/2024 | Bhatia | G06F 16/90332 |
| 2024/0303473 A1* | 9/2024 | Cheng | G06N 3/045 |

| | | | |
|---|---|---|---|
| 2025/0053899 A1* | 2/2025 | Hughes | G06Q 10/06393 |
| 2025/0245371 A1* | 7/2025 | Zalasky | G06F 21/6227 |
| 2025/0355545 A1 | 11/2025 | Guo | |
| 2025/0355551 A1 | 11/2025 | Volkmann | |
| 2025/0355552 A1 | 11/2025 | Kovar | |
| 2025/0355697 A1 | 11/2025 | Stach | |
| 2025/0355847 A1 | 11/2025 | Kozaris | |

OTHER PUBLICATIONS

U.S. Appl. No. 63/647,884, filed May 15, 2024.
U.S. Appl. No. 63/647,880, filed May 15, 2024.
Partial European search report received in European Application No. 25175059.2, (MS# 501767-EP01), mailed on Oct. 8, 2025, 13 pages.
U.S. Appl. No. 63/647,875, filed May 15, 2024.
U.S. Appl. No. 63/647,866, filed May 15, 2024.
U.S. Appl. No. 63/647,790, filed May 15, 2024.
Extended European search report received in European Application No. 25175059.2, mailed on Jan. 8, 2026, 11 pages.
Non-Final Office Action mailed on Dec. 17, 2025, in U.S. Appl. No. 18/827,600, 27 pages.

* cited by examiner

FIG. 9

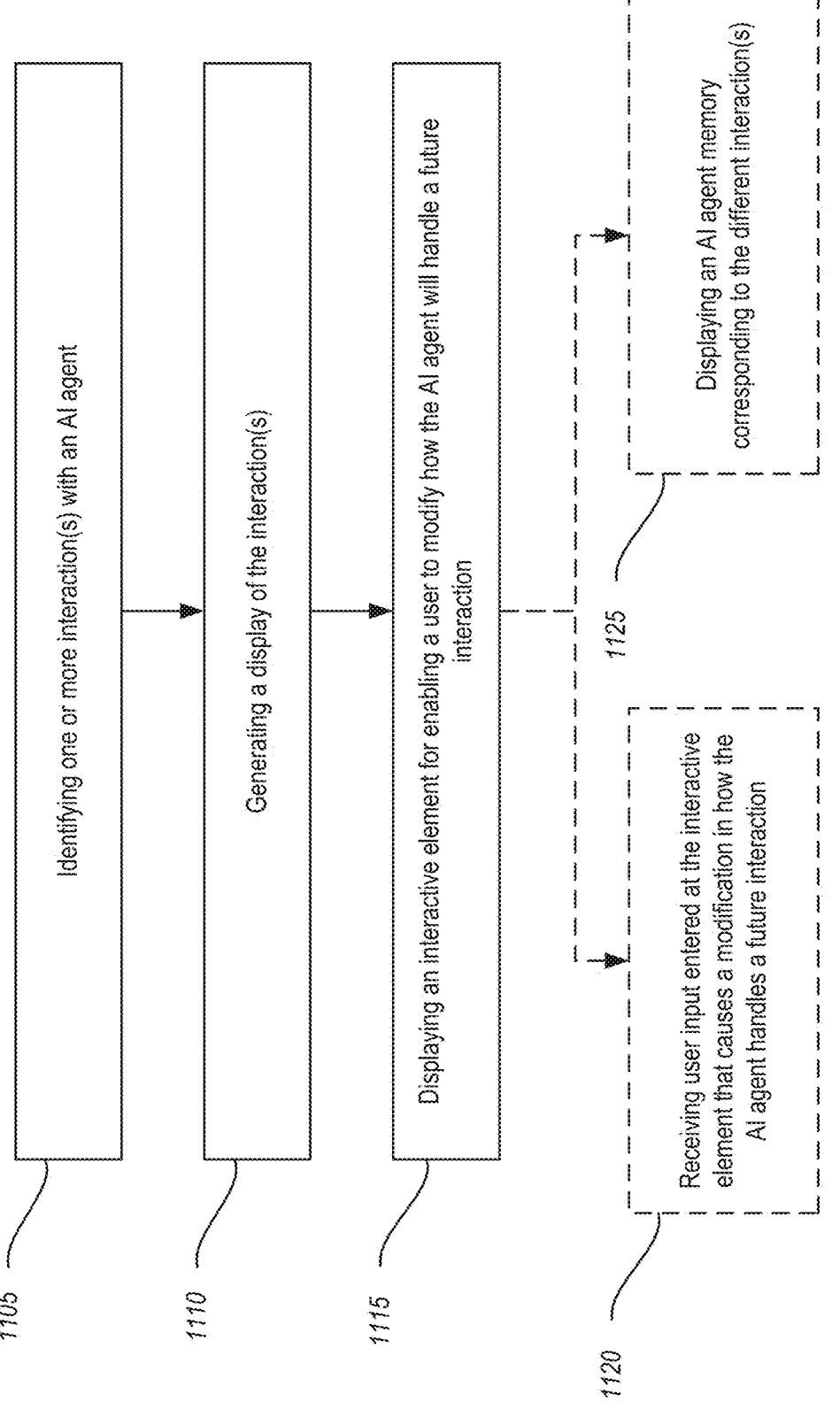

1100

1105 — Identifying one or more interaction(s) with an AI agent

1110 — Generating a display of the interaction(s)

1115 — Displaying an interactive element for enabling a user to modify how the AI agent will handle a future interaction 1120 — Receiving user input entered at the interactive element that causes a modification in how the AI agent handles a future interaction 1125 — Displaying an AI agent memory corresponding to the different interaction(s)

FIG. 11

_1200_
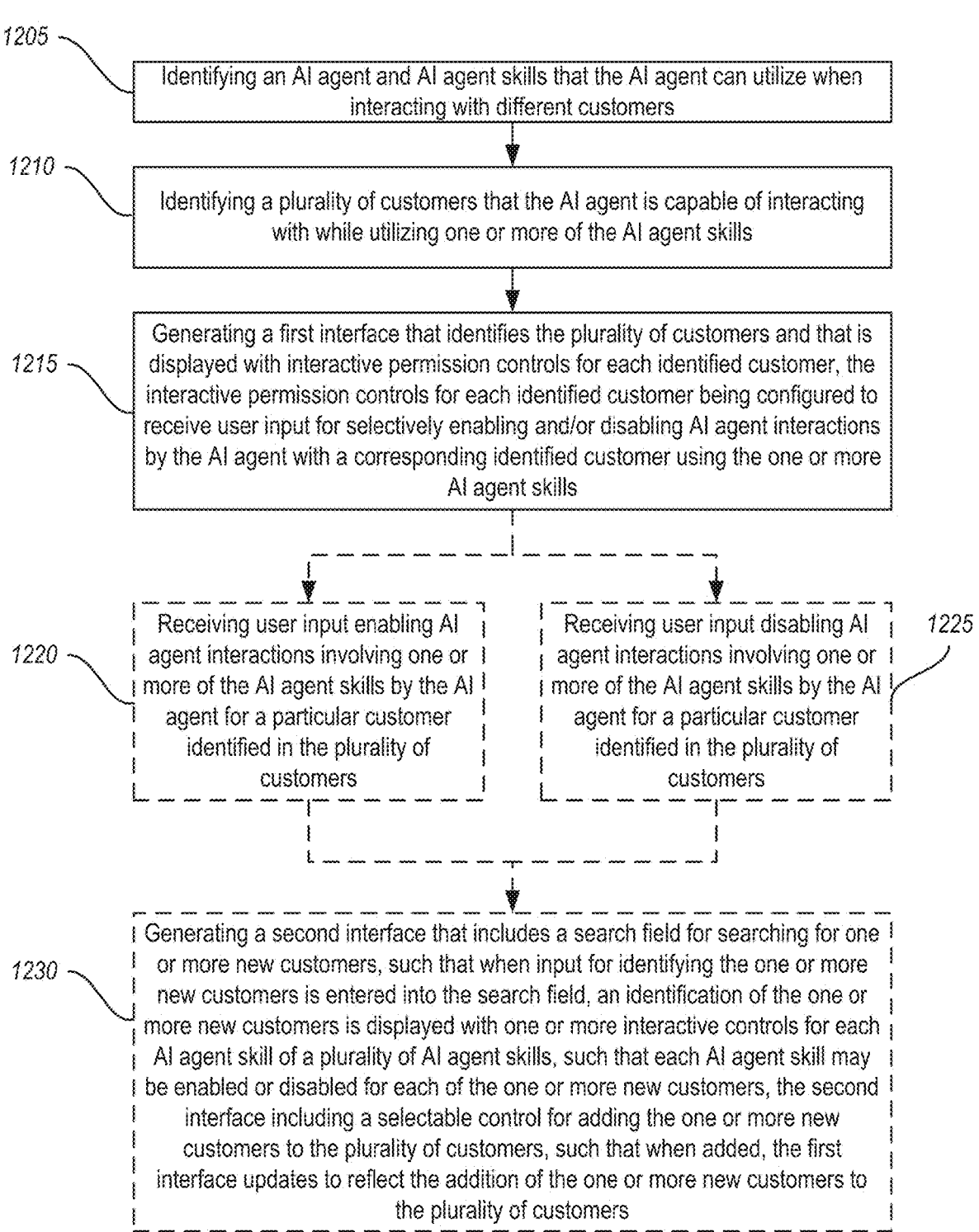
_FIG. 12_

1400

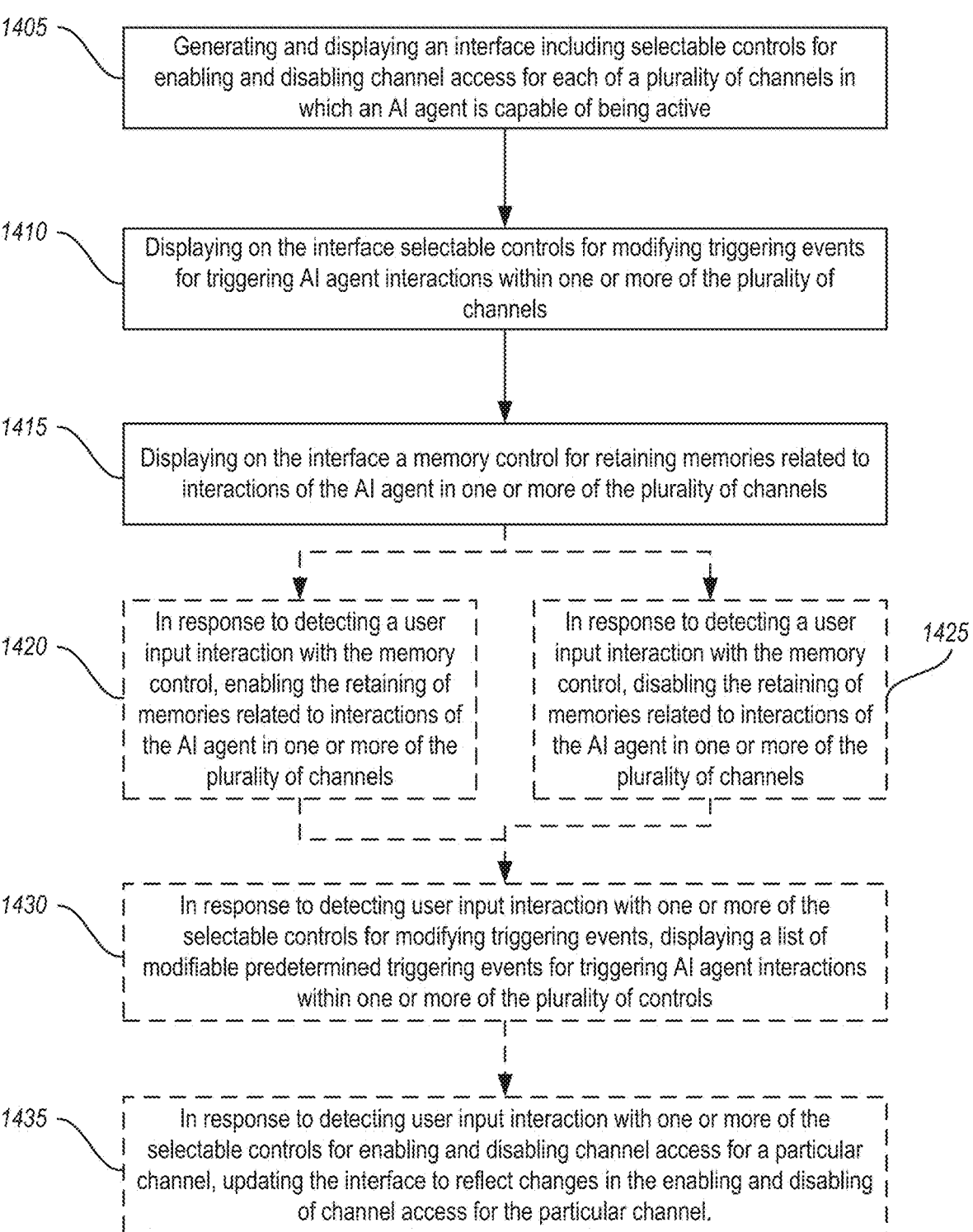

1405 — Generating and displaying an interface including selectable controls for enabling and disabling channel access for each of a plurality of channels in which an AI agent is capable of being active 1410 — Displaying on the interface selectable controls for modifying triggering events for triggering AI agent interactions within one or more of the plurality of channels 1415 — Displaying on the interface a memory control for retaining memories related to interactions of the AI agent in one or more of the plurality of channels 1420 — In response to detecting a user input interaction with the memory control, enabling the retaining of memories related to interactions of the AI agent in one or more of the plurality of channels 1425 — In response to detecting a user input interaction with the memory control, disabling the retaining of memories related to interactions of the AI agent in one or more of the plurality of channels 1430 — In response to detecting user input interaction with one or more of the selectable controls for modifying triggering events, displaying a list of modifiable predetermined triggering events for triggering AI agent interactions within one or more of the plurality of controls 1435 — In response to detecting user input interaction with one or more of the selectable controls for enabling and disabling channel access for a particular channel, updating the interface to reflect changes in the enabling and disabling of channel access for the particular channel.

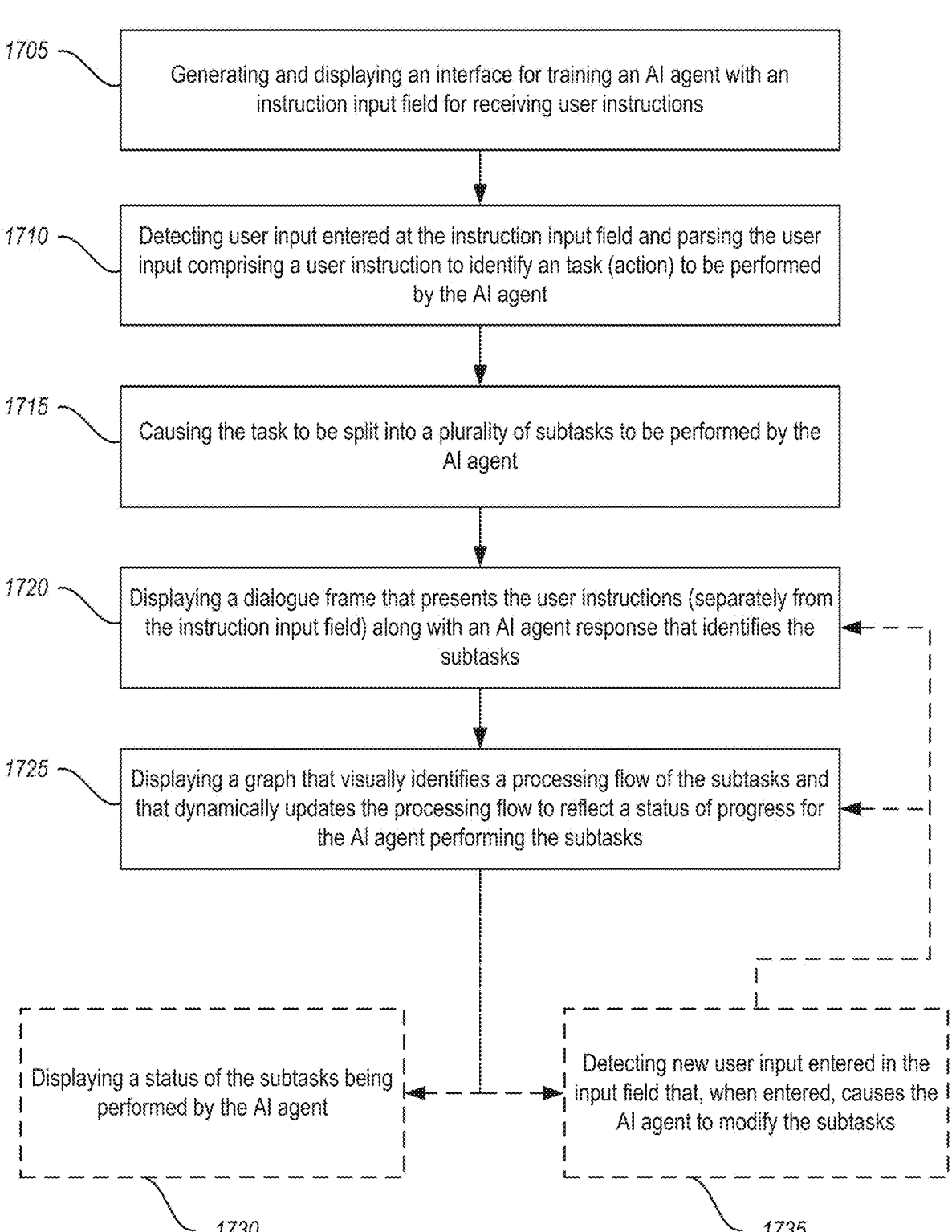

1705 — Generating and displaying an interface for training an AI agent with an instruction input field for receiving user instructions 1710 — Detecting user input entered at the instruction input field and parsing the user input comprising a user instruction to identify an task (action) to be performed by the AI agent 1715 — Causing the task to be split into a plurality of subtasks to be performed by the AI agent 1720 — Displaying a dialogue frame that presents the user instructions (separately from the instruction input field) along with an AI agent response that identifies the subtasks 1725 — Displaying a graph that visually identifies a processing flow of the subtasks and that dynamically updates the processing flow to reflect a status of progress for the AI agent performing the subtasks Displaying a status of the subtasks being performed by the AI agent
1730

Detecting new user input entered in the input field that, when entered, causes the AI agent to modify the subtasks
1735

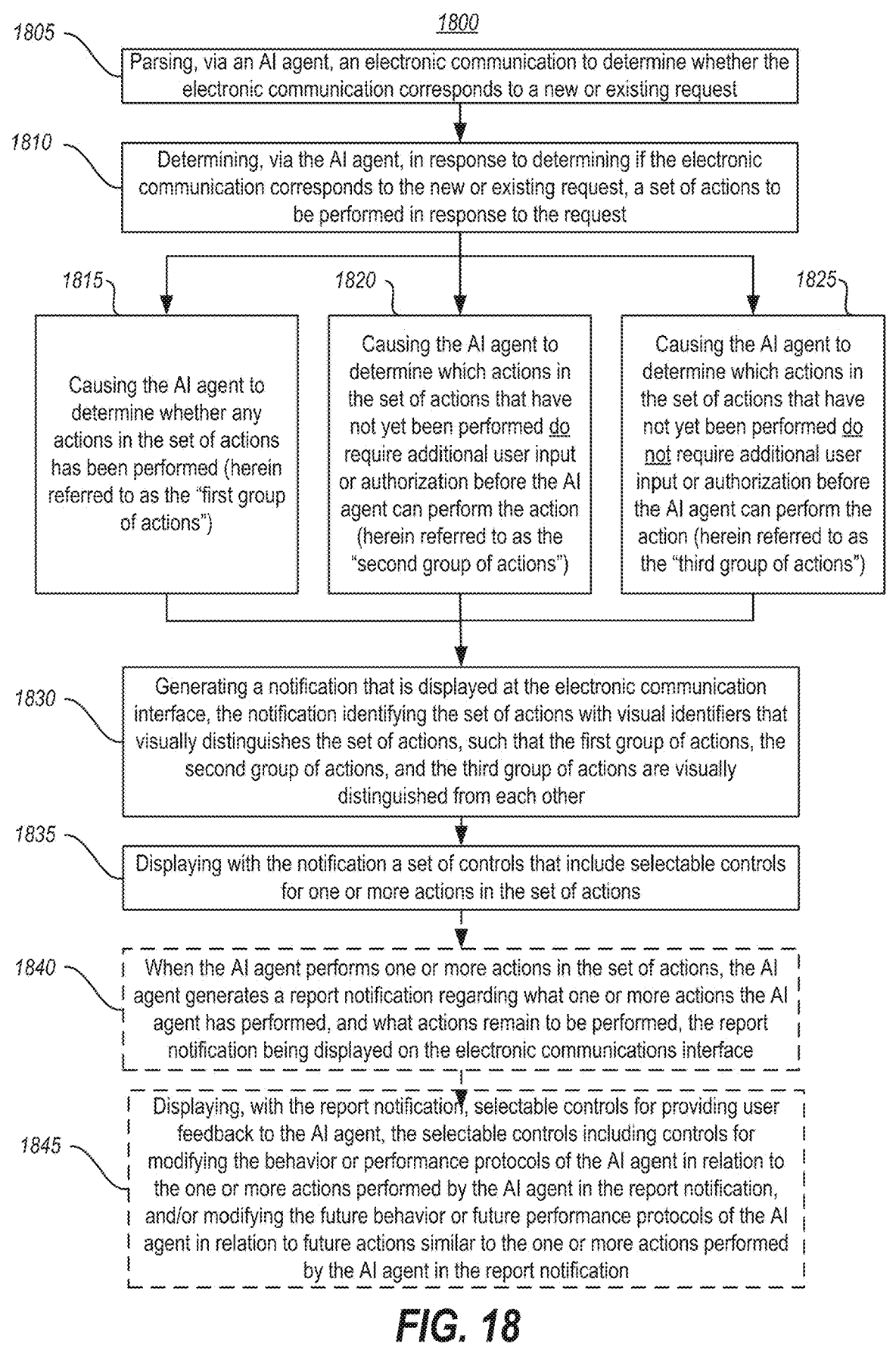

1805 — Parsing, via an AI agent, an electronic communication to determine whether the electronic communication corresponds to a new or existing request 1810 — Determining, via the AI agent, in response to determining if the electronic communication corresponds to the new or existing request, a set of actions to be performed in response to the request 1815 — Causing the AI agent to determine whether any actions in the set of actions has been performed (herein referred to as the "first group of actions")

1820 — Causing the AI agent to determine which actions in the set of actions that have not yet been performed do require additional user input or authorization before the AI agent can perform the action (herein referred to as the "second group of actions")

1825 — Causing the AI agent to determine which actions in the set of actions that have not yet been performed do not require additional user input or authorization before the AI agent can perform the action (herein referred to as the "third group of actions")

1830 — Generating a notification that is displayed at the electronic communication interface, the notification identifying the set of actions with visual identifiers that visually distinguishes the set of actions, such that the first group of actions, the second group of actions, and the third group of actions are visually distinguished from each other 1835 — Displaying with the notification a set of controls that include selectable controls for one or more actions in the set of actions 1840 — When the AI agent performs one or more actions in the set of actions, the AI agent generates a report notification regarding what one or more actions the AI agent has performed, and what actions remain to be performed, the report notification being displayed on the electronic communications interface 1845 — Displaying, with the report notification, selectable controls for providing user feedback to the AI agent, the selectable controls including controls for modifying the behavior or performance protocols of the AI agent in relation to the one or more actions performed by the AI agent in the report notification, and/or modifying the future behavior or future performance protocols of the AI agent in relation to future actions similar to the one or more actions performed by the AI agent in the report notification

*FIG. 18*

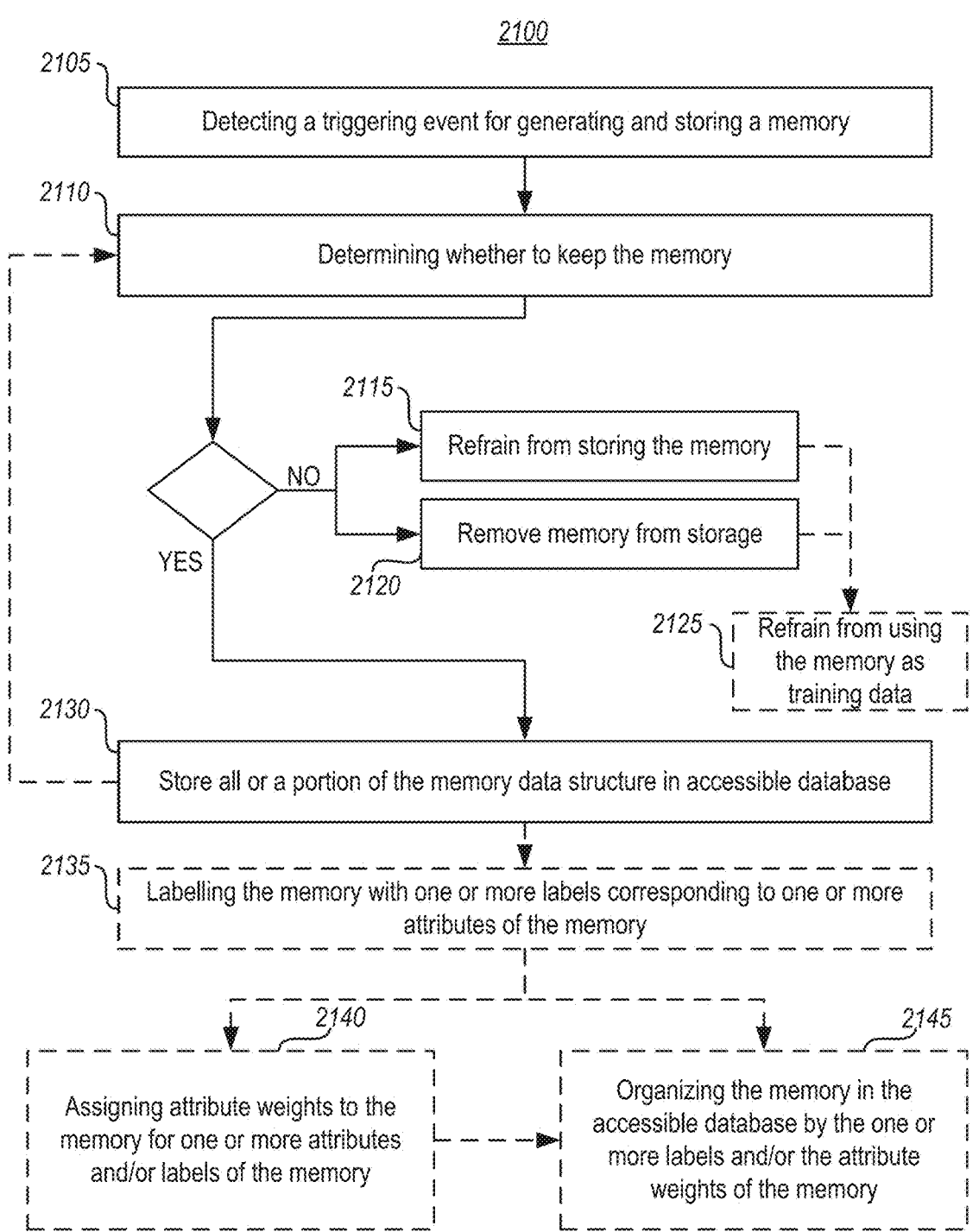

2100

2105 — Detecting a triggering event for generating and storing a memory

2110 — Determining whether to keep the memory

2115 — Refrain from storing the memory

2120 — Remove memory from storage

2125 — Refrain from using the memory as training data

NO

YES

2130 — Store all or a portion of the memory data structure in accessible database 2135 — Labelling the memory with one or more labels corresponding to one or more attributes of the memory 2140 — Assigning attribute weights to the memory for one or more attributes and/or labels of the memory 2145 — Organizing the memory in the accessible database by the one or more labels and/or the attribute weights of the memory

FIG. 21

AI AGENT INTERFACES AND CONTROLS FOR EMAIL AND OTHER ELECTRONIC COMMUNICATIONS

RELATED APPLICATIONS

This application claims the benefit and priority of U.S. Provisional Patent Application Ser. No. 63/647,880 entitled "AI AGENT INTERFACES AND CONTROLS FOR EMAIL AND OTHER ELECTRONIC COMMUNICA- TIONS", U.S. Provisional Patent Application Ser. No. 63/647,875 entitled "AI AGENT CREATION PROCESSES AND INTERFACES", U.S. Provisional Patent Application Ser. No. 63/647,790 entitled "TASK MANAGEMENT INTERFACES FOR END-TO-END TASK PROCESSING AND SUB-TASK GENERATION AND MODIFICA- TION", U.S. Provisional Patent Application Ser. No. 63/647,866 entitled "AI AGENT TRAINING INTER- FACES AND PROCESSES", U.S. Provisional Patent Appli- cation Ser. No. 63/647,884 entitled "METHODS AND INTERFACES FOR MANAGING AI AGENT ACTIVA- TION TRIGGERS AND INTERACTIONS", and U.S. Pro- visional Patent Application Ser. No. 63/647,892 entitled "MEMORY MANAGEMENT OF AI AGENTS", each of which is incorporated herein by reference in their entireties. Each of the aforementioned United States Provisional Patent Applications were filed on May 15, 2024.

This application is also related to U.S. patent application Ser. No. 18/827,392 entitled "TASK MANAGEMENT INTERFACES FOR END-TO-END TASK PROCESSING AND SUB-TASK GENERATION AND MODIFICA- TION", United States Patent application Ser. No. 18/909, 891 entitled "AI AGENT CREATION PROCESSES AND INTERFACES", U.S. patent application Ser. No. 18/909, 889 entitled "AI AGENT TRAINING INTERFACES AND PROCESSES", United States Patent Application Ser. No. 18/909,893 entitled "METHODS AND INTERFACES FOR MANAGING AI AGENT ACTIVATION TRIGGERS AND INTERACTIONS", and U.S. patent application Ser. No. 18/827,600 entitled "MEMORY MANGEMENT OF AI AGENTS".

BACKGROUND

AI (Artificial Intelligence) interfaces have been devel- oped to enable a user to interact with backend machine learning models that perform specialized tasks. Some inter- faces, such as Chat GPT interface with and leverage the functionality of LLM (Large Language Models) and other specialized machine learning models that have been trained to generate outputs responsive to prompts and other inputs that are received through the AI interfaces.

Some AI interfaces have also been developed as agent entities (referred to herein as AI agents) that include avatar visualizations and speaking capabilities which personalize the AI interfaces and enrich the consumer experience when interfacing with the AI interfaces.

Some AI agents are programmed with rules to enable the AI agents to react to predetermined inputs to perform corresponding tasks and to generate related and predicted outputs. In some instances, the AI agents can also be programmed to interface with other computer components and models that have been programmed with different and/or more expansive functionality. Some AI agents also incorporate generalized machine-learnable models that can be trained to perform different functions in different domains, such as language processing models that can be trained to interpret, translate or otherwise process a particu- lar type of language.

When an AI agent incorporates machine-learning or learn- able models, the AI agent can be trained to process and interpret different types of prompts to perform correspond- ing actions related to the instructions and queries specified by the prompts.

Unfortunately, when using an AI agent, it is difficult to conceptualize how the AI agent has been trained and how the AI agent will perform when prompted to do a specific task. For example, the AI agent could be very generalized for performing general tasks (e.g., defining or summarizing referenced content) and undertrained or underfitted for spe- cific types of tasks (e.g., translating text, completing a purchase order, etc.), and such that it will not respond in a desired or predictable manner when prompted to perform a specialized task.

Alternatively, the AI agent may be overtrained or over- fitted for a single task (e.g., translating a message), and such that it will not respond in a desired or predictable manner when prompted to perform a more generalized task (e.g., summarizing content in a message), or when prompted to perform a different and perhaps more specialized task (e.g., identifying a speaker based on a speaking style of a mes- sage).

Unfortunately, it is difficult to intuitively understand how an AI agent has been trained, which specific functionality the AI agent is proficient at, and/or to know what types of additional training or retraining the AI agent needs.

Notably, conventional AI agent interfaces lack any explicit presentations or visualizations of the logged events and training experienced by the AI agents, which might be useful for a user to assess the capabilities and resources available to the AI agents. Such a lack of intuitive visual- izations for the AI agents can often result in poor user experiences and reduced utility of the AI agents when consumers interact with the AI agents. This may also result in the consumers being unaware of how to best interact with the AI agents and/or how to improve the training and functionality of the AI agents.

SUMMARY

The disclosed embodiments relate to systems, methods, and computer program products for facilitating control over the creation, management, presentation of, and user inter- action with AI agents.

In some aspects, the techniques described herein relate to a method for managing AI (Artificial Intelligence) agent(s) interactions with electronic communications that are dis- played at an electronic communications interface, the method including: parsing, via an AI agent, an electronic communication to determine whether the electronic com- munication corresponds to a new or existing request; deter- mining, via the AI agent, in response to determining if the electronic communication corresponds to the new or the existing request, a set of actions to be performed in response to the request; causing the AI agent to determine whether any actions in the set of actions has been performed, where actions in the set of actions that have already been performed are a first group of actions; causing, when the AI agent determines that there are one or more actions in the set of actions that have not been performed, the AI agent to determine which actions in the set of actions that have not yet been performed require additional user input or autho- rization before the AI agent can perform the action, where actions in the set of actions that have not yet been performed but require additional user input or authorization before the AI agent can perform the action are a second group of actions, the AI agent further determining which actions in the set of actions that have not yet been performed do not require additional user input or authorization before the AI agent can perform the action, where actions in the set of actions that have not yet been performed but do not require additional user input or authorization before the AI agent can perform the action are a third group of actions; generating a notification that is displayed at the electronic communication interface, the notification identifying the set of actions with visual identifiers that visually distinguishes the set of actions, such that the first group of actions, the second group of actions and the third group of actions are visually distinguished from each other; and displaying with the notification a set of controls that include selectable controls for one or more actions in the set of actions.

In some aspects, the techniques described herein relate to a method for modifying an electronic communication interface to reflect AI (Artificial Intelligence) agent(s) interactions with one or more electronic communications, the method including: displaying, on the electronic communication interface, an electronic communication visualization representing an electronic communication that includes a new or existing request; displaying on the electronic communication interface a notification generated in response to an AI agent processing the electronic communication, the notification including identification of a set of actions to be performed in response to the request, where actions in the set of actions that have already been performed are a first group of actions, actions that have not yet been performed but require additional user input or authorization before the AI agent can perform the actions are a second group of actions, and actions that have not yet been performed but do not require additional user input or authorization before the AI agent can perform the actions are a third group of actions, where the displayed notification includes visual identifiers that visually distinguishes the first group of actions, the second group of actions and the third group of actions from each other; displaying the notification with a set of controls that include selectable controls for one or more actions in the set of actions; and detecting a user input at one of the selectable controls, which when detected, triggers an instruction to the AI agent to be generated and sent to the AI agent.

This Summary introduces a selection of concepts in a simplified form that are further described below in the Detailed Description. This Summary is not intended to identify key features or essential features of the claimed subject matter, nor is it intended to be used to determine the scope of the claimed subject matter.

BRIEF DESCRIPTION OF THE DRAWINGS

To describe how the advantages of the systems and methods described herein can be obtained, a more particular description of the embodiments briefly described is rendered by reference to specific embodiments thereof, which are illustrated in the appended drawings. These drawings depict only typical embodiments of the systems and methods described herein and are not, therefore, to be considered to be limiting in their scope. Systems and methods are described and explained with additional specificity and detail through the use of the accompanying drawings, in which:

FIG. 9 illustrates an example of an interface that is usable during the interaction with and training of an AI agent

FIG. 11 illustrates a flowchart of acts associated with a method that can be implemented by a computing system and is configured for facilitating the interaction with and training of an AI agent;

FIG. 12 illustrates a flowchart of acts associated with a method that can be implemented by a computing system and is configured for facilitating the management of AI agents, AI agent skills, and customer access to AI agents and AI agent skills;

FIG. 14 illustrates a flowchart of acts associated with a method that can be implemented by a computing system and is configured for facilitating the management of AI interactions and access to channels by the AI agents;

FIG. 17 illustrates a flowchart of acts associated with a method that can be implemented by a computing system and is configured for facilitating the interaction with and task processing by an AI agent;

FIG. 18 illustrates a flowchart of acts associated with a method that can be implemented by a computing system and is configured for managing AI agent interactions with electronic communications that are displayed at an electronic communications interface;

FIG. 21 illustrates a flowchart of acts associated with a method that can be implemented by a computing system and is configured for controlling the creation and management of memories for an AI agent(s);

DETAILED DESCRIPTION

Figure 1:
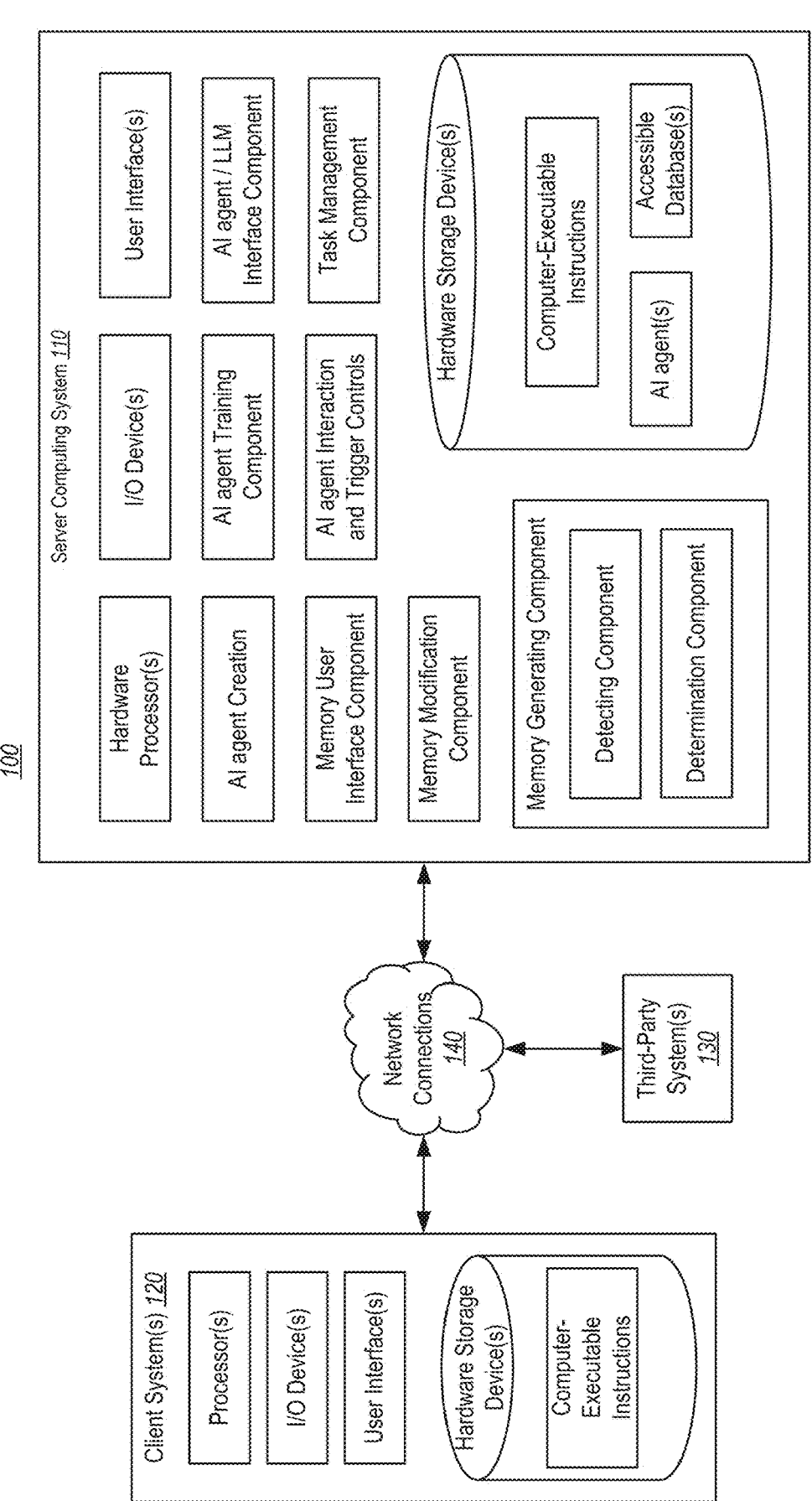
FIG. 1 illustrates a computing environment, which is an example of a system for facilitating control over the creation, management, presentation of, and user interaction with AI agents and AI agent interfaces.

The disclosed embodiments relate to systems, methods, and computer program products for facilitating control over the creation, management, presentation of, and user interaction with AI agents.

In some embodiments, systems and methods are provided for facilitating the creation of and modification of AI (artificial intelligence) agents. Interfaces enable a user to provide input for selecting resources to add to the AI agent knowledge base. The interfaces also enable users to provide and modify instructions that are associated with actions to be performed by the AI agents using the AI agent knowledge base.

Systems and methods are also provided for facilitating the management of interactions and training for the AI agents. Systems identify a plurality of interactions with an AI agent, parse the interactions and generate a summary of the interactions that are displayed with summary information. Interface controls are also displayed for enabling a user to modify how the AI agent will handle a future interaction relative to how the AI agent interacted during one of the different interactions summarized in the display of different summaries.

Systems and methods are also provided for facilitating the management of the AI agents, AI agent skills, and customer access to AI agents and AI agent skills. Systems identify an AI agent and AI agent skills that the AI agent can utilize when interacting with different customers. The systems also identify a plurality of customers that the AI agent is capable of interacting with while utilizing one or more of the AI agent skills. The systems also generate and display interfaces that identify the plurality of customers with interactive permission controls for selectively enabling and/or disabling AI agent interactions by the AI agent the corresponding customers.

Systems and methods are also provided for facilitating management of interactions and training for the AI agents. Systems generate and display interfaces for training AI agents and for receiving user instructions. The systems parse user instructions to identify tasks to be performed by the AI agents. The systems cause the tasks to be split into subtasks to be performed by the AI agent. The systems also display a dialogue frame that presents the user instructions along with AI agent responses that identify the subtasks. The systems also displaying a graph that visually identifies a processing flow of the subtasks and that dynamically updates the processing flow to reflect a status of progress for the AI agent performing the subtasks.

Systems and methods are also provided for managing AI agent interactions for electronic communications that are displayed at an electronic communications interface, such as an email interface. The systems parse electronic communications to determine whether they correspond to new or existing requests and actions to be performed when responding to the request(s). The systems also generate notifications identifying the set of actions with visual identifiers that visually distinguish the set of actions based on whether they have been completed or not and whether they need authorization to be completed. The systems also display selectable controls for controlling how the AI agent performs the actions.

Systems and methods are also provided for facilitating control over the creation, management, presentation and interaction with AI memory data structures (sometimes referred to herein as "memories") of the AI agents and which generally identify events, experiences, training data, teaching events, instructions and/or rules associated with the AI agents.

Attention will now be directed to FIG. 1, which illustrates a computing environment 100 that can be used for facilitating control over the creation, management, presentation of and user interaction with memories for AI agent(s). The computing environment 100 includes client system(s) 120 and third-party system(s) 130 in communication (via a network connections 140) with computing system 110.

The computing system 110 includes, for example, one or more processor(s), such as one or more hardware processor(s) and one or more hardware storage device(s) storing computer-readable instructions. One or more of the hardware storage device(s) is able to house any number of data types and any number of computer-executable instructions by which the computing system 110 is configured to implement one or more aspects of the disclosed embodiments when the computer-executable instructions are executed by the one or more hardware processor(s). The computing system 110 is also shown in FIG. 1 to include user interface(s) and input/output (I/O) device(s).

As shown in FIG. 1, the hardware storage device(s) is shown as a single storage unit. However, it will be appreciated that the hardware storage device(s) can include a distributed storage that is distributed to several separate and sometimes remote system and/or third-party system(s). The computing system 110 can also comprise a distributed system with one or more of the components of the computing system 110 being maintained/run by different discrete systems that are remote from each other and that each discrete system performs different tasks. In some instances, a plurality of distributed systems performs similar and/or shared tasks for implementing the disclosed functionality, such as in a distributed cloud environment.

As illustrated in FIG. 1, the computing system also includes additional components capable of performing (in whole or in part) the functions of the methods, systems and computer program products for facilitating control over the creation, management, presentation of and user interaction with memories for AI agent(s), according to the principles described herein. These components include a memory generating component (including a detecting component and a determination component), a memory user interface component, a memory modification component, and AI agent/LLM interface component, and an AI agent training component. The hardware storage device(s) of the computing system 110 may also include AI models, AI agent(s), and accessible database(s). The functionalities of these components will be described in greater detail later with respect to their corresponding functions when discussing the flow diagrams illustrated in FIG. 21 and FIG. 22.

The computing system 110 is in communication with client system(s) 120 comprising one or more processor(s), one or more user interface(s), one or more I/O devices(s), one or more sets of computer-executable instructions, and one or more hardware storage device(s). In some instances, users of a particular software application (e.g., Microsoft Teams, Microsoft Outlook, etc.) engage with the software at the client system(s) 120 to transmit data to the computing system 110 to be processed. Alternatively, the computing system 110 is capable of transmitting instructions to the client system(s) 120 for generating/downloading data, such that the processing of the data occurs at the client system(s).

The computing system 110 is also in communication with third-party system(s) 130. It is anticipated that, in some instances, the third-party system(s) 130 further comprise databases housing data that could be used as AI training data, for example, text data not included in local storage of the computing system 110. Additionally, or alternatively, the third-party system(s) 130 includes machine learning systems external to the computing system 110. Further, in some embodiments, the third-party system(s) 130 further comprises databases housing AI models to be accessed by the computing system 110.

It will be appreciated that the disclosed embodiments may include, be practiced by, or implemented by a computer system (e.g., computing system 110) that is configured with computer storage that stores computer-executable instructions that, when executed by one or more processing systems (e.g., one or more hardware processors) of the computer system, cause various functions to be performed, such as the acts associated with the various methods and the functionality described herein.

Figure 2:
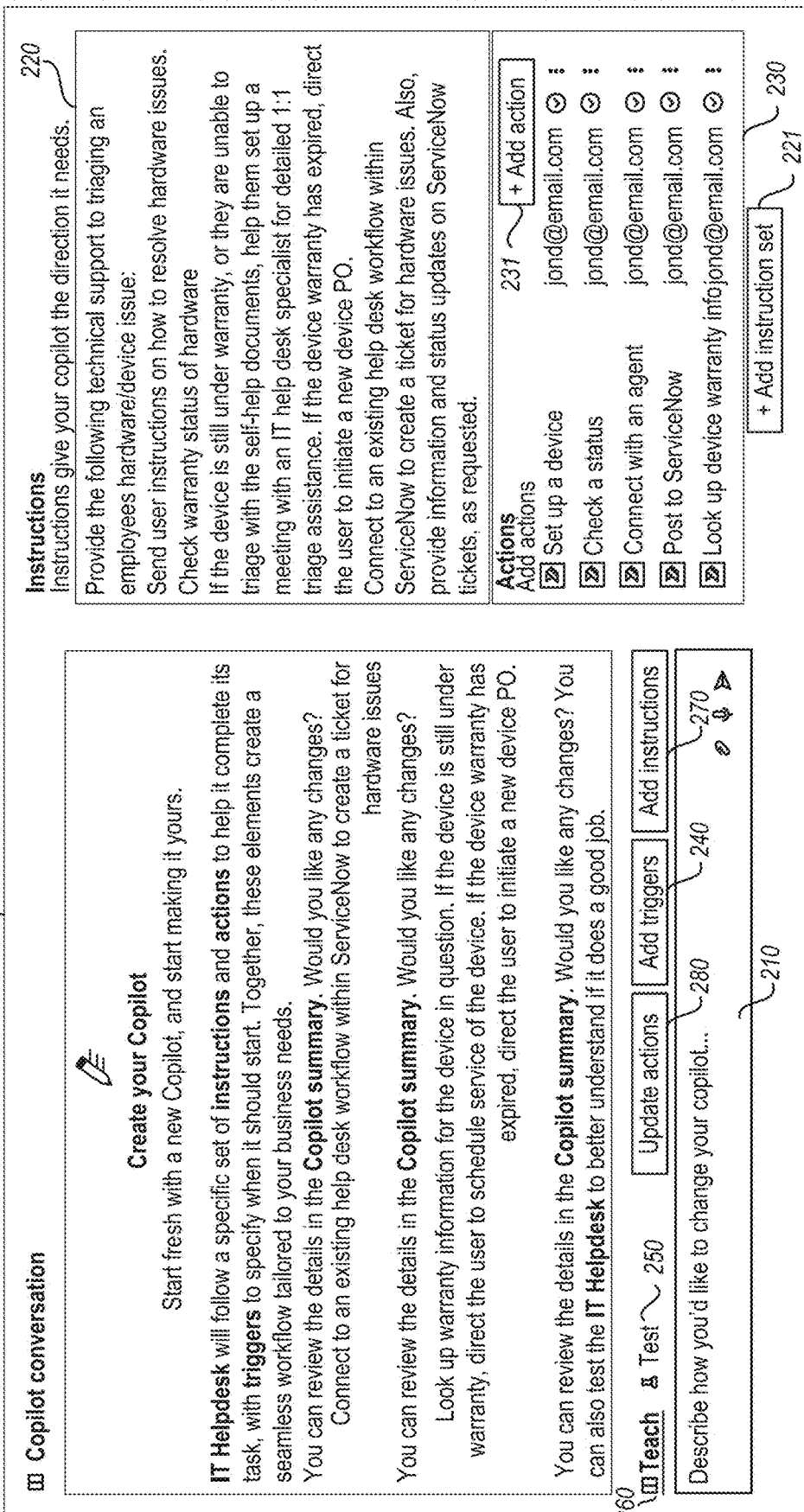
FIG. 2 illustrates an example of an interface that is usable during the creation and training of an AI agent.
Figure 3:
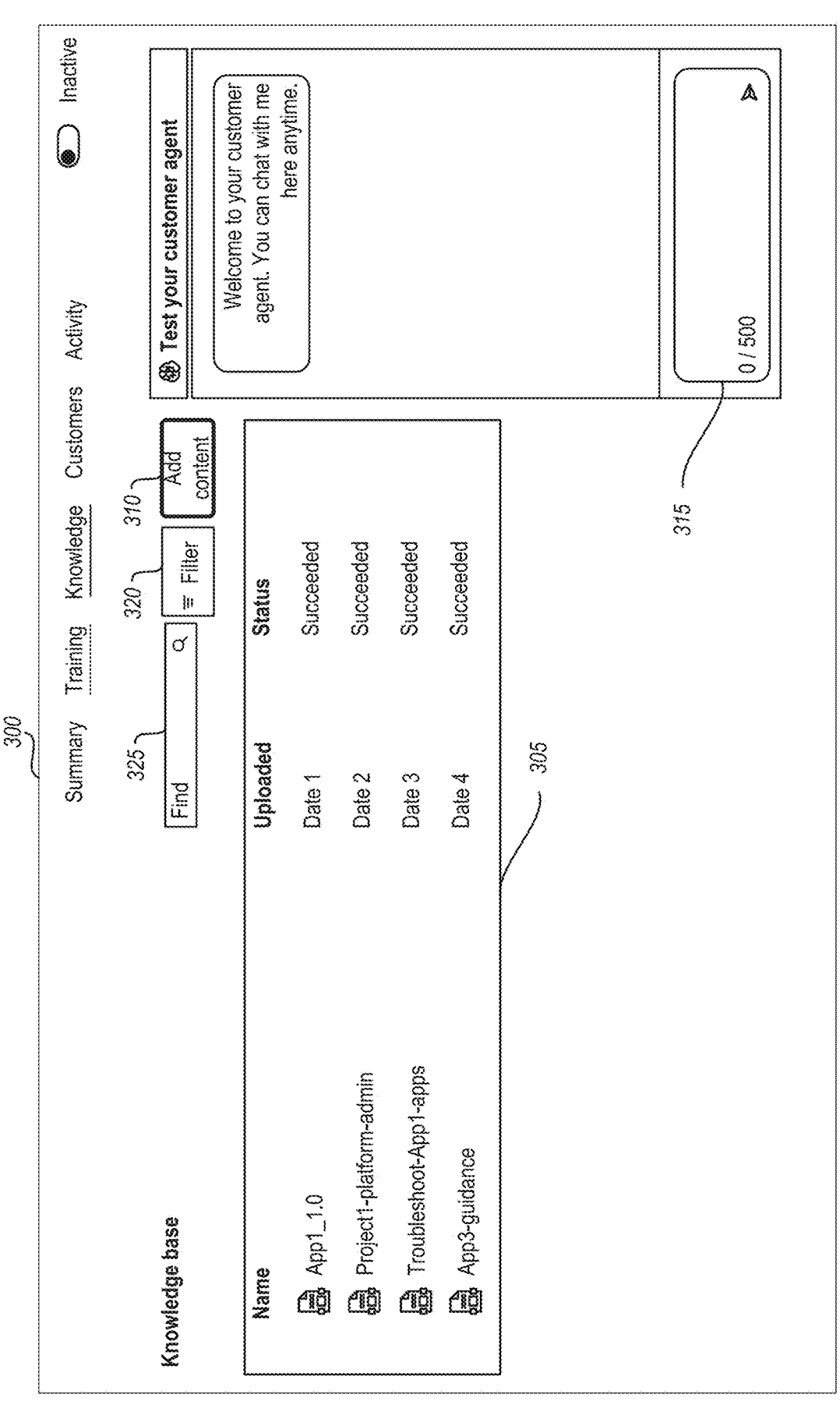
FIG. 3 illustrates an example of an interface that is usable during the creation and training of an AI agent.
Figure 4:
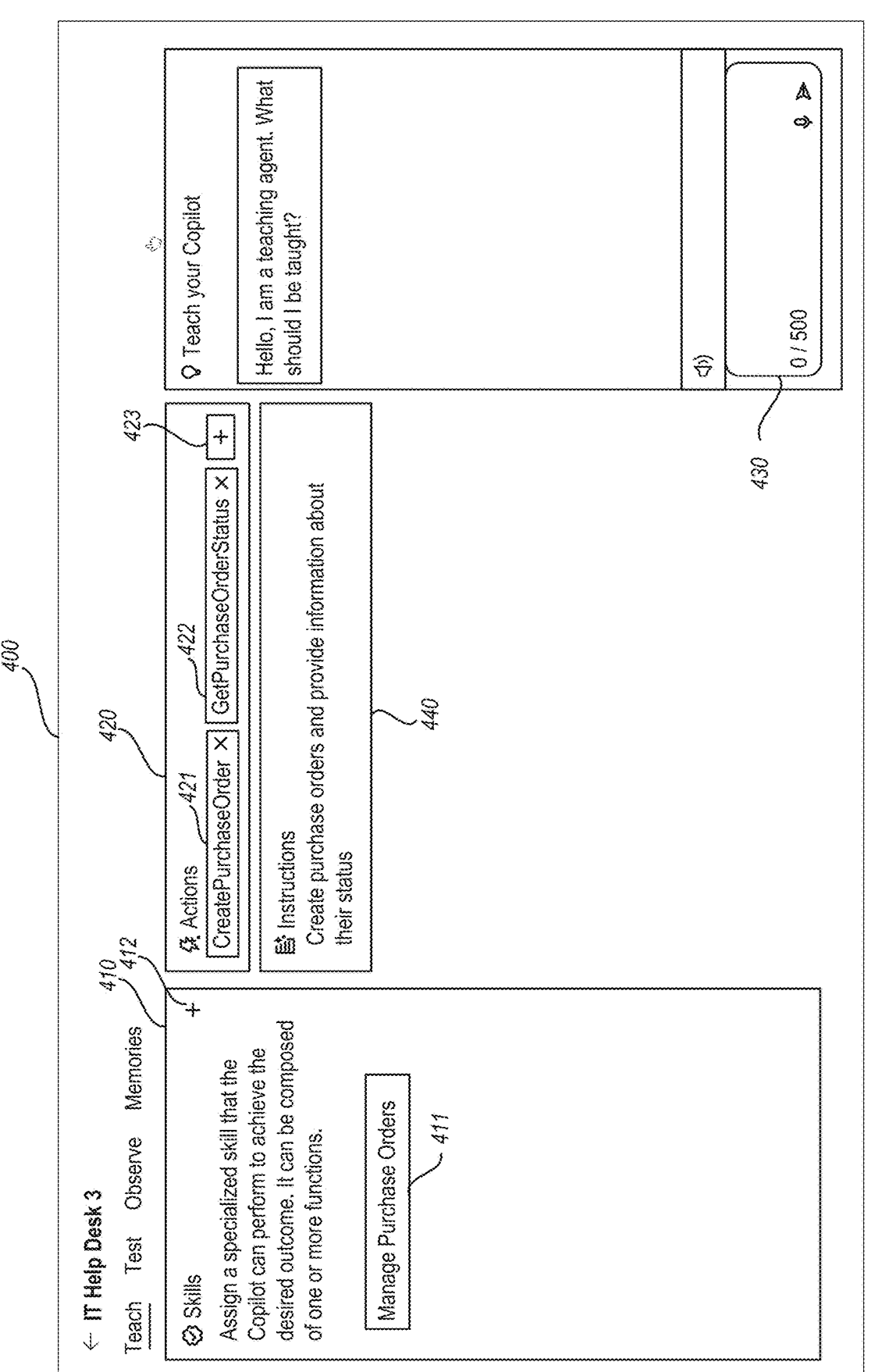
FIG. 4 illustrates an example of an interface that is usable during the creation and training of an AI agent.
Figure 5:
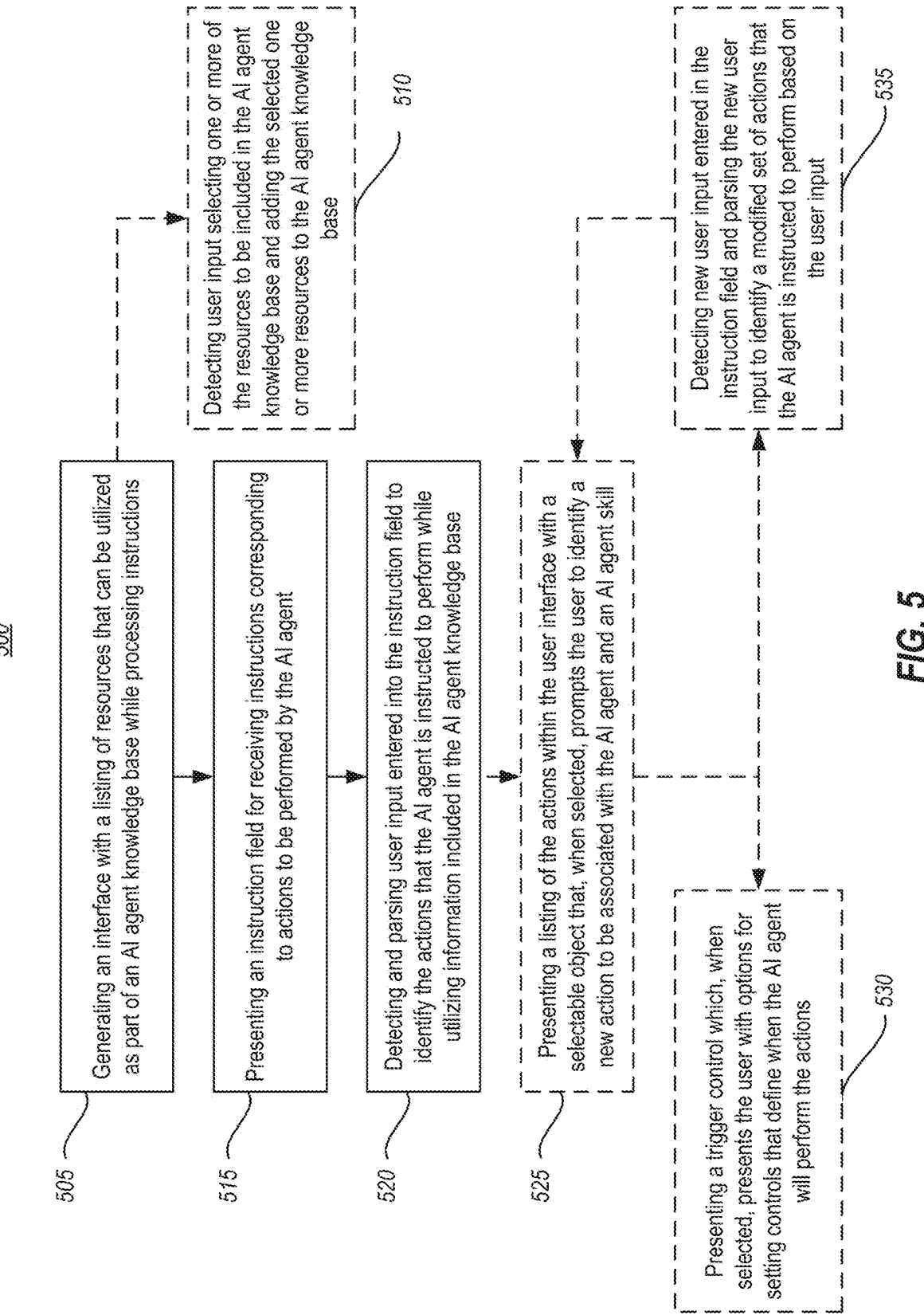
FIG. 5 illustrates a flowchart of acts associated with a method that can be implemented by a computing system and is configured for facilitating the creation and training of an AI agent.

Attention will now be directed to FIGS. 2-4, which illustrate example interfaces in which the principles described herein may be practiced, as well as FIG. 5, which illustrates a flow diagram associated with embodiments for facilitating the creation and modification of AI agents.

As described herein, the AI agents are configured as electronic entities comprising interfaces and models that perform actions based on instructions that are received by the AI agents. When performing instructed actions, the AI agents access and utilize resources included in their knowledge bases. The knowledge base of an agent may also include data structures that identify rules and controls that define how an AI agent is trained, when the AI agent should perform actions, how the AI agent should perform actions, and how and when the AI agents should interact with different customers, applications, and machine learning models and resources. The knowledge bases of the AI agents can also include memories (sometimes referred to herein as "memory data structures") that define previous interactions and experiences of the AI agents, including communications involving the AI agents. The foregoing will become more apparent from the following disclosures presented herein.

In some embodiments, an AI agent is created through interfaces that enable a user to assign skills and corresponding tasks to the AI agent. The skills generally define capabilities of AI agents to perform certain functionality. Each skill may be associated with one or more actions that the AI agent may perform with its skill to comply with a request (e.g., a user request or instruction entered into an instruction/field or prompt field presented at a user interface for interacting with the AI agent). In one embodiment, an AI agent has the skill of assisting a user in creating a new AI agent. In another embodiment, an AI agent has the skill of creating new AI agents without user input. In yet another embodiment, an AI agent has the skill to acquire new skills in order to perform new tasks. In another embodiment, AI agents have the skill of communicating with other AI agents in order to acquire the other AI agents' skills (i.e., the instructions and rules for performing a task), such that AI agents learn from each other.

An agent may be defined, in some instances, as a set of one or more data structures, including machine learning models, and that further include computer-executable code that is operable, when executed by a processor to perform the AI agent functionality described herein. In another instance, an AI agent is defined as instructions, actions, triggers, sets of examples, history and memories related to tasks performed and various teaching events, as will be explained later. In another instance, an AI agent is defined as the instructions and/or rules leveraged for controlling interactions with machine learning models, large language models, databases, data structures, and user interfaces. In another instance, an AI agent is defined as one or more AI models trained to perform one or more tasks. These definitions of AI agents are non-exhaustive and are provided for purposes of explanation and example only. The embodiments and principles described herein are applicable with any combination of the above definitions of AI agents. Further, the embodiments and principles described herein are not limited to AI agents as defined by these definitions.

In one embodiment, when the AI agent performs a requested action (e.g., in response to a user instruction), the AI agent may invoke the functionality of other remote machine learning models and/or other AI agents that perform specified actions or that include particular functionality utilized by the AI agent when performing a requested action. Accordingly, in this embodiment, the AI agent functions as a coordinator between machine learning models (and/or other AI agents) and various databases corresponding to different users and/or databases used for performing different actions. In another embodiment, the AI agent itself is a machine learning model used for performing one or more actions, in which case the AI agent may be called/invoked by other AI agents. In some embodiments, the AI agent is a hybrid AI agent that itself is a machine learning model used for performing one or more actions, but is also capable of coordinating with other AI agents and/or machine learning models and/or various databases.

Different AI agents may include or use machine learning models that are specialized and that have been trained to perform specific tasks/actions and functions. In one embodiment, multiple AI agents have access to the same machine learning models, but access different databases corresponding to different users when interacting with that user. In another embodiment, multiple users may interact with the same AI agent for performing a similar task, in which case the AI agent performs the tasks for the different users by using the same set of machine learning models, but by accessing different databases corresponding to the different users.

Accordingly, in some embodiments, AI agents form memories related to specific users, such that memories for different users are partitioned from each other and are recalled for use only when the corresponding user interacts with the AI agent. In other words, when interacting with a user, the AI agent may access memories related to that user, while refraining from accessing memories related to other users. This allows security and privacy among different users to be maintained, even when multiple users have access to the same AI agents. This is especially advantageous when multiple users who are not part of the same organization have access to the same AI agent, as may be the case when AI agents are leased (e.g., via a subscription platform) to multiple organizations as a product or service.

In some instances, the AI agents are further trained and/or controlled by applying rules and instructions detected by the AI agents, and/or based on user feedback, and/or based on AI agent memories (all of which may be included in the AI agent knowledge base), and which may be used for controlling and altering the manner in which the AI agents perform future interactions and actions. In other words, the instructions and/or rules that affect AI agent behavior may be thought of as filters that the AI agent applies when using machine learning models to perform different tasks for different users. Accordingly, an AI agent may have different sets of instructions and/or rules when interacting with different users and/or when performing different tasks. For example, an AI agent may access different user data, context data, instruction sets, etc., while refraining from accessing other user data, context data, and instruction sets. This allows the AI agent to require less computational power and complexity since the AI agent only accesses/transfers a subset of user data, context data and/or instruction sets when performing tasks for different users in different contexts.

In one embodiment, a teaching event for an AI agent triggered by an interaction with a particular user may be applicable or useful to the AI agent when interacting with other users. In this case, the teaching event comprises an interaction with a user in which new instructions and/or rules are identified for controlling how the AI agent behaves when the AI agent performs future interactions with different users. This allows the AI agent to get better at performing tasks for many users, instead of limiting the improvement in task performance to a single user. Over the course of many teaching events from many different users with an AI agent, the AI agent can become exponentially more effective at its given tasks.

To facilitate this functionality, the system will create and store data structures that are referenced by the AI agent and that include different rules and control instructions that can be filtered based on different users, contexts, and scenarios to control how the AI agent behaves and interacts with the users in different contexts and scenarios. As previously expressed, data structures (sometimes referred to herein as "memories") of the AI agents generally identify events, experiences, training data, teaching events, instructions and/or rules associated with the AI agents.

In some circumstances, it is advantageous to limit the reach to which teaching events are used to adjust the instructions and/or rules for an AI agent. For example, in one embodiment, a teaching event for an AI agent may be specialized to a specific user. In that case, the teaching event comprises an interaction with a user in which new instructions and/or rules are identified for controlling how the AI agent behaves when interacting with that specific user. In another embodiment, a teaching event specialized for a specific user may be used to adjust the instructions and/or rules for controlling how the AI agent behaves when interacting with a small subset of other users to which the specialized teaching event applies, as may be the case when a particular AI agent is interacted with by multiple users within the same organization. In other words, the AI agent is capable of using the teaching event to modify instruction sets corresponding to a user or a small subset of users context, while refraining from using the teaching event to modify instruction sets for other users.

In yet another embodiment, determining which teaching events an AI agent is allowed to use to adjust the instructions and rules for an AI agent is determined based on organization hierarchy. For example, suppose that an AI agent is capable of being interacted with by multiple users within the same organization. In that case, perhaps only a small subset of users (e.g., managers or administrators) have sufficient permissions to trigger teaching events in which new instructions and/or rules are identified for controlling how the AI agent behaves when interacting with many users, or sometimes even all users, within that organization.

Alternatively, or in addition, different users within an organization may have different levels of permissions for triggering teaching events in which new instructions and/or rules are identified for controlling how the AI agent behaves. For example, upper-level managers or administrators may have sufficient permissions to trigger teaching events that significantly adjust instructions and/or rules for an AI agent so as to affect AI agent behavior for their organization as a whole. On the other hand, lower-level employees may only have sufficient permissions to trigger teaching events that adjust AI agent instructions and/or rules at a local level (e.g., for that user themselves and/or for users under that user in the organization's hierarchy).

Further, there may be a user (e.g., a lower-level employee) that does not have explicit sufficient permissions to trigger teaching events that significantly adjust instructions and/or rules which widely affect AI agent behavior for their organization (or team within the organization), but who believe that their teaching event would cause beneficial change in the AI agent behavior for many different users. In this case, that user may submit a request to a different user in organization's hierarchy (e.g., the user's superior) to incorporate their teaching event to adjust the instructions and/or rules for AI agent behavior when interacting with different users in the organization (or team within the organization).

In another embodiment, adjustments in the instructions and rules for AI agents as the result of teaching events are eventually used as training data to train (i.e., adjust model parameters) the machine learning models that the AI agents access to perform tasks. In the embodiment in which AI agents are themselves defined as one or more AI models, the teaching events may be used both to adjust the instructions and/or rules that dictate AI agent behavior with different users and when accomplishing different tasks, but also used as training data to train (i.e., adjust model parameters) the one or more models that define the AI agents.

FIG. 2 illustrates an interface 200 for creating and/or modifying an AI agent, including an instruction field 210 for receiving instructions corresponding to actions to be performed by the AI agent and an instruction summary window/ frame 220 that identifies previously received instructions. In one embodiment, the interface 200 includes a selectable control (e.g., selectable control 221) for adding additional instruction sets to the list of previously received instructions illustrated in window/frame 220. For example, when the selectable control 221 is selected, the add instruction set control triggers the system to display an interface window (not shown) for entering text (e.g., via user input) describing a new instruction set.

The interface 200 also includes a window/frame 230 that identifies a listing of actions that have been identified by the system after the system detects and parses user input entered into the instruction field 210. These actions can be identified from mapping tables that correlate instructions with actions. The actions can also be generated by an LLM (large language model) that is trained to generate actions for performing instructions that are detected. Further, additional actions can be added to the listing of actions in the window/frame 230 via user interaction with a selectable control 231. For example, when the selectable control 231 is selected, the add action control triggers the system to display an interface window (not shown) for adding one or more additional actions.

The previously referenced instruction field 210 can also be used for receiving new user input that can be parsed and used by the system to identify a modified set of actions that the AI agent is instructed to perform based on the user input. In one embodiment, the instruction field 210 can be used to add additional new actions and/or instructions, modify previous actions and/or instructions, and/or delete actions and/ or instructions.

The interface also includes a trigger control 240 that, when selected, triggers the system to present a user interface that includes options for setting controls that define triggers and/or triggering events that cause the AI agent to perform the actions.

Controls are also provided to initiate testing (e.g., selectable control 250) and further teaching (e.g., selectable control 260) of the AI agent and/or to add additional instructions (e.g., selectable control 270) or update actions (e.g., selectable control 280), as will be described in more detail below.

FIG. 3 illustrates an interface 300 that lists resources that have been identified by the system and that can be utilized as part of an AI agent knowledge base while processing instructions (e.g., listing 305). In some instances, the listing only includes resources that are added to the AI agent knowledge base. In other instances, the listing may include resources that are available to be accessed and downloaded or otherwise made available to the AI agent knowledge base.

The interface 300 also includes controls for adding resources to the AI agent knowledge base (e.g., "Add content" control 310) which, when selected, provide a user a listing or browsing tool for accessing additional resources. The instruction field 315 (also referred to as a prompt field herein) can be an additional tool or control for adding resources to the AI agent knowledge base. For instance, a user may enter an instruction into the instruction field 315 to identify and add a particular resource to the AI knowledge base. Resources to be added to the AI knowledge base may be sourced from a variety of locations, including a particular storage device (e.g., hardware storage devices of computing system 110 or client system(s) 120 of FIG. 1), cloud storage device(s), and/or a distributed network of storage devices. The interface 300 also includes controls for filtering the list of resources (e.g., filter control 320) and searching/parsing through the list of resources (e.g., find control 325).

FIG. 4 illustrates an interface 400 that includes a window 410 that identifies skills associated with the AI agent, and a window 420 that identifies actions (e.g., "CreatePurchase-Orders" control 421 and "GetPurchaseOrderStatus" control 422) that are associated with a selected or highlighted skill (e.g., manage purchase orders skill 411).

The interface 400 also includes controls (e.g., control 423) for adding more actions that are to be associated with a particular skill and which, when selected, presents a listing of actions or a menu or a browser for identifying actions to be associated with a skill. The new skill control may also, when selected, prompt the user to identify a new skill for the AI agent. For example, when selected, the add action control 423 triggers the system to display an interface window (not shown) where a user enters (e.g., via an instruction field) text describing a new action to be added.

A similar control 412 can also be provided for adding, creating and/or modifying a new skill. When selected, the add new skill control triggers the system to display an interface window (not shown) for identifying one or more skills to modify or to create and that will be added to the skills frame when identified or created.

As illustrated in FIG. 4, the interface 400 also includes an instruction field 430 for receiving new user input that can be parsed and used by the system to identify a modified set of actions that the AI agent is instructed to perform based on the user input. This instruction field can also receive instructions for initiating training and modification of the AI agent, based on input that is entered in the instruction field and that is processed by the AI agent.

The system may utilize machine learning models trained to identify actions that are associated with the user input (instructions) entered into an instruction field 430 to identify and/or modify the actions based on the user input.

Further, the interface 400 includes a window 440 that identifies instructions that describe or otherwise summarize the associated the skills identified in the window 410 and the corresponding actions identified in the window 420.

FIG. 5 illustrates a flow diagram 500 of acts (act 505, act 510, act 515, act 520, act 525, act 530 and act 535) associated with methods that may be performed by the disclosed systems.

These acts include generating an interface with a listing of resources that can be utilized as part of an AI agent knowledge base while processing instructions (act 505), detecting user input selecting one or more of the resources to be included in the AI agent knowledge base and adding the selected one or more resources to the AI agent knowledge base (act 510), such as with the interfaces and interface elements described above with respect to FIGS. 2-4.

The disclosed acts also include an act of presenting an instruction field for receiving instructions corresponding to actions to be performed by the AI agent (act 515) and detecting and parsing user input entered into the instruction field to identify the actions that the AI agent is instructed to perform while utilizing information included in the AI agent knowledge base (act 520).

The flow diagram 500 further illustrates various optional acts associated with the methods that may be performed by the disclosed systems. These optional acts include presenting a listing of the actions within the user interface with a selectable object that, when selected, prompts the user to identify a new action to be associated with the AI agent and an AI agent skill and to be performed by the AI agent (act 525), for presenting a trigger control which, when selected, presents the user with options for setting controls that define when the AI agent will perform the actions (act 530), and/or for detecting new user input entered in the instruction field and parsing the new user input to identify a modified set of actions that the AI agent is instructed to perform based on the user input (act 535).

Although not shown, the acts may also include acts for presenting a selectable new skill control that, when selected, prompts the user to identify a new skill for the AI agent and for associating a new skill for the AI agent in response to detecting new user input directed at the new skill control. The acts may also include associating a new action with the new skill in response to detecting user input selecting a predefined action from the user interface.

In some instances, the system presents an instruction field with a listing of a newly identified skill and associates a new action with the new skill in response to detecting user input entered in the instruction field (or other controls previously mentioned) and that instructs the AI agent to associate and/or perform the new action with the new skill.

The acts may also include presenting a trigger control which, when selected, presents the user with options for setting controls that define when the AI agent will perform the actions.

Attention is now directed to FIGS. 6A-10, which illustrate additional interfaces, and FIG. 11, which illustrates a flow diagram 1100 of embodiments associated with facilitating the training and interaction of an AI agent.

Figure 6A:
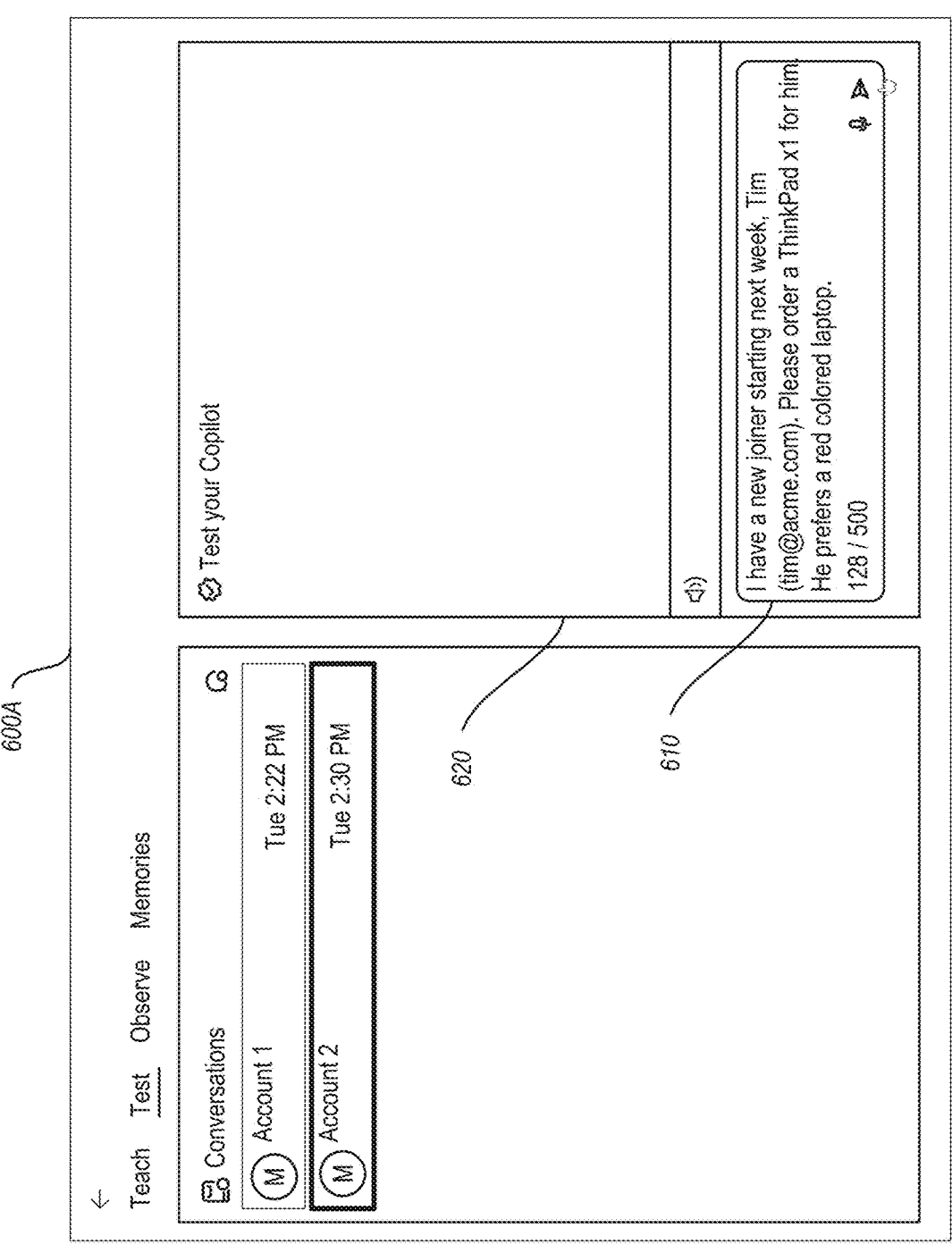
FIG. 6A illustrates an example of an interface that is usable during the interaction with and training of an AI agent.
Figure 6B:
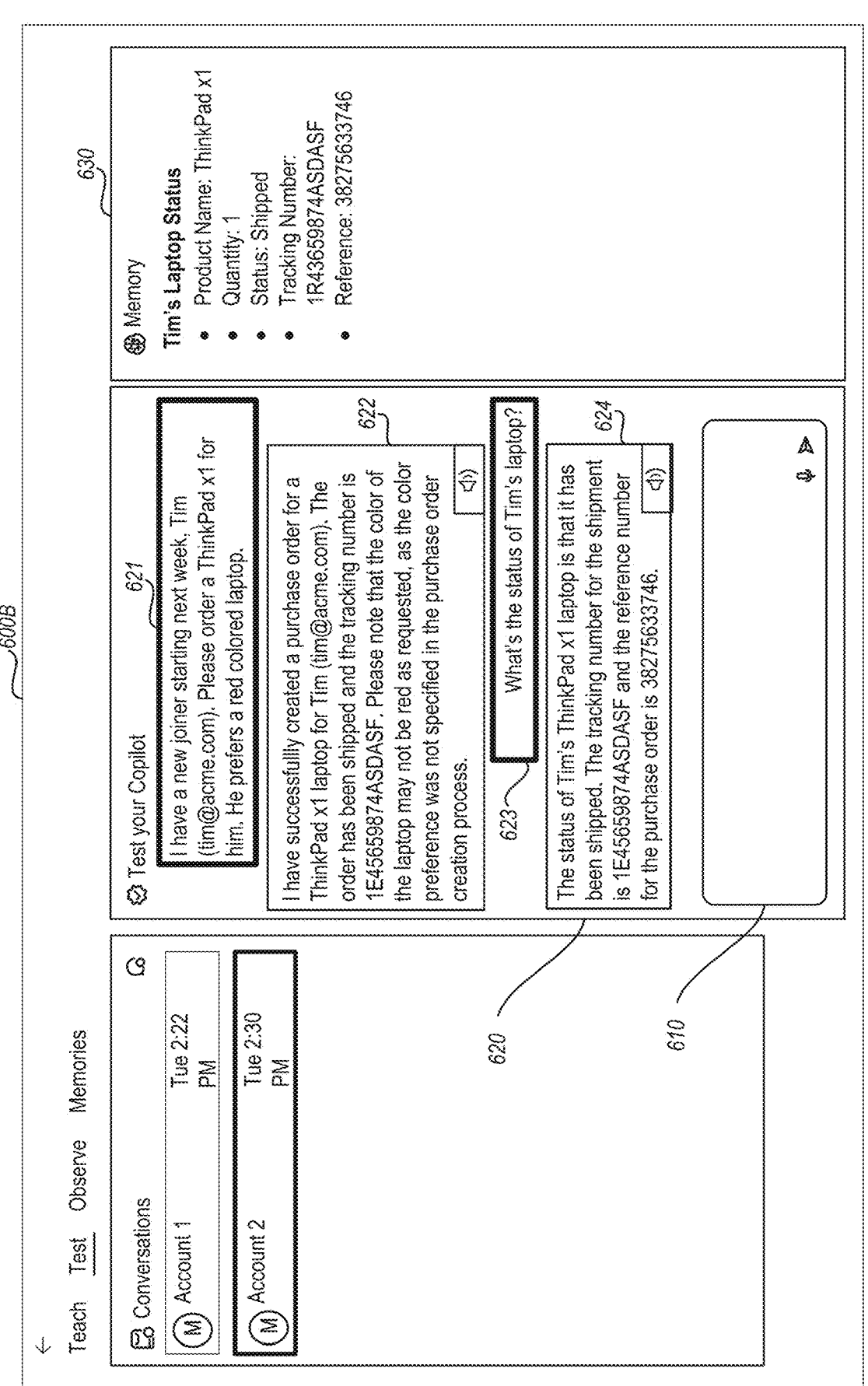
FIG. 6B illustrates an example of an interface that is usable during the interaction with and training of an AI agent

As shown in FIGS. 6A and 6B, interfaces 600A and 600B are provided for testing an AI agent in which a user enters instructions and/or questions into an instruction field (e.g., field 610) and in which the AI agent responds within a dialogue window (e.g., window 620) with actions taken and/or answers to the questions posed. The actions taken and the answers given by the AI agent will be performed and provided according to the skills and actions that are previously associated with that AI agent and which will include reference to the information contained in the AI agent knowledge base, as previously mentioned with respect to FIGS. 2-5.

The AI agent can be trained by detecting and incorporating new instructions received in the instruction field 610. These new instructions may identify changes to make to previous actions or specify triggering events for taking actions. For example, the interface 600B of FIG. 6B illustrates an example in which a user has entered instructions into the instruction field 610, which correspond to the text object box 621, which reads "I have a new joiner starting next week, Tim (tim@acme.com). Please order a ThinkPad x1 for him. He prefers a red colored laptop."

In response, the AI agent identifies the instructions from the user, identifies associated actions to take to perform the instructions from the user, and generates a text response in the dialog window 620. In the example illustrated in FIG. 6B, the AI agent generates a text response represented by text object box 622, which reads "I have successfully created a purchase order for a ThinkPad x1 laptop for Tim (tim@acme.com). The order has been shipped and the tracking number is 1E45659874ASDASF. Please note that the color of the laptop may not be red as requested, as the color preference was not specified in the purchase order creation process."

In some embodiments, text object boxes representing text responses generated by the AI agent include selectable controls for causing the AI agent's text response to be read aloud (e.g., via a text-to-speech system). In another embodiment, text object boxes representing user-entered instructions also include selectable controls for causing the user's instructions to be read aloud (e.g., via a text-to-speech system). Such embodiments may be beneficial for enhancing the user-accessibility of user interfaces and AI agent interactions.

In the embodiment of FIG. 6B, the user further interacts with the AI agent via the instruction field 610 by entering instructions represented by text object box 623, reading "What is the status of Tim's laptop". In response, the AI agent identifies an instruction to recall and/or acquire information regarding the status of Tim's laptop (e.g., as represented by a memory window 630), and generates a response represented by text object box 624, which reads "The status of Tim's ThinkPad x1 laptop is that it has been shipped. The tracking number is 1E45659874ASDASF and the reference number for the purchase order is 38275633746."

The interface also shows how memories can be created and logged for the AI agent based on the interaction taking place (e.g., memory "Tim's Laptop Status"), as illustrated in the memory window 630 of FIG. 6B. Accordingly, the user interfaces, according to the principles described herein, allow for the facilitation of training, testing and interaction of AI agents.

Figure 7:
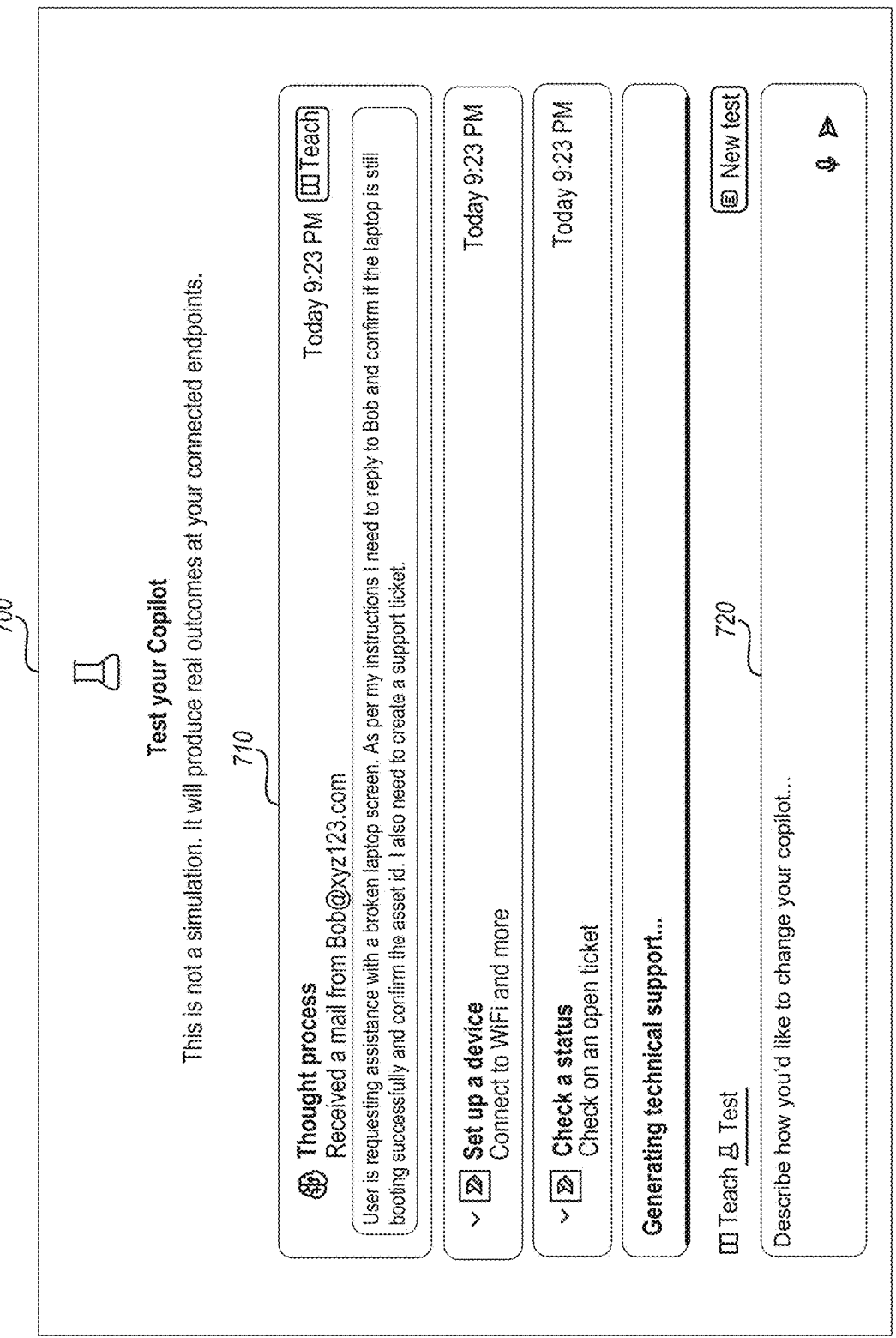
FIG. 7 illustrates an example of an interface that is usable during the interaction with and training of an AI agent

FIG. 7 illustrates an interface 700 for interacting with and training an AI agent in which a user can provide instructions, including new or modified instructions for actions taken. The interface 700 may also include a summary of actions taken by the AI agent with selectable controls for initiating a teaching interaction with the AI agent (e.g., the Teach control which, when selected, opens an interface for identifying and modifying actions that the AI agent will take).

The interface 700 may also include a thought process field 710, which displays a text object describing a request entered by a user, as well as a listing of actions that the AI agent should take in order to fulfill that request. For example, in FIG. 7, the through process field 710 illustrates a text object which reads "User is requesting assistance with a broken laptop screen. As per my instructions I need to reply to Bob and confirm if the laptop is still booting successfully and confirm asset id. I also need to create a support ticket."

Accordingly, this allows the user to visualize and easily understand how the AI agent thinks it should act to fulfill the request from the user. Additionally, the interface 700 enables the user to test (e.g., via user input into the instruction field 720) the AI agent to simulate how the AI agent would fulfill a request from the user. In turn, these features allow the user to better understand how they should adjust the instructions of the AI agent (e.g., via user input into instruction field 720) so that the AI agent can better fulfill the request from the user according to the preferences of the user.

Figure 8:
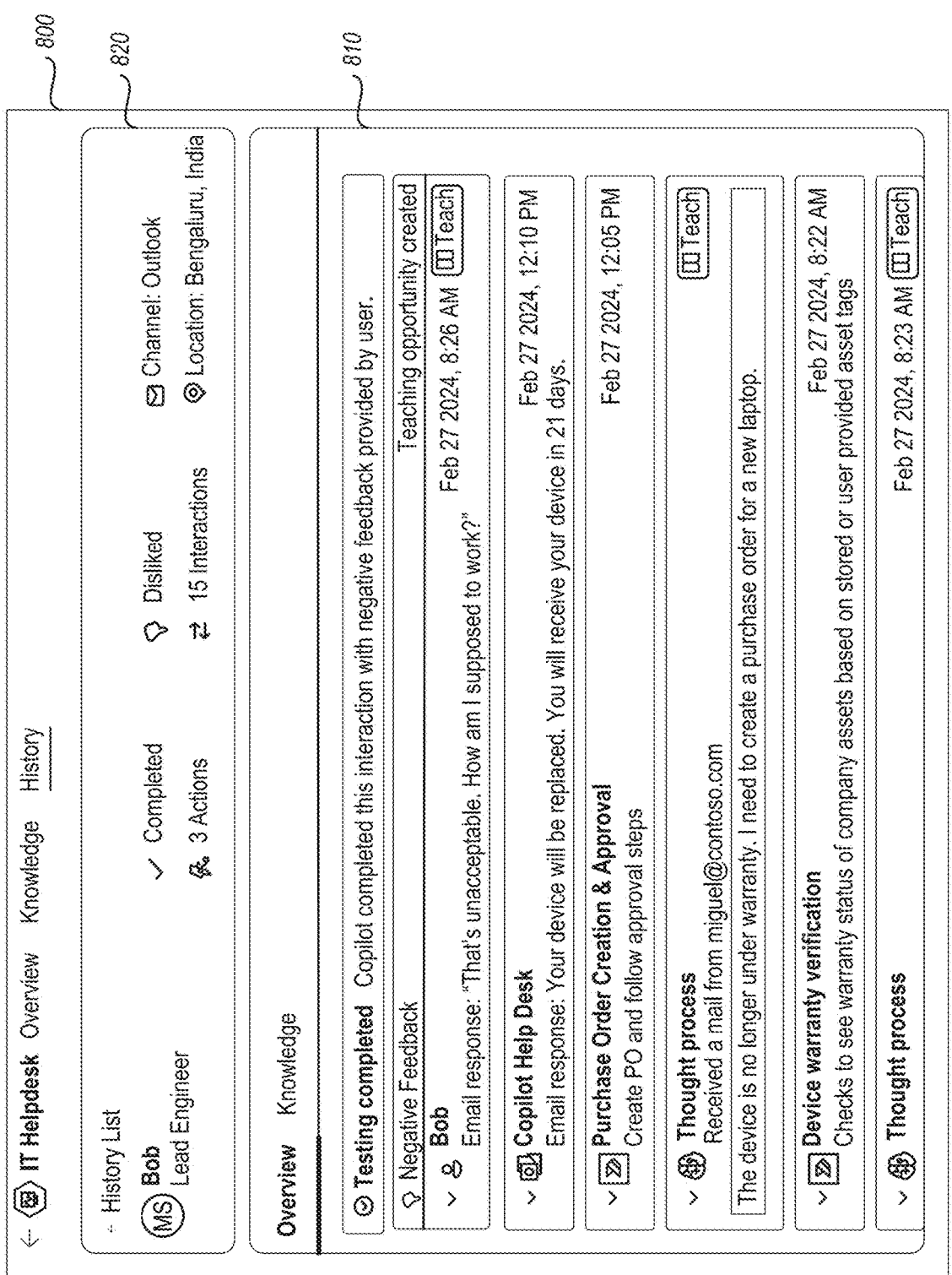
FIG. 8 illustrates an example of an interface that is usable during the interaction with and training of an AI agent

FIG. 8 illustrates another interface 800 that includes feedback corresponding to actions taken by the AI agent and a status of actions taken, along with selectable controls (e.g., Teach control) for initiating interfaces for modifying how the AI agent responds to instructions and/or how the AI agent performs actions associated with detected instructions. The teaching interfaces can include any of the interfaces described herein and which include an instruction field for receiving instructions that are applied by the AI agent.

For example, in the embodiment illustrated in FIG. 8, the interface 800 includes an overview section 810, which shows the history of various actions and thought processes performed by an AI agent in order to fulfill a request during runtime, or during the course of a testing session. Specifically, in the example embodiment illustrated in FIG. 8, the overview section 810 illustrates the history of actions and thought processes of an AI agent when the AI agent attempted to assist a user (referred to as "Bob" in the example embodiment of FIG. 8) with an issue with their laptop.

Upon receiving a request from Bob, the AI agent decides to perform a device warranty verification on Bob's laptop based on asset tags of Bob's laptop. In response to performing the device warranty verification, the AI agent determines that Bob's device is no longer under warranty, and that the AI agent should create a purchase order for a new laptop for Bob. Upon creating a new purchase order for Bob's laptop, the AI agent sends an email response to Bob, informing him that his device will be replaced, and that he will receive his new device in 21 days. Bob then responds to the AI agent's email response with a corresponding email response, telling the AI agent that the way that it elected to respond to the request for assistance with his laptop was unacceptable.

The AI agent determines that the email response received from Bob corresponds to negative feedback about the AI agent's actions while attempting to fulfill Bob's request. To improve the functionality of the AI agent during future interactions, the AI agent can interpret this interaction as a teaching event, and adjust the way (e.g., instructions, behaviors) that the AI agent performs similar tasks in the future. Additionally, users (e.g., Bob) can provide detailed feedback about the interaction to assist the AI agent in better understanding and adjusting its future behaviors.

From user feedback, an AI agent is capable of modifying/updating user data, context data, instruction sets, etc. The AI agent is also capable of refraining from using the user feedback to modify/update other user data, context data and/or instruction sets. Accordingly, AI agents are capable of controlling which user interactions and/or user feedback are used for modifying different user data, context data, and instruction sets leveraged by the AI agent for performing different tasks for different users. This is useful when the AI agent filters through different databases to access or refrain from accessing subsets of those databases. As previously expressed, this allows for AI agents to require less computational power and complexity since less data is accessed/transferred when performing different tasks for different users depending on which user data, context data and/or instruction sets are necessary for performing a task for a user.

Returning now to FIG. 8, interface 800 may include a user history section 820, which illustrates information regarding a user that has provided feedback during a testing session or other interaction with the AI agent (e.g., during runtime). For example, in the embodiment illustrated in FIG. 8, the user history section 820 specifies that Bob, who is a Lead Engineer at the company, has completed the testing session with the AI agent. The user history section 820 also details that during the testing session, Bob provided feedback to the AI agent suggesting that Bob disliked the actions that the AI agent took during the testing session, the feedback was provided via email (e.g., Microsoft Outlook), the AI agent performed three actions, there were 15 interactions between Bob and the AI agent, and that Bob's location is in Bengaluru, India. Of course, there are many other pieces of information (e.g., how many teaching events the user has created for that AI agent, and/or other AI agents) that could be deemed beneficial to provide in such a user history section. The principles described herein are not limited to what types of information are provided in a user interface such as the interface 800 of FIG. 8.

Figure 9:
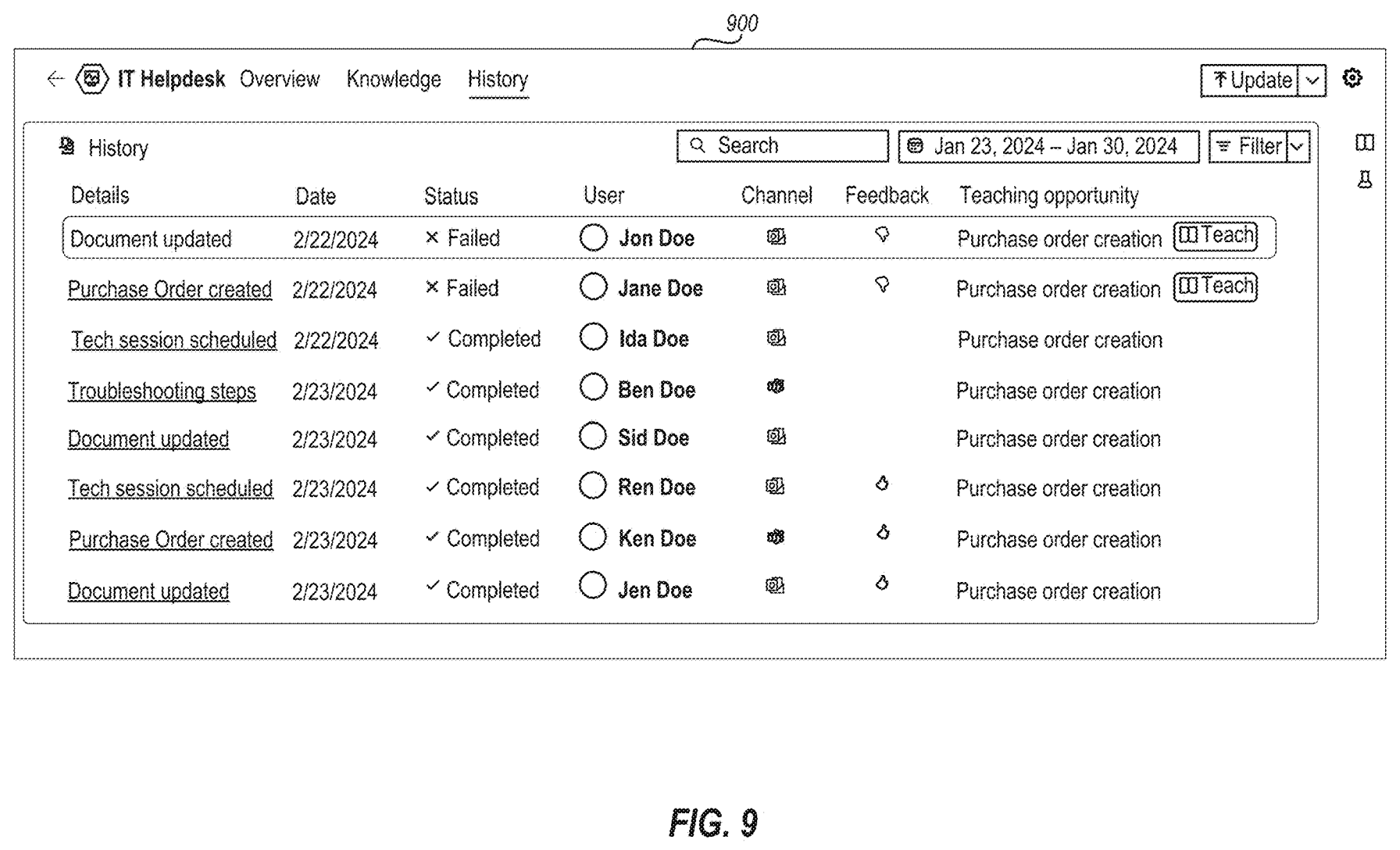
Figure 10:
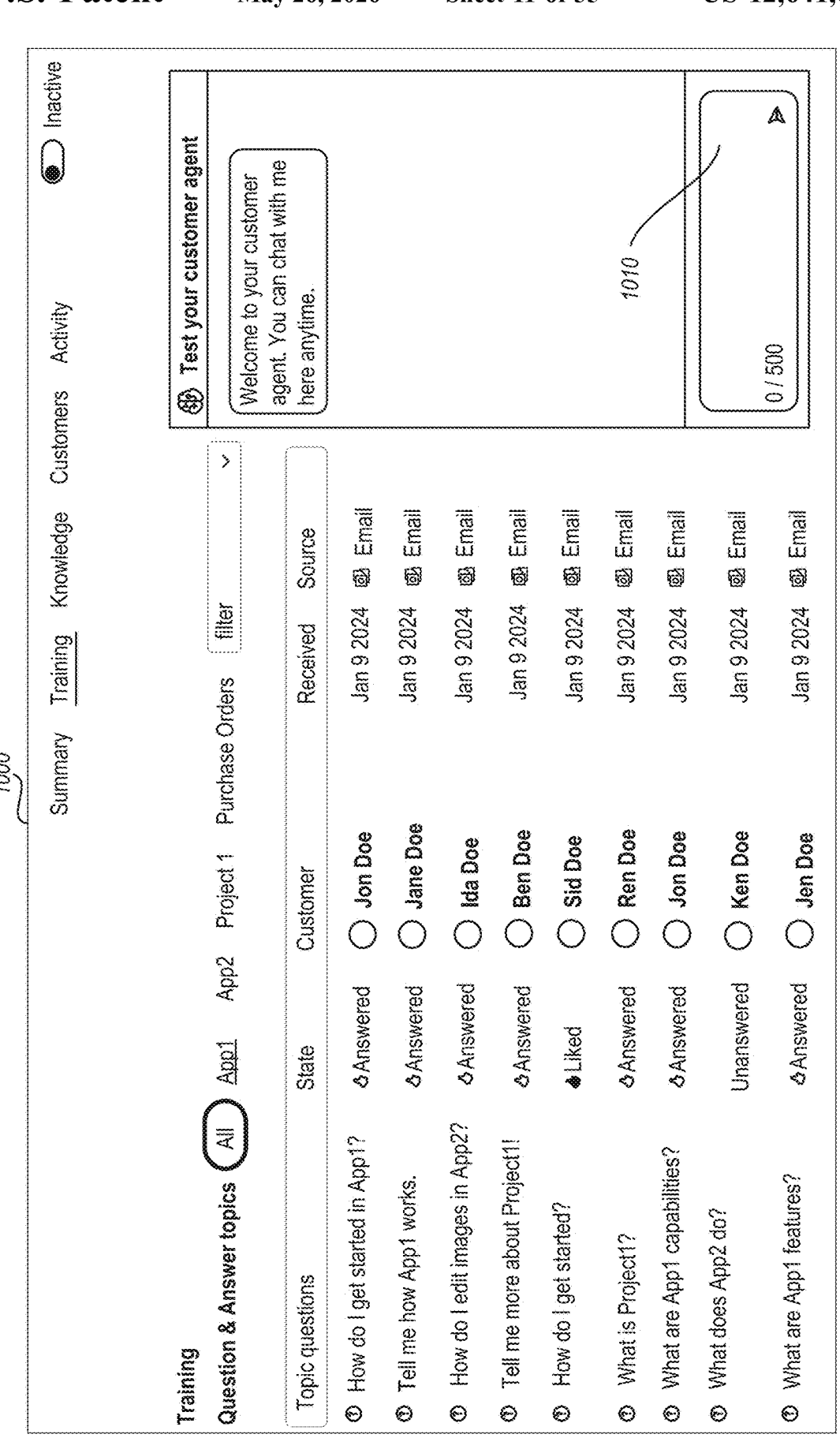
FIG. 10 illustrates an example of an interface that is usable during the interaction with and training of an AI agent.

FIGS. 9 and 10 illustrate additional interfaces 900 and 1000 that illustrate a status of actions taken by an AI agent, during runtime and/or during testing, and in which the status may include entities (e.g., users, other AI agents, and/or machine learning models) in which the AI agent interfaced, a status of completion (e.g., completed, failed, or currently processing), a date of processing or completion, a channel or source involved in the interaction (e.g., email, messaging, social media, etc., possibly represented by corresponding icons), a status of feedback received (e.g., positive feedback, negative feedback, feedback prompt answered, feedback prompt unanswered, etc.), and/or a description of the action/interaction.

The interfaces 900 and 1000 may also include controls for modifying the manner in which the AI agent responds during future actions. These controls may include a selectable control (e.g., the Teach control), a hyperlink for a listed action, or other controls that, when selected, trigger the generation of input fields (e.g., input field 1010 illustrated in FIG. 10) for receiving user instructions to modify the AI agent behavior for a future action. This allows users to fine-tune how the AI agent performs future actions, and also allows users to assist AI agents in correcting their behavior and/or future actions when the status for a corresponding action is that the action failed.

The teaching interfaces 900 and 1000 may include filter controls for identifying past interactions of the AI agent and/or to identify listings of actions that may be performed.

Attention is now directed to FIG. 11, which illustrates a flow chart 1100 of acts (act 1105, act 1110, act 1115, act 1120 and act 1125) associated with methods for facilitating management of interactions and training for AI (artificial intelligence) agents, such as with the interfaces just described.

As shown, the acts include a system identifying one or more interactions with an AI agent (act 1105), parsing the interactions and generating a summary and a display of the interactions (act 1100), and generating and displaying a training ground interface that includes a display of different summaries for different interactions, the display including an interactive element for enabling a user to modify how the AI agent will handle a future interaction relative to how the AI agent interacted during one of the different interactions summarized in the display of different summaries (act 1115). The summary for each interaction may include a topic associated with the interaction, a state of an AI agent response associated with the interaction, a customer feedback metric associated with the AI agent response, and/or a source or location of the interaction, as described.

The acts may also include receiving user input entered at the interactive element, where the AI agent uses the user input to modify how the AI agent will behave during future interactions (act 1120). Further, the acts may also include displaying a corresponding memory for the interaction(s) (act 1125).

Although not shown, the acts may also include converting the user instructions into one or more rules applied by the AI agent during the future interaction and/or for converting the user instructions into training data that is applied by the AI agent to modify one or more weights or parameters used by the AI agent when determining how to process a prompt during the future interaction.

The acts may also include providing a filter for sorting interactions or topics associated with input prompts presented to the AI agent and that are obtained from the knowledge base of the AI agent.

The methods also include providing status information for questions posed to the AI agent, which comprise one form of AI agent interactions, and wherein the state of the AI agent response indicates whether a question was answered or not answered. The state information may also indicate whether the customer feedback metric comprises an icon and/or label that reflects whether the customer was satisfied or unsatisfied with the AI agent response. The feedback may be based on input detected from a reply to an electronic communication presented to the customer with the AI agent response.

Attention will now be directed to FIG. 12. FIG. 12 illustrates a flowchart of acts (act 1205, act 1210, act 1215, act 1220, act 1225 and act 1230) associated with a method 1200 that can be implemented by a computing system (e.g., computing system 110 of FIG. 1) and is configured for managing AI agent interactions with electronic communications (e.g., emails) that are displayed at an electronic communications interface.

A first illustrated act is provided for identifying an AI agent and AI agent skills that the AI agent can utilize when interacting with different customers (act 1205). For example, in some embodiments, customers are able to interact with a variety of different AI agents that have different skills, or in other words specialize in different tasks. In another embodiment, customers are able to interact with their own specialized AI agent that is capable of performing a variety of tasks in particular ways according to preferences of their customer. In some embodiments, examples of AI agent skills include the ability to answer customer questions, fulfill customer purchase orders, schedule meetings, and/or generate electronic communications (e.g., emails, texts, messages, notifications, etc.).

Next, the method 1200 includes identifying a plurality of customers that the AI agent(s) is capable of interacting with while utilizing one or more AI agent skills (act 1210). Some customers may have permissions for utilizing the AI agent(s) for a wide variety of AI agent skills, while other customers may have more limited permissions, only allowing them to access a limited variety of AI agent skills.

In one embodiment, different levels of permissions for utilizing AI agent(s) for different levels of AI agent skills may be determined based on seniority at a company. For example, suppose a that manager at a company has a high level of permission that allow the manager to utilize the AI agent to perform many AI agent skills, such as answering questions, fulfilling purchase orders, scheduling meetings, generating electronic communications, etc. On the other hand, suppose that an employee of that manager has a lower level of permission, such that the employee can only utilize the AI agent to answer questions and generate electronic communications.

In another embodiment, different levels of permissions for utilizing AI agent(s) for different AI agent skills may be determined based on different tiers of monthly subscriptions. For example, suppose that a first customer pays for a high tier of monthly subscription. In this case, the first customer is given permissions to utilize many different AI agent skills. On the other hand, suppose that a second customer pays for a lower tier of monthly subscription. In this case, the second customer is only given permissions to utilize a more limited number of AI agent skills, or alternatively, the same amount of AI agent skills as the first customer, but a more limited version of each of those AI agent skills.

Next, the method 1200 includes generating a first interface that identifies the plurality of customers and that is displayed with interactive permission controls for each identified customer (act 1215). The interactive permission controls for each identified customer are configured to receive user input for selectively enabling and/or disabling AI agent interactions by the AI agent with a corresponding identified customer using the one or more Agent skills.

Figure 13:
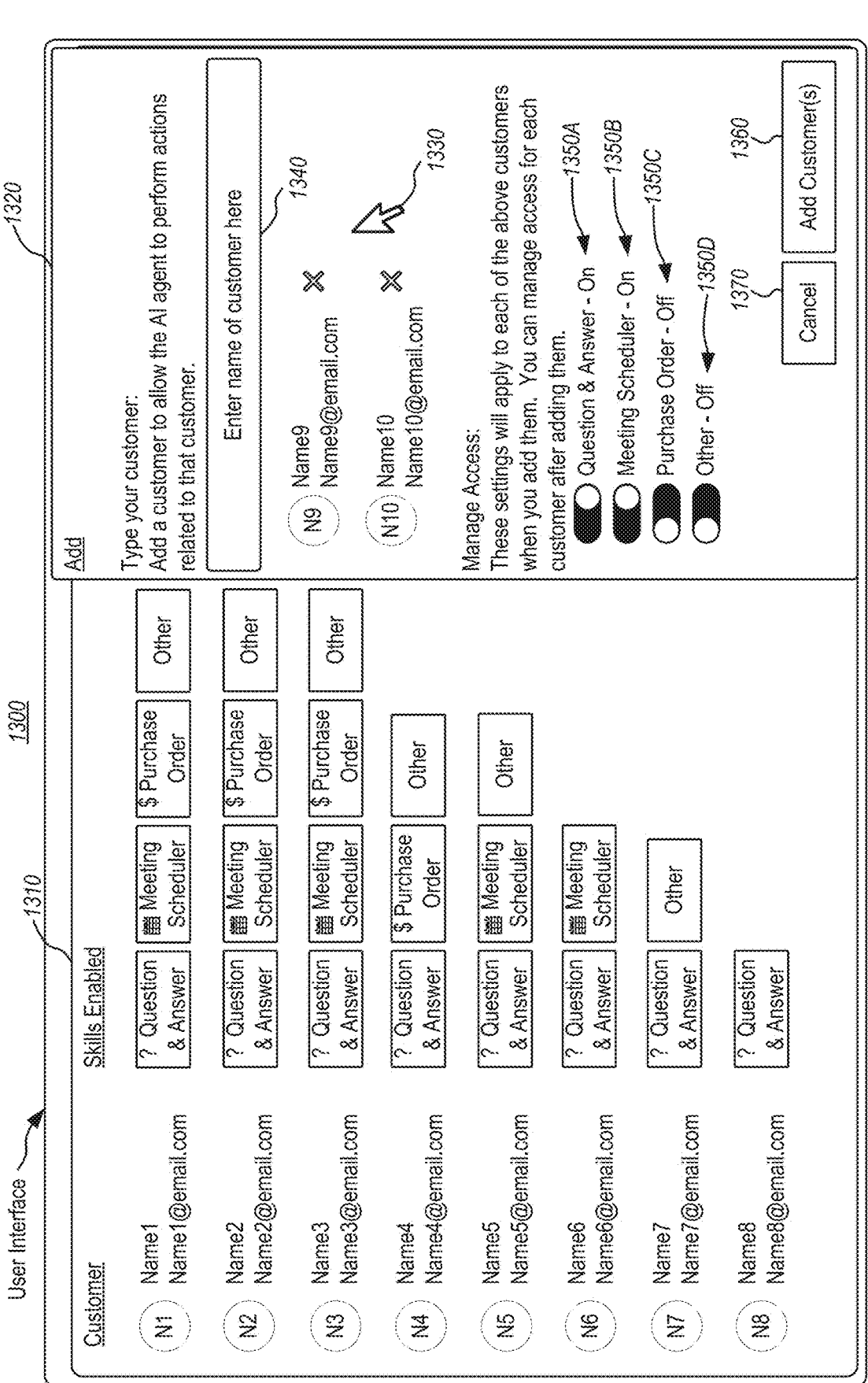
FIG. 13 illustrates an example user interface in which a user manages a plurality of customers and their access to AI agent(s) and AI agent skills.

For purposes of explanation, FIG. 13 will now be described in tandem with FIG. 12. FIG. 13 illustrates a user interface 1300 that includes a first interface 1310, which is an example of the first interface described with respect to act 1215 of FIG. 12. As illustrated in FIG. 13, the first interface 1310 includes a display of a list of customers and corresponding AI agent skills that are enabled for use for those customers. For example, some customers have higher levels of permissions (i.e., have access to more AI agent skills), whereas some customers have lower levels of permissions (i.e., have access to fewer AI agent skills). Upon selecting various skill visualization objects (e.g., via selector tool 1330), the user may be presented with options (not illustrated in FIG. 13) to further enable or disable one or more AI agent skills for a particular customer.

Returning back to FIG. 12, method 1200 also includes various optional steps. For example, based on user interaction with the interactive permission controls, AI agent interactions involving one or more of the AI agent skills by the AI agent for a particular customer identified of the plurality of customers may be enabled (act 1220) or disabled (act 1225).

Further, a second interface may be generated, the second interface including a search field for searching for (e.g., via name and/or email identification) one or more new customers to add to the list of the plurality of customers (act 1230). For example, in FIG. 13, the user interface 1300 further includes a second interface 1320, which includes a search field 1340 in which the user can enter text for searching for new customers. In the example illustrated in FIG. 13, the user has searched for and selected new customers "Name9" and "Name10".

There are also various interactive controls displayed in the second interface 1320. For example, if the user wishes to remove a selected new user from being selected, the user may use the selector tool 1330 to select the corresponding "X" icon to the right of the displayed selected new customer names. Further, before adding the selected new customers to the previous list of the plurality of customers in the first interface 1310, the user may select various selectable toggle icons 1350A through 1350D for selecting which AI agent skills for the AI agent(s) the new customers will have permissions to utilize.

For example, in the embodiment illustrated in FIG. 13, the selectable toggle icon 1350A is switched to the ON-position to enable the new customers to have access to a "Question & Answer" skill of the AI agent(s). The selectable toggle icon 1350B is switched to the ON-position to enable the new customers to have access to a "Meeting Scheduler" skill of the AI agent(s). The selectable toggle icon 1350C is switched to the OFF-position to disable the new customers from having access to a "Purchase Order" skill of the AI agent(s). The selectable toggle icon 1350D is switched to the OFF-position to disable the new customers from having access to an "Other" skill of the AI agent(s).

The user may use the selector tool 1330 to select a control 1370 for cancelling the addition of the selected new customers. However, the user may also use the selector tool 1330 to select control 1360 for adding the selected new customers to the list of the plurality of customers of the first interface 1310, and in turn give those selected new customers access to the AI agent skills that had their corresponding toggle switches in the ON-position before the control 1360 was selected.

Attention will now be directed to FIG. 14, which illustrates a flowchart of acts (act 1405, act 1410, act 1415, act 1420, act 1425, act 1430 and act 1435) associated with a method 1400 that can be implemented by a computing system (e.g., the computing system 110 of FIG. 1) and is configured for managing access of channels for interacting with AI agent(s).

Figure 15:
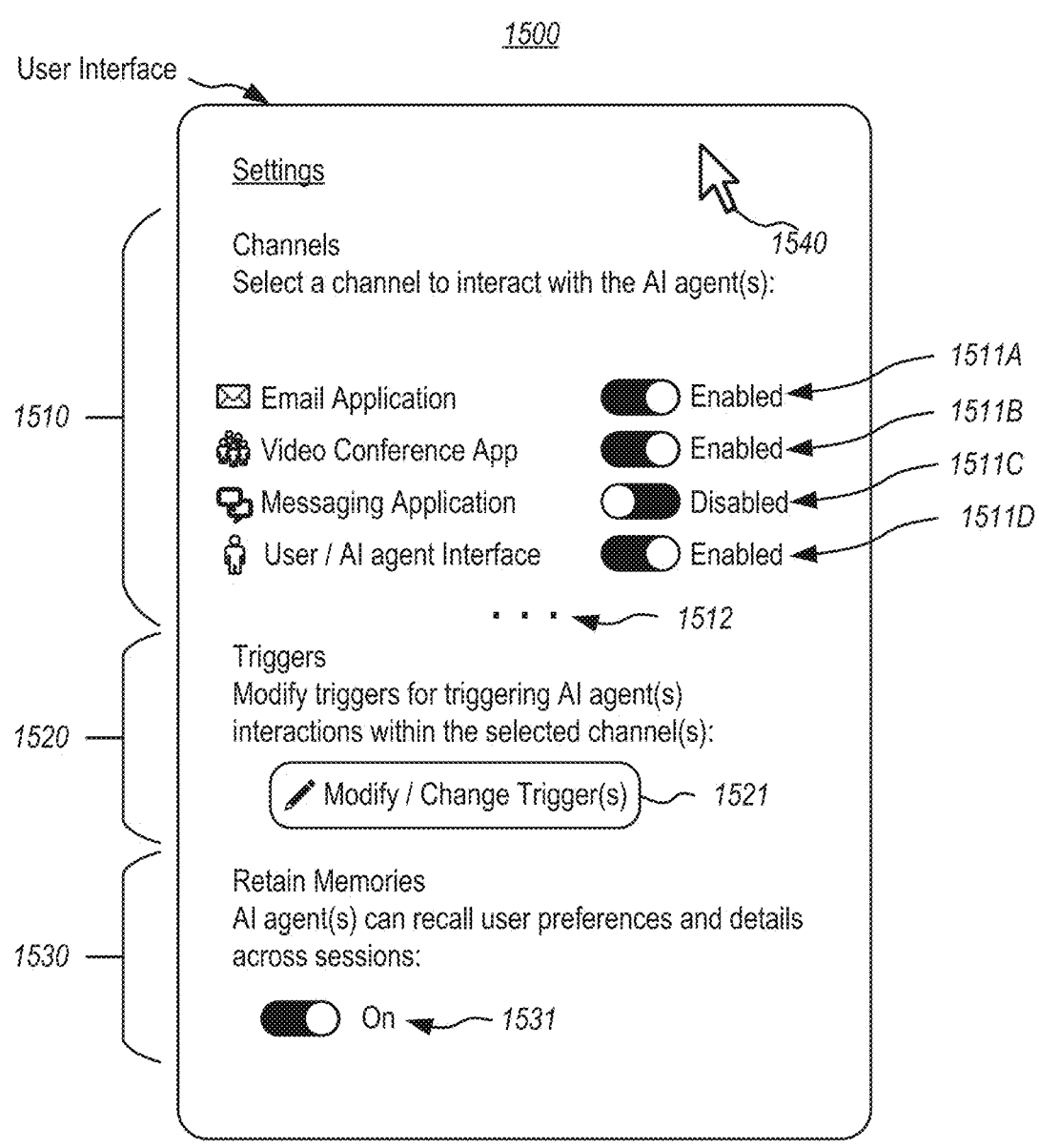
FIG. 15 illustrates an example user interface in which a user manages access of channels for interacting with AI agents.

A first illustrated act is provided for generating and displaying an interface including selectable controls for enabling and disabling channel access for each of a plurality of channels in which an AI agent is capable of being active (act 1405). For example, FIG. 15 illustrates a user interface 1500 that includes a channel setting area 1510. The channel setting area 1510 includes selectable controls 1511A through 1511D for enabling and disabling channel access for various channels in which an AI agent is capable of being active. Specifically, the selectable control 1511A corresponds to an email application, selectable control 1511B corresponds to a video conference application, selectable control 1511C corresponds to a messaging application, and selectable control 1511D corresponds to a user/AI agent interface application.

The method 1400 further includes displaying on the interface selectable controls for modifying triggering events for triggering AI agent interactions within one or more of the plurality of channels (act 1410). For example, as illustrated in FIG. 15, the user interface 1500 further includes a trigger setting area 1520 that includes a selectable control 1521 for modifying and/or changing what triggering events trigger AI agent interactions within the selected channels from the channel setting area 1510.

The method 1400 further includes displaying on the interface a memory control for retaining memories related to interactions of the AI agent in one or more of the plurality of channels (act 1415). For example, as illustrated in FIG. 15, the user interface 1500 further includes a memory control setting area 1530, which includes selectable control 1531 for enabling and disabling the retainment/creating of memories based on AI agent interactions within the selected channels from the channel settings area 1510.

The method 1400 further includes various optional steps, including, in response to detecting a user input interaction with the memory control, enable (act 1420) or disable (act 1425) the retaining of memories related to interactions of the AI agent in one or more of the plurality of channels. Further, in response to detecting user input interaction with one or more of the selectable controls for modifying triggering events, the interface further displays a list of modifiable predetermined triggering events for triggering AI agent interactions within one or more of the plurality of controls (act 1430). Additionally, in response to detecting user input interaction with one or more of the selectable controls for enabling and disabling channel access for a particular channel, the interface further updates to reflect the changes in the enabling and disabling of channel access for the particular channel (act 1435).

Accordingly, the principles described herein allow for intuitive management of AI agents, AI agent skills, customer access to AI agents and AI agent skills, and access of channels for interacting with AI agents.

Figure 16A:
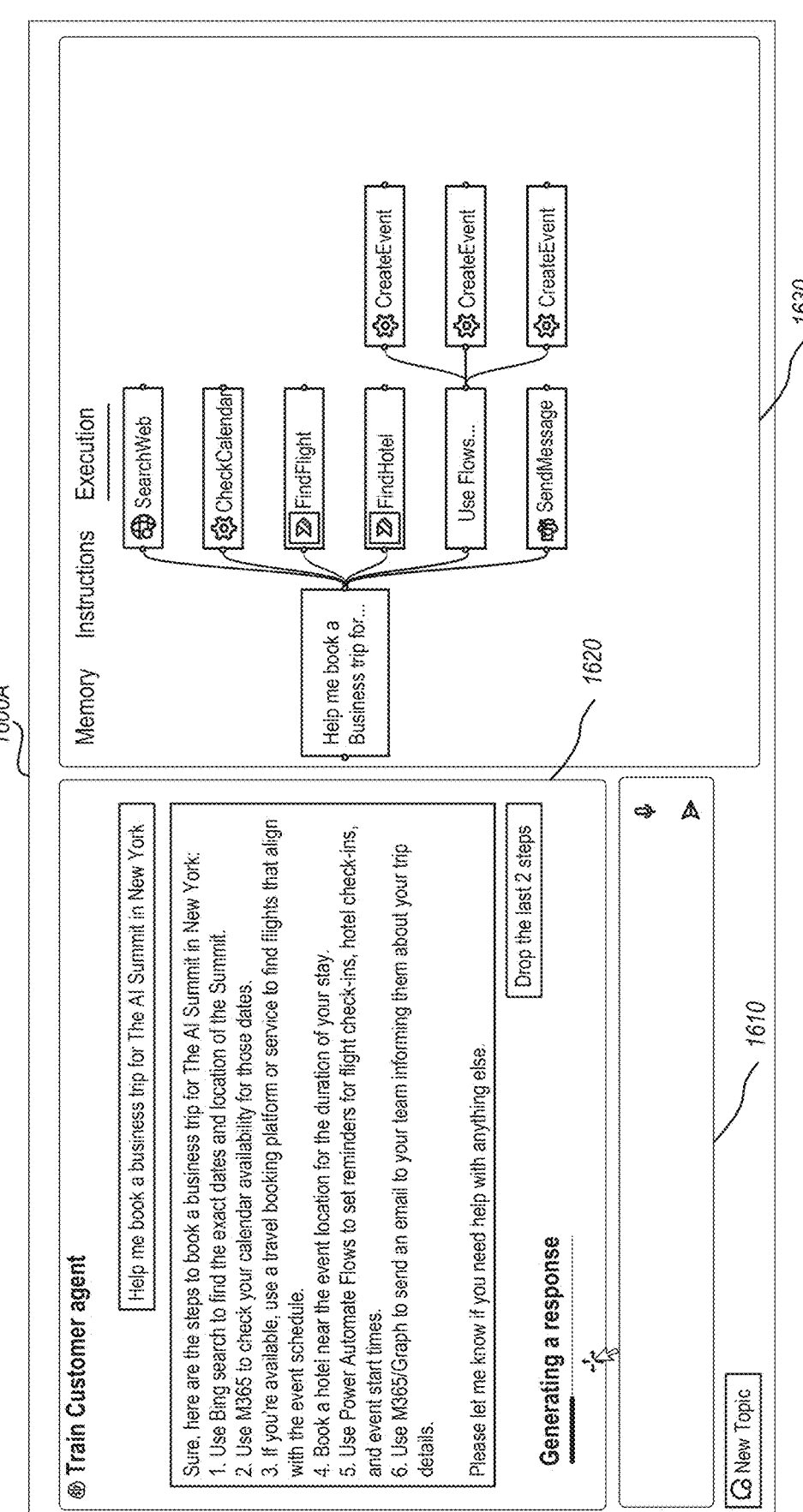
FIG. 16A illustrates an interface for facilitating interaction with and task processing by an AI agent.
Figure 16B:
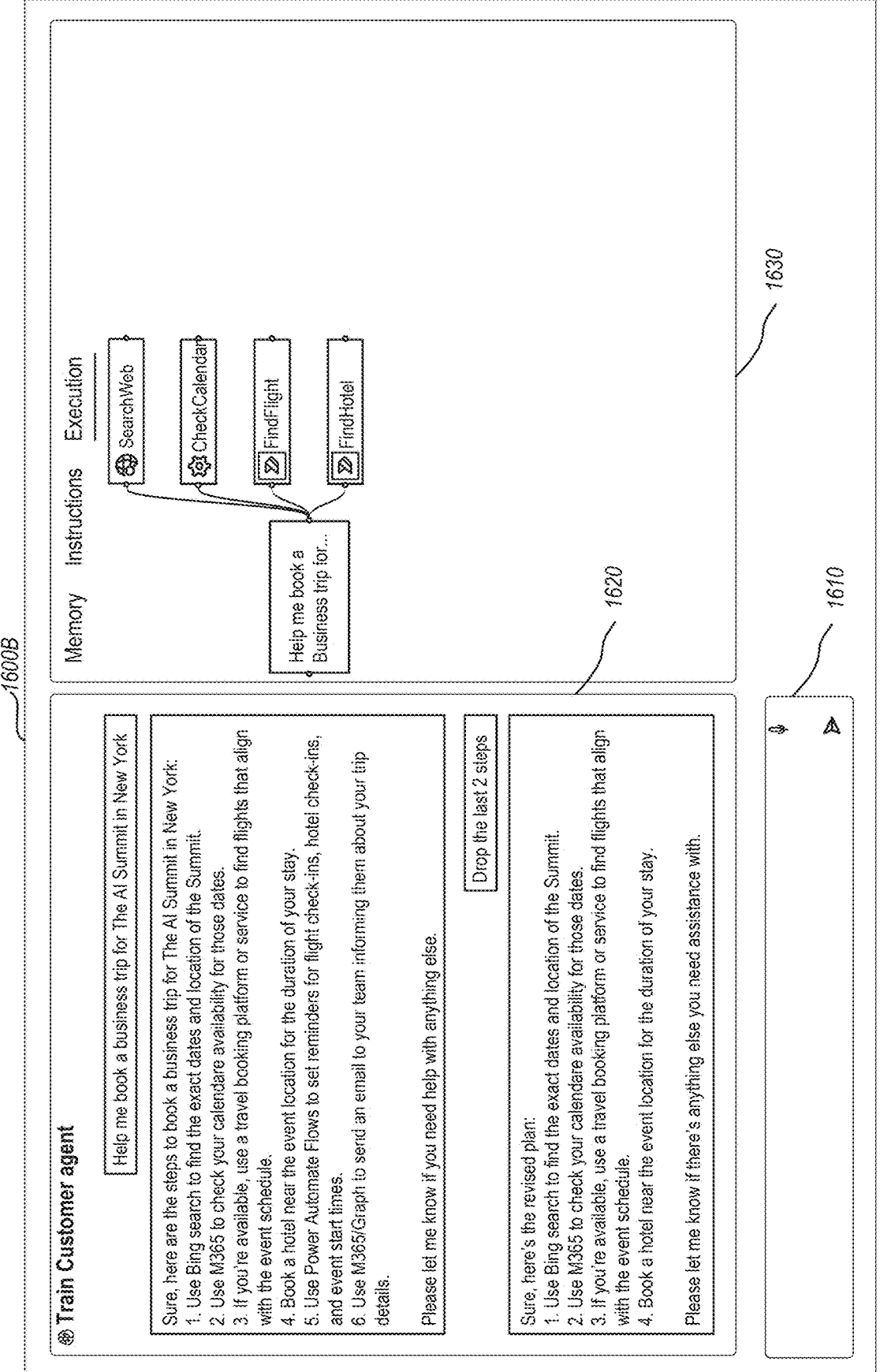
FIG. 16B illustrates an interface for facilitating interaction with and task processing by an AI agent.
Figure 16C:
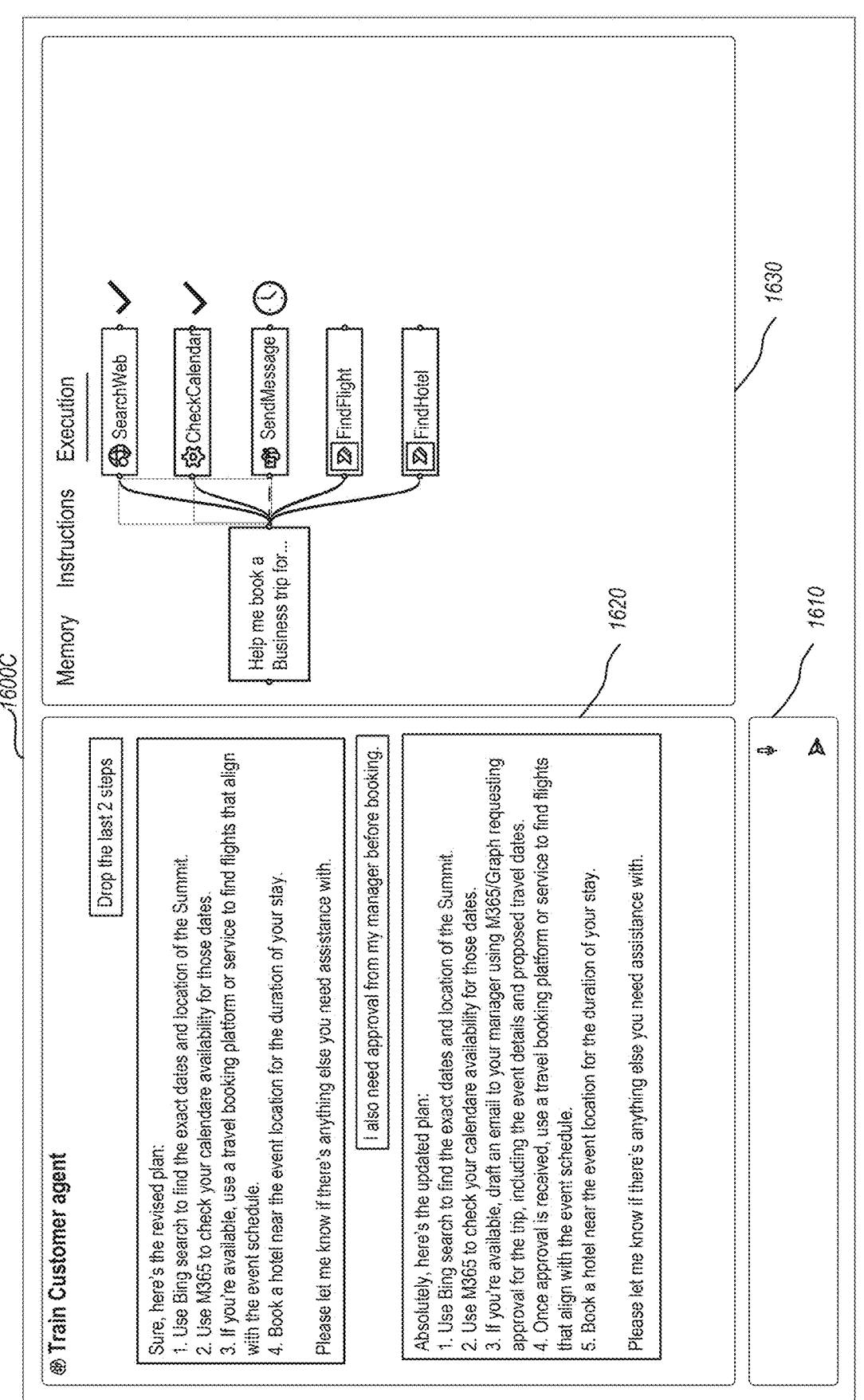
FIG. 16C illustrates an interface for facilitating interaction with and task processing by an AI agent.

Attention is now directed to FIGS. 16A-16C, which illustrate respective interfaces 1600A through 1600C, and FIG. 17, which illustrates a flow diagram 1700 corresponding to embodiments for further facilitating management of interactions and training for AI (artificial intelligence) agents.

As shown, the interfaces 1600A through 1600C include instruction fields (e.g., field 1610) configured to receive user input comprising instructions associated with actions or tasks to be performed by the AI agent and that are processed by the AI agent to identify a set of subtasks for a processing flow to be performed by the AI agent while performing the instructed action/task.

The interfaces 1600A through 1600C also include a dialog frame (e.g., frame 1620) that identifies previous instructions and AI agent responses that are generated in response to the instructions and that identify the subtasks to be performed by the AI agent.

For example, as illustrated in FIG. 16A, suppose that the user entered the prompt "Help me book a business trip for the AI Summit in New York" into the instruction field 1610. In this case, the AI agent lists in the dialog frame 1620 a plurality of subtasks to be performed by the AI agent in order to fulfill the request from the user. In the example embodiment illustrated in FIG. 16A, these subtasks include performing a web search to find exact dates and location of the event, using software (e.g., Microsoft 365) to check the user's calendar for availability for the dates of the event, using a travel booking platform/service to find flights corresponding to the event schedule, booking a hotel near the event location, using software to set reminders flight and hotel check-ins and event start times, and using software to send an email to the user's team informing them about the trip details.

The interfaces 1600A through 1600C also include a processing flow window (e.g., window 1630) with a graph of a processing flow that identifies the action or task requested and corresponding subtasks that have been identified to be performed as part of completing the requested tasks. For example, in the embodiment illustrated in FIG. 16A, the processing flow window 1630 illustrates a graph of a processing flow that identifies (e.g., via visualizations) each of the actions, tasks and/or subtasks corresponding to the request from the user.

In the interface 1600B of FIG. 16B, the user has entered instructions (thereby creating a teaching event, or a portion of a teaching event) into the instruction field 1610, instructing the AI agent to "drop the last 2 steps". The AI agent then responds with a revised plan for fulfilling the user's request, which is presented to the user via the dialog frame 1620. Additionally, upon creating the revised plan for fulfilling the user's request, the AI agent also updates the corresponding processing flow window 1630, deleting the visualizations corresponding to the last two subtasks for fulfilling the request.

In the interface 1600C of FIG. 16C, the user has entered instructions into the instruction field 1610, informing the AI agent that the user also needs approval from their manager before booking. In response, the AI agent again revises the plan for fulfilling the user's request, adding an additional subtask of acquiring approval from the user's manager (e.g., via email or a messaging application). The revised plan is presented to the user via the dialog frame 1620. Additionally, upon creating the revised plan, the AI agent also updates the corresponding processing flow window 1630, adding a new visualization that corresponds to sending a message requesting approval to the user's manager.

Of course, as previously expressed, the AI agent is capable of using the interactions with the user to modify/update some user data, context data, and instruction sets, while refraining from using the interactions with the user to modify/update other user data, context data and instruction sets. This allows the AI agent to require less computational power and complexity since the AI agent does not need to consider all data in order to perform specific tasks for specific users.

Accordingly, the principles described herein allow users to intuitively visualize and manage the subtasks that an AI agent performs in order to fulfill user requests, thereby allowing users to fine-tune the AI agent and create teaching events for modifying AI agent future behavior.

Attention will now be directed to the flow diagram 1700 of FIG. 17. The methods performed with the interfaces 1600A through 1600C of FIGS. 6A-6C include generating and displaying an interface, such as these, for training an AI agent with an instruction input field for receiving user instructions (act 1705). The methods also include detecting user input entered at the instruction input field and parsing the user input comprising user instructions to identify a task to be performed by the AI agent (act 1710).

The methods also include causing the task to be split into a plurality of subtasks to be performed by the AI agent (1715). The AI agent may invoke rules and memories of the AI agent knowledge base and machine learning models (e.g., an LLM) configured to generate subtasks that can be used to perform the requested tasks.

The methods also include displaying a dialog frame that presents the user instructions separately from the instruction input field along with an AI agent response that identifies the subtasks (act 1720) and displaying a graph that visually identifies a processing flow of the subtasks and that dynamically updates the processing flow to reflect a status of progress for the AI agent performing the subtasks (act 1725), as shown in the illustrated interfaces.

The methods may also include displaying status indicators for the subtasks that visually distinguish which subtasks have completed processing by the AI agent and which subtasks are currently being processed by the AI agent (act 1730). The status indicators may comprise icons and/or labels displayed with the subtasks, with at least two different types of icons being displayed with at least two different subtasks to visually distinguish different states of processing by the AI agent for the at least two different subtasks.

The methods may also include detecting new user input entered in the input field that, when entered, is used by the computing system to cause the AI agent to modify the subtasks and which is further used to trigger a modification to a manner in which the AI agent will respond during a future interaction with a user based on new user instructions processed by the AI agent (act 1735). This may be done by converting the new user input into one or more rules applied by the AI agent during the future interaction and/or converting the new user input into training data that is applied by the AI agent to modify one or more weights or parameters used by the AI agent when determining how to process a prompt during the future interaction.

Attention will now be directed to FIG. 18. FIG. 18 illustrates a flowchart of acts (act 1805, act 1810, act 1815, act 1820, act 1825, act 1830, act 1835, act 1840 and act 1845) associated with a method 100 that can be implemented by a computing system (e.g., computing system 110 of FIG. 1) and is configured for managing AI agent interactions with electronic communications (e.g., emails) that are displayed at an electronic communications interface.

A first illustrated act is provided for parsing, via the AI agent, an electronic to determine whether the electronic communication corresponds to a new or existing request (act 1805). To give a few examples, the electronic communication could be an email, a text, a message in a messaging application, a user interaction with the AI agent, etc. While the principles described herein are capable of being applied with a wide variety of different forms of electronic communications and are by no mean limited to any specific forms of electronic communications, example embodiments described herein will largely be discussed as being related to email communications.

In response to determining if the electronic communication corresponds to a new or existing request, the AI agent determines a set of actions to be performed in response to the request (act 1810). For example, in one embodiment, if the request corresponds to an instruction to answer a question included in the electronic communication, the AI agent determines that the AI agent should understand who sent the question and their relationship to the user, figure out where to find the answer to the question (e.g., the internet, an internal company memo, previous electronic communications, etc.), generate an email response including text answering the question directed to the person who sent the question, perhaps acquire authorization from the user before sending the email response, and then send the email response.

In another embodiment, if the request corresponds to an instruction for scheduling a meeting between the user and the person who requested the meeting, the AI agent determines that the AI agent should first check the user's schedule to find appropriate time slots for such a meeting, generate an email response including selectable time slot options and text directed to the person who requested the meeting, and send the email response to the person who requested the meeting. When the person who requested the meeting responds with an appropriate time slot (e.g., they selected an appropriate time slot option presented in the email response), the AI agent determines that the AI agent should schedule the meeting in the user's calendar, or send a notification to the user asking the user if they want to accept the meeting.

After determining a set of actions to be performed in response to the request, the AI agent determines whether any of the actions in the set of actions has already been performed (herein referred to as a "first group of actions") (act 1815). In some embodiments, an electronic communication may include a request that may be fulfilled by performing actions that have already been performed. For example, an electronic communication can include a request for answering a question that the AI agent has already answered. In this case, the AI agent may determine that several actions that may be performed in order to fulfill the request have already been performed, and then the AI agent may not need to perform those actions again, thus saving computational power and increasing the speed by which the AI agent can fulfill the request.

The AI agent also determines which actions in the set of actions have not yet been performed. Specifically, the AI agent determines which actions in the set of actions that have not yet been performed require additional user input or authorization before the AI agent can perform the action (herein referred to as the "second group of actions") (act 1820), and which actions in the set of actions that have not yet been performed do not require additional user input or authorization before the AI agent can perform the action (herein referred to as the "third group of actions") (act 1825).

In some embodiments, determining which actions need user input or authentication before the AI agent performs those actions may be based on user preference. For example, the user may prefer that the AI agent performs some actions automatically without any user input or authentication, such as acquiring information for answering a question, or drafting an email response. On the other hand, the user may prefer that the AI agent holds off on performing some actions until the user provides user input or authentication, such as sending a drafted email, or scheduling a meeting. The user's preferences may also change over time. Accordingly, the user may provide feedback to the AI agent on how to modify future behaviors, as will be explained later.

After determining which actions have been performed and have not been performed, and determining which actions need user input or authentication, the AI agent then generates a notification that is displayed at the electronic communication interface (act 1830). This notification identifies the set of actions with visual identifiers that visually distinguishes the set of actions. Actions in the first group of actions, actions in the second group of actions, and actions in the third group of actions may include visual identifiers that visually distinguish the groups from each other. Such visual identifiers may include icons, shapes, labels, colors, animations, sizes of visualizations representing the actions, text describing the actions etc.

In one embodiment, actions in the first group of actions may be illustrated in green, actions in the second group of actions may be illustrated in red, and actions in the third group of actions may be illustrated in blue. Alternatively, or in addition, actions in the first group of actions may be illustrated with a circle icon that is completely filled in, actions in the second group of actions may be illustrated with a circle icon that is empty or not filled in, and actions in the third group of actions may be illustrated with a circle icon that is half filled in. There are many ways that visualizations representing actions, or the actions themselves, may be visually distinguished from each other. The principles described herein are not limited to which particular visual identifiers are used in the notification displayed at the electronic communication interface.

Along with displaying the notification on the electronic communication interface, a set of controls are displayed with the notification (act 1835). These controls include selectable controls for one or more actions in the set of actions. In one embodiment, the selectable controls include controls for causing modification to one or more actions in the set of actions. In another embodiment, the selectable controls include controls for authorizing the AI agent to perform one or more actions in the set of actions, as would be the case when there are actions that have not yet been performed but that require additional user input or authorization before the AI agent can perform the one or more actions (i.e., the second group of actions).

When the AI agent performs one or more actions in the set of actions, the AI agent generates (and displays on the electronic communications interface) a report notification regarding what one or more actions the AI agent has performed, and what actions remain to be performed (act 1840). The report notification also includes selectable controls for providing user feedback to the AI agent (act 1845).

In some embodiments, the selectable controls include controls for modifying the behavior or performance protocols of the AI agent in relation to the one or more actions performed by the AI agent in the report notification. In other embodiments, the selectable controls include controls for modifying the future behavior or future performance protocols of the AI agent in relation to future actions similar to the one or more actions performed by the AI agent in the report notification.

Figure 19:
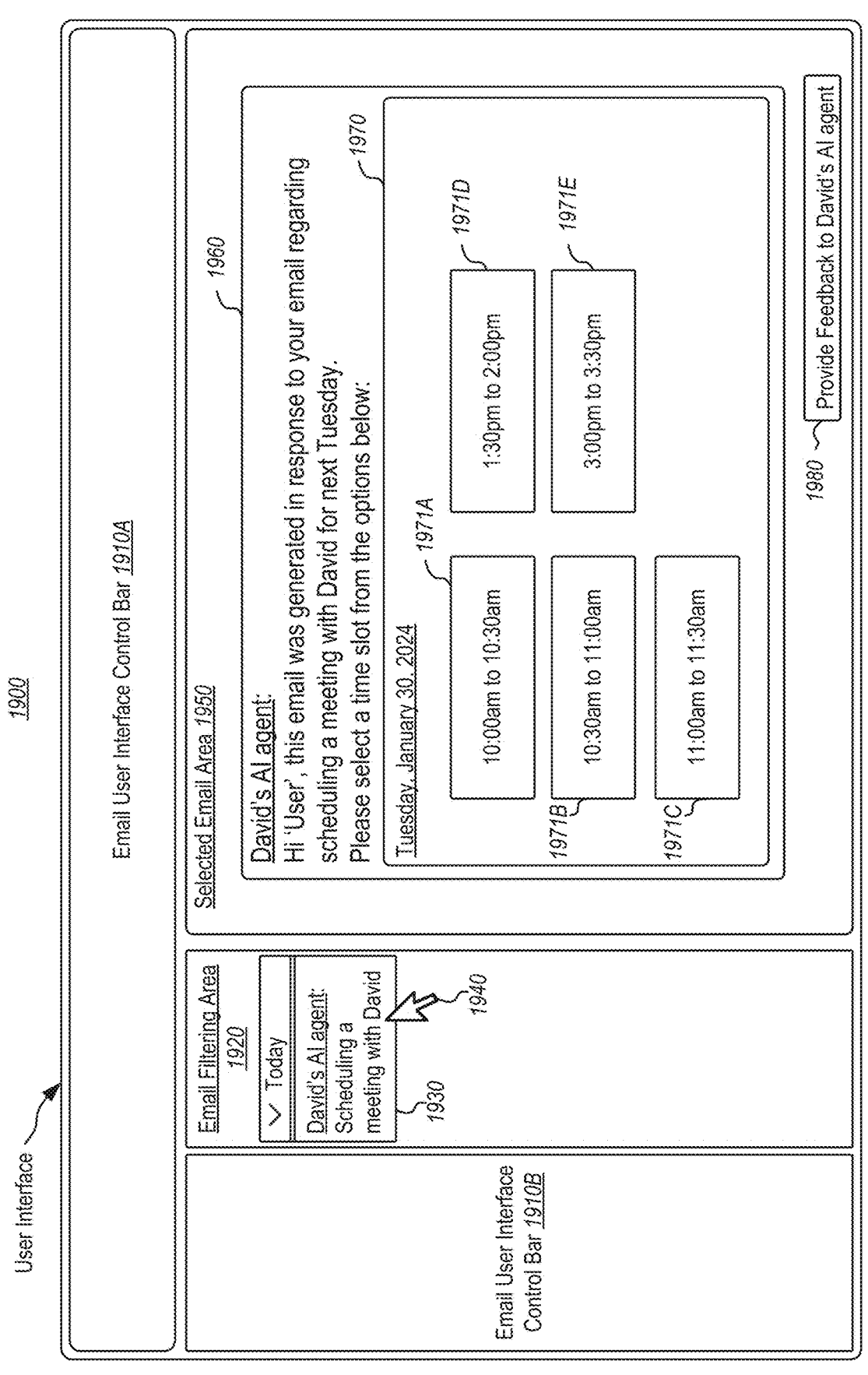
FIG. 19 illustrates an example user interface in which a user receives an electronic communication from an AI agent.

Attention will now be directed to FIG. 19, which shows an example user interface 1900 in which, in response to receiving an email from the user regarding scheduling a meeting with "David" (i.e., someone other than the user), an AI agent belonging to a "David" responds to the user in the form of an email containing selectable controls for scheduling an appointment with "David".

The user interface 1900 includes various Email User Interface Control Bars 1910A and 1910B, each of which may include various selectable controls with which the user may interact. The user interface 1900 further includes an Email Filtering Area 1920, which represents an email inbox for the user. For example, the Email Filtering Area 1920 is illustrated in FIG. 19 as including email visualization 1930, which represents an email that the user received, and may be interacted with via selector tool 1940.

In the embodiment illustrated in FIG. 19, the email visualization 1930 represents an email having been received by the user, the email having been sent by "David's AI agent", and having a subject label reading, "Scheduling a meeting with David". For purposes of the example embodiment illustrated in FIG. 19, suppose that the user had previously sent an email to David expressing that the user would like to schedule a meeting with David for next Tuesday, Jan. 30, 2024. In response, David's AI agent generated and sent to the user (perhaps with or without David's Authorization) the email response corresponding to the email visualization 1930. In the embodiment of FIG. 19, the user has used the selector tool 1940 to select the email visualization 1930. In response, an enlarged email visualization 1960 containing additional information regarding the email represented by the email visualization 1930 is displayed in a Selected Email Area 1950 of the user interface 1900.

As illustrated in the enlarged email visualization 1960, a message from David's AI agent is displayed, reading, "Hi 'User', this email was generated in response to your email regarding scheduling a meeting with David for next Tuesday. Please select a time slot from the options below:". The enlarged email visualization 1960 further includes a selectable options area 1970, which contains various selectable time slot buttons 1971A through 1971E corresponding to time slots on Tuesday, Jan. 30, 2024, that David is available for meeting.

For purposes of explanation, suppose that in order to generate the email corresponding to the enlarged email visualization 1960, David's AI agent had performed the action of scanning through David's calendar to find appropriate time slots in which David would be available for meeting. Upon finding the appropriate time slots for the meeting, David's AI agent generated a draft of the email. Then, based on David's set preferences for behavior of his AI agent, the AI agent either automatically sent the drafted email to the user, or acquired authorization from David to send the drafted email to the user.

When the user, via the selector tool 1940, selects one of the available time slot buttons 1971A through 1971E, an email response indicating a selected time slot is sent back to David. In one embodiment, this email response is then parsed/scanned by David's AI agent, and then David's AI agent performs the action of scheduling the meeting. Alternatively, again based on David's set preferences for behavior of his AI agent, David's AI agent may instead ask David if he wants the meeting scheduled for the selected time slot. Upon receiving authorization from David, David's AI then schedules the meeting. In one embodiment, if David declined the meeting, the AI agent determines that it should generate and send an email response to the user indicating that David had declined the meeting, or indicating to the user that David was actually busy at the selected time slot, and that the user should select a different time slot.

In one embodiment, upon viewing the enlarged email visualization 1960, the user may determine that David's AI agent had made some sort of error (e.g., a spelling or grammatic error, nonfunctional selectable controls, etc.), in which case the user may use the selector tool 1940 to select a selectable control 1980 for providing feedback to David's AI agent.

The feedback provided by the user may be used to modify the future behavior or protocols of David's AI agent. In another embodiment, David may have a preset preference of behavior of his AI agent for limiting who has access to modifying the behavior of David's AI agent. In this case, the user's feedback may instead be presented to David in the form of an email or other electronic communication that includes selectable controls for authorizing and/or declining modifying the behavior David's AI agent using the feedback from the user.

Figure 20A:
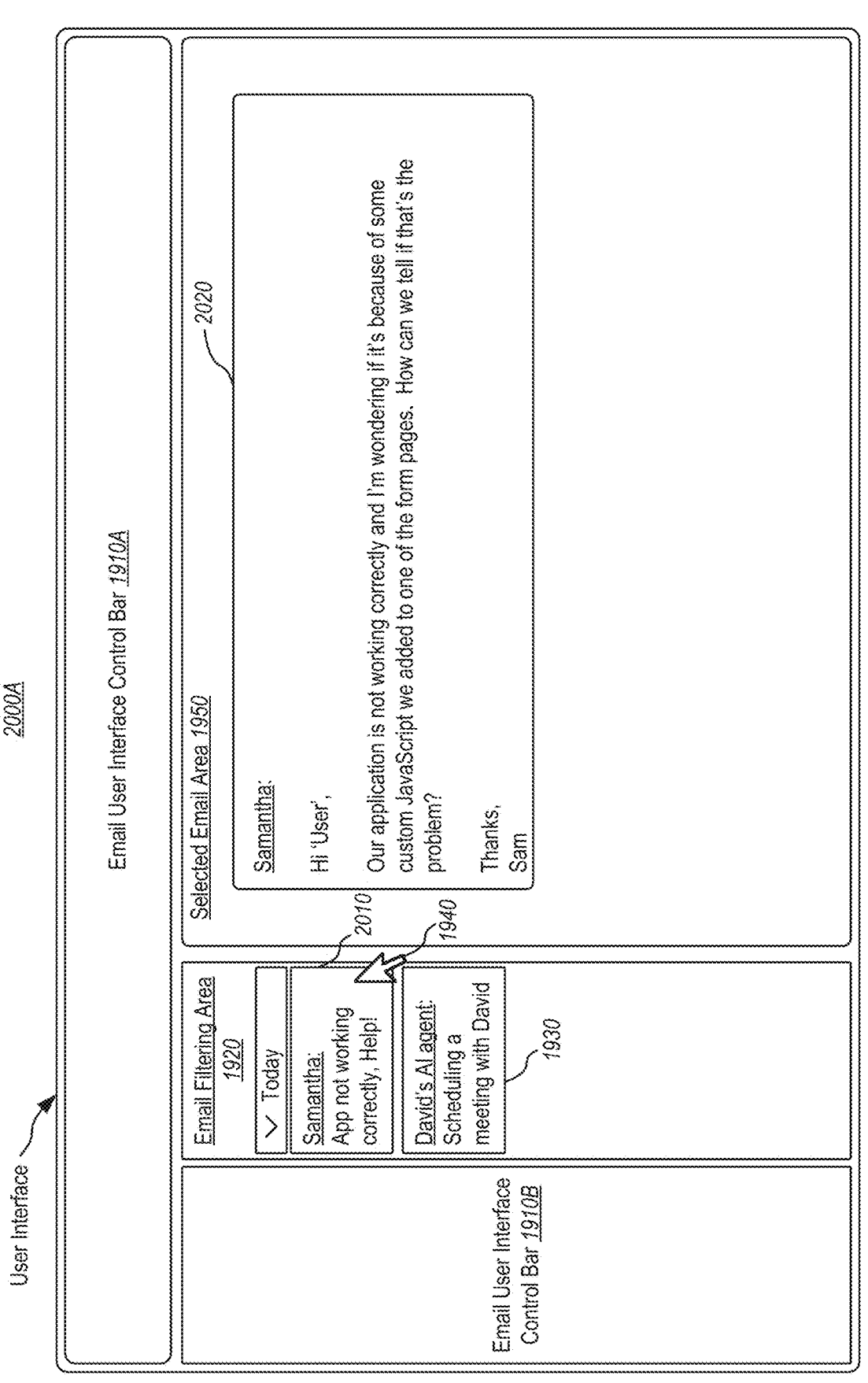
FIG. 20A illustrates an example user interface similar to the example user interface of FIG. 19, but where a user has received an electronic communication from a human, the electronic communication containing question(s)

Attention will now be directed to FIG. 20A, which shows an example user interface 2000A, which is similar to the example user interface 1900 of FIG. 19, but where the user has received an email that contains one or more questions from "Samantha". The user's AI agent parses the email from Samantha, and determines that the email contains a request for answering the one or more questions contained in the email. For purposes of simplicity, common elements between FIG. 19 and FIG. 20A (as well as FIG. 20B discussed later) will be illustrated using the same element numbers as in FIG. 19.

The email from Samantha is represented by email visualization 2010 in the email filtering area 1920. The email visualization 2010 has a subject label reading, "App not working correctly, Help!". In the embodiment illustrated in FIG. 20A, the user has used the selector tool 1940 to select the email visualization 2010. In response, an enlarged email visualization 2020 is displayed in the Selected Email Area 1950. As illustrated in the enlarged email visualization 2020, the email from Samantha includes text reading, "Hi 'User', Our application is not working correctly and I'm wondering if it's because of some custom JavaScript we added to one of the form pages. How can we tell if that's the problem? Thanks, Sam".

In order to fulfill the request for answering the one or more questions contained in Samantha's email, the user's AI agent determines that it needs to identify the question(s), find the correct answer(s) (e.g., via an internet search, scanning of internal company documents, etc.), and generate an email response containing the answers. Based on the user's AI agent's knowledge of the user's preferences, the AI agent knows to display the drafted email response to the user so that the user can provide authorization to the AI agent before the AI agent sends the email response to Samantha. An example of the display of the drafted email response is illustrated in FIG. 20B.

Figure 20B:
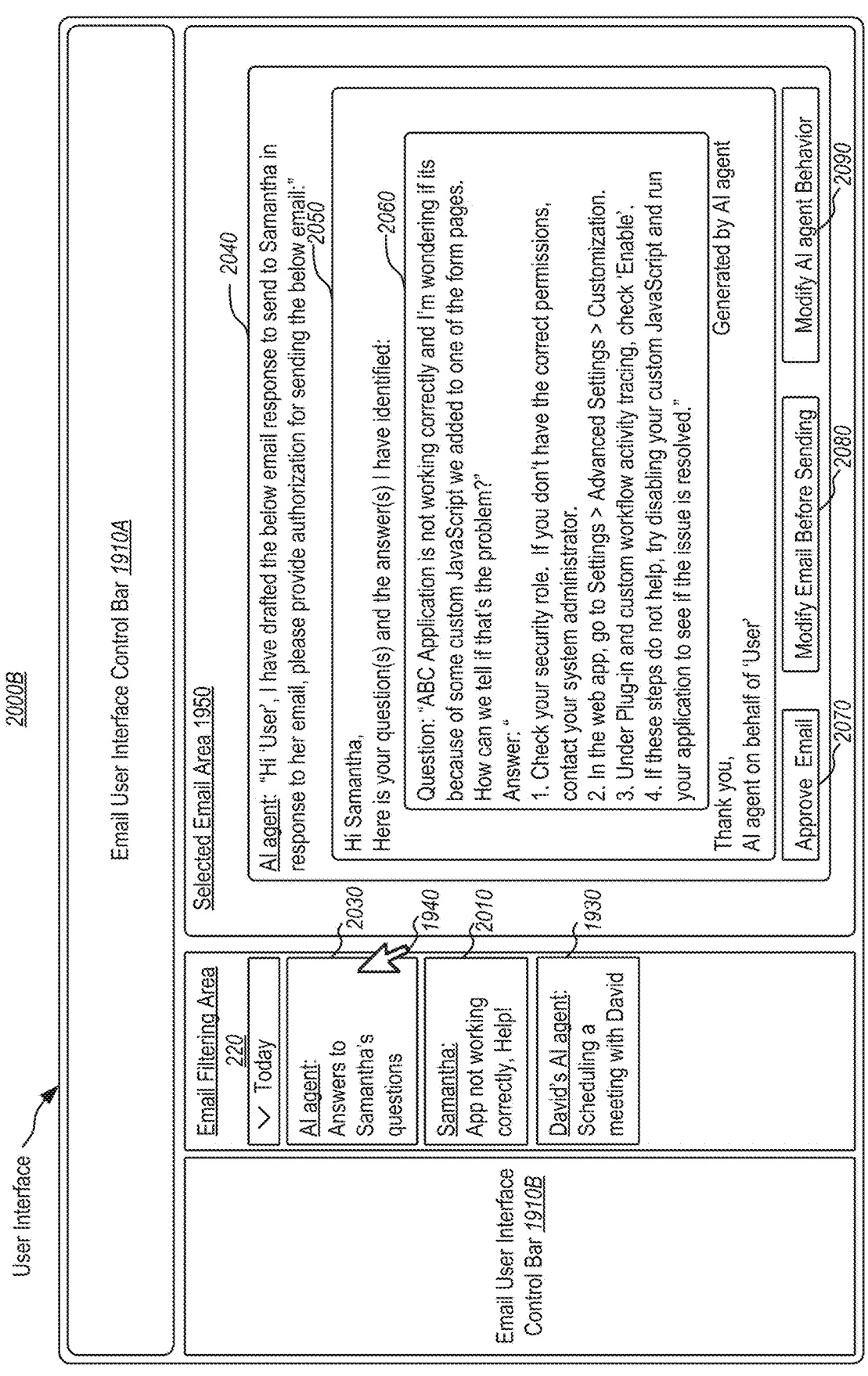
FIG. 20B illustrates an example user interface similar to the example user interface of FIG. 20A, but where the user has received an electronic communication from the user's AI agent, the electronic communication representing a drafted electronic communication response containing an answer(s) to the question(s) from the electronic communication from the human of FIG. 20A, where the user has an option to authorize the sending of the drafted electronic communication.

FIG. 20B illustrates an example user interface 2000B, which is similar to the example user interface 2000A of FIG. 20A, but with the addition of a new email visualization 2030 representing a drafted email response containing answers to Samantha's questions, as well as various selectable controls. The email visualization 2030 is illustrated as being sent from "AI agent", and has a subject label reading, "Answers to Samantha's Questions".

In the embodiment illustrated in FIG. 20B, the user has used the selector tool 1940 to select the email visualization 2030. In response, an enlarged email visualization 2040 is displayed in the Selected Email Area 1950. As illustrated in the enlarged email visualization 2040, the drafted email response from the AI agent includes text reading "Hi 'User', I have drafted the below email response to send to Samantha in response to her email, please provide authorization for sending the below email:".

The enlarged email visualization 2040 includes a drafted email section 2050 illustrating an example of the drafted email that the AI agent would send to Samantha upon receiving authorization from the user. This drafted email section 2050 reads, "Hi Samantha, Here is your question(s) and the answer(s) I have identified:", followed by a Question-and-Answer section 2060, followed by an indication that the Question-and-Answer section 2060 was generated by the AI agent, closing with a message reading "Thank you, AI agent on behalf of 'User'".

The Question-and-Answer section 2060 includes a quotation of the question(s) Samantha originally asked in her email illustrated in FIG. 20A, as well as an answer section containing various steps for solving the problem that Samantha specified in her email to the user.

Particularly, the Question-and-Answer section 2060 reads, "Question: 'ABC Application is not working correctly and I'm wondering if it is because of some custom JavaScript we added to one of the form pages. How can we tell if that's the problem. 'Answer: 1.' Check your security role. If you don't have the correct permissions, contact your system administrator. 2. In the web app, go to Settings>Advanced Settings>Customization. 3. Under Plug-in and custom workflow activity tracing, check 'Enable'. 4. If these steps do not help, try disabling your custom JavaScript and run your application to see if the issue is resolved." "

As illustrated in FIG. 20B, the enlarged email visualization 2040 also includes various selectable controls 2070, 2080 and 2090 that the user can interact with. Specifically, the selectable control 2070 is a control for approving of the drafted email response, such that when selected, the user's AI agent receives authorization to (and a triggering instruction to) send the drafted email response to Samantha.

The selectable control 2080 is a control for modifying the drafted email response before the AI agent sends the drafted email response. Upon selecting the selectable control 2080, in some embodiments, the user may interact directly with the enlarged email visualization 2040 and/or the drafted email section 2050. In other embodiments, an editable email visualization is overlaid onto the user interface 2000B, with which the user may interact. In either case, after modifying the drafted email response, the user may authorize the AI agent to send the modified version of the drafted email response.

The selectable control 2090 is a control for modifying the AI agent behavior or protocols. For example, upon viewing the AI agent's drafted email response represented by the enlarged email visualization 2040, the user may decide to change how the AI agent drafts email responses. For example, the user may decide to modify the style with which the AI agent writes, to add additional text boxes or icons, to change where the AI agent acquires information for answering questions, etc. In this way, the principles described herein allow the user to provide feedback for modifying the current and future behavior and protocols performed by the AI agent when the AI agent determines actions to be performed for fulfilling requests in electronic communications.

Accordingly, the principles described herein allow for intuitive management, modification, and display of AI agent interactions with electronic communications (e.g., emails, texts, messages in a messaging application, etc.)

In some embodiments methods, systems and computer program products are also provided for facilitating control over the creation, management, presentation of and user interaction with AI memory data structures (sometimes referred to herein as "memories") for AI agent(s).

An AI memory data structure, as defined herein, is a characterization of an event. The event may be an interaction with an AI agent (e.g., a user dialog with an AI agent, a task performed by the AI agent, etc.). The event may also be an experience or event that is logged and identified by an AI agent even though the AI agent may not have been involved the event (e.g., an event involving actions performed by a user and/or a third-party independently of the AI agent).

The AI memory data structure also includes, in some instances, the correlating labels and attributes associated with that event, and weights associated with the attributes of that event, which can be used (as described herein) to prioritize and sort the events.

In some embodiments, the referenced events include user interactions, such as a user input selection on a user interface, a communication between the user and other entities (e.g., an email, text, etc.), a communication between the user and the AI agent (e.g., via an interface for communicating with the AI agent), or information gathered from a third-party source.

The embodiments described herein allow for the intuitive presentation of visualized forms of such memory data structures. For example, in some embodiments, one or more memory data structures are presented visually on a user interface in the form of displayed memory visualizations (e.g., user interface objects) including labels, images, icons, and/or text that describe and/or visually represent the memory data structures. These memory visualizations representing the memory data structures may be visually differentiated from each other in a variety of ways so as to more easily distinguish the different memory data structures based on their different types, attributes and/or attribute weights.

In some embodiments, the memory visualizations representing the memory data structures may be visually presented using different colors, shapes, fonts, background textures, animations. For example, a memory data structure that is associated with a good experience of a user of the AI agent could be visually presented in green, whereas a memory data structure that is associated with a bad experience of the user could be visually presented in red. On the other hand, a memory data structure that is associated with a neutral experience of a user, or that does not have a particular attribute associated with user experience, could be visually presented in blue.

These intuitively visually presented memory visualizations corresponding to the memory data structures may be interacted with via the user interface, such that the user can intuitively modify specific memory data structures to help train the AI agent to better perform a variety of tasks. Accordingly, the embodiments described herein allow for improved and intuitive control of the creation, management, presentation and interaction of AI memory data structures for the AI agent, thus providing for more effective training of the AI agent and improved user experience when interacting with the AI agent.

As used herein, the terms "memory data structures" and "memory visualizations" can also be referred to more simply as "memories."

Attention will now be directed to FIG. 21. FIG. 21 illustrates a flowchart of acts (act 2105, act 2110, act 2115, act 2120, act 2125, act 2130, act 2135, act 2140 and act 2145) associated with a method 2100 that can be implemented by a computing system (e.g., computing system 110) and is configured for controlling the creation and management of memories for an AI agent(s). FIG. 21 will be described with reference to components illustrated in FIG. 1.

A first illustrated act is provided for detecting a triggering event for generating and storing memory data structure(s) (sometimes referred to herein as "memories") (act 2105). As an example, detecting the triggering event may be accomplished via the detecting component of the computing system 110 of FIG. 1.

There are a wide variety of possible triggering events that may be detected for generating and storing memories for AI agent(s). For example, in one embodiment, the triggering event is the receiving and/or sending of communications (e.g., emails, texts, etc.) between a user and another person. Further, the triggering event could be the detection of a particular attribute of the communication. For example, in the event of reception of an email, the triggering event could be the detection of a particular author, topic, subject, or urgency of the email. In another embodiment, the triggering event is a communication between the user and AI agent(s) (e.g., via an interface such as Microsoft Copilot or ChatGPT). For example, the communication between the user and the AI agent(s) may include instructions, correction inputs, validation inputs, modification inputs, authentication inputs, etc. In yet another embodiment, the triggering event is a user selection on a user interface (e.g., when adding an event to a calendar application, or perhaps recent internet browsing activity).

In some cases, multiple memories may be generated and stored upon the detection of a triggering event, as may be the case, for example, if the triggering event was a mass scanning/parsing of a plurality of communications and/or documents. Note that the principles described herein are not limited to any particular type of triggering event, and that the principles described herein could function with a practically unlimited number of types of triggering events.

After detecting the triggering event, the method 1800 further includes determining whether to keep the memory (act 2110). As an example, determining whether to keep the memory may be accomplished via the determining component of the computing system 110 of FIG. 1. For example, in one embodiment, a memory is determined to be kept based on user input in a user interface, the type of memory, the source of the memory, attributes of the memory, the category of the triggering event, etc.

Next, if it is determined that the memory should be kept, all or a portion of the memory is stored in the accessible database (e.g., the accessible database(s) of the computing system 110 or the client system 120 of FIG. 1) (act 2130). However, if it is determined that the memory should not be kept, the computing system 110 may refrain from storing the memory in the accessible database (act 2115). In some embodiments, the memory, or a similar memory, may already be stored in the accessible database, in which case the computing system 110 may instead remove the memory from the accessible database (act 2120). After either of act 2115 and act 2120, the computing system 110 can also optionally refrain from using the memory for future training data (act 2125).

The method 2100 also includes additional optional steps that may be taken after storing of the memory in the accessible database. For example, from act 2130, act 2110 may be repeated with additional memories based on the initial triggering event, or new triggering events.

Further, the memory may be labelled with one or more labels corresponding to one or more attributes of the memory (act 2135). For example, in some embodiments, the memory might be tagged or labelled with corresponding attributes such as people, places, events, dates, times, or user experiences/feelings corresponding to the memory, or even corresponding to the triggering event that caused the memory to be generated and stored. In some embodiments, this labelling is accomplished, for example, via user input on a user interface, or even automatically by the AI agent(s).

Along with labelling of the memory, attribute weights may be assigned to the attributes of the memories (act 2140). Weighting the attributes of the memories can assist AI agent(s) in understanding the various complexities and relationships between a large quantity of memories, in conflict resolution between memories, in training of the AI agent(s), in understanding how memories impact the current behavior of the AI agent(s), in understanding how new memories may affect the future behavior of AI agent(s), and/or for prioritizing and even sorting a display of the memories. The labels and the attributes of the memories may also be used for selecting, sorting, and/or processing of the memories.

By way of example, the memories may be organized in the accessible database by the one or more labels or attribute weights of the memories (act 2145). This may be beneficial, for example, when generating lists of memories used for possible training data for training the AI agent(s) (e.g., via the AI agent Training Component of the computing system 110 of FIG. 1). Further, the labels and attribute weights may also be used when prioritizing/ordering multiple memories for display on a user interface, in which case the memory visualizations may be intuitively understood by and interacted with by the user on the user interface based on their sorting, as will be explained later with respect to FIGS. 22, 23A through 23E, 24, 25A, 25B and 26.

Figure 22:
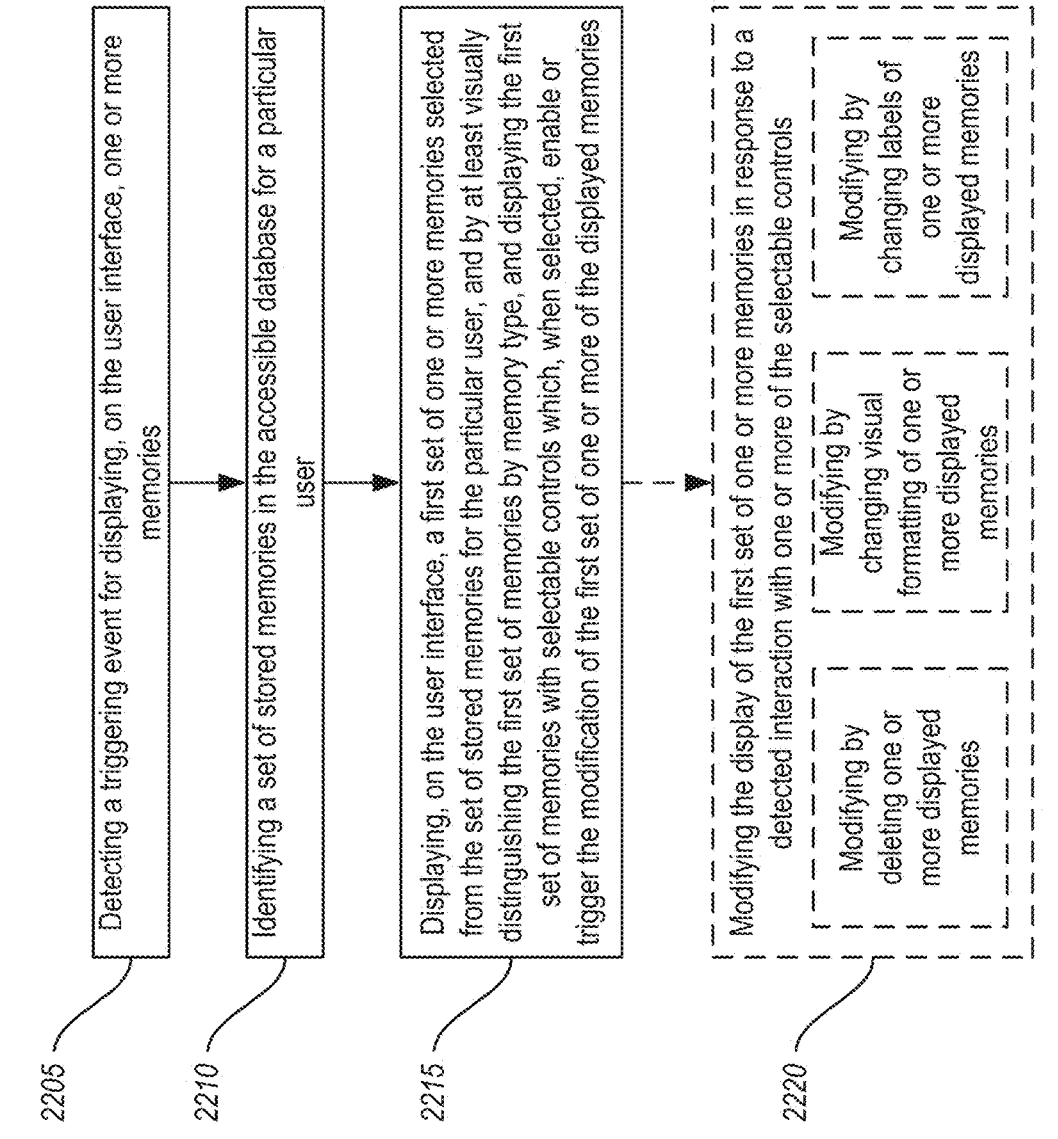
FIG. 22 illustrates a flowchart of acts associated with a method that can be implemented by a computing system and is configured for controlling the presentation and interaction of memories of AI agent(s) within a user interface.

FIG. 22 illustrates a flowchart of acts (act 2205, act 2210, act 2215 and act 2220) associated with a method 2200 that can be implemented by a computing system (e.g., computing system 110) and is configured for controlling the presentation and interaction of memories of AI agent(s) within a user interface (e.g., the user interface(s) of the computing system 110 or the client system(s) 120 of FIG. 1). It should be appreciated that FIG. 22 will be described with reference to components illustrated in FIG. 1, and will be described in tandem with FIG. 23A through FIG. 23E, FIG. 24, FIG. 25A and FIG. 25B, which show examples of user interfaces in which memory visualizations are presented and are capable of being interacted with via the user interface. It will be appreciated, however, that FIGS. 23A through 23E, FIG. 24, and FIGS. 25A through 25B are illustrated for example and explanatory purposes only. The principles described herein are not limited to the specific user interface designs or layouts illustrated in the figures and may be implemented in any number of user interfaces.

A first illustrated act is provided for detecting a triggering event for displaying, on the user interface, one or more memories (act 2205 in FIG. 22). Memories can be displayed on a wide variety of user interfaces, and due to many different triggering events. For example, the triggering event may be a user input selection in a user interface, an automatic AI agent response to detecting a task (e.g., generating an email response, scheduling a meeting, performing memory recall, etc.), user selection of an email communication, and/or correspondence between a user and an AI agent, etc.

Upon detecting the triggering event, the method 2200 further includes identifying a set of stored memories in an accessible database (e.g., the accessible database(s) of the computing system 110 of FIG. 1) for a particular user (act 2210). There may be many sets of stored memories for many different users stored in an accessible database. The principles described herein allow for relevant memories to be identified and accessed based on which users have the proper permissions for accessing those relevant memories.

Upon identification of the set of stored memories for the user, a first set of one or more memories from the set of stored memories for the user are displayed in the form of memory visualizations on a user interface (e.g., the user interface(s) of the computing system 110 or the client system(s) 120 of FIG. 1) (act 2215).

Figure 23A:
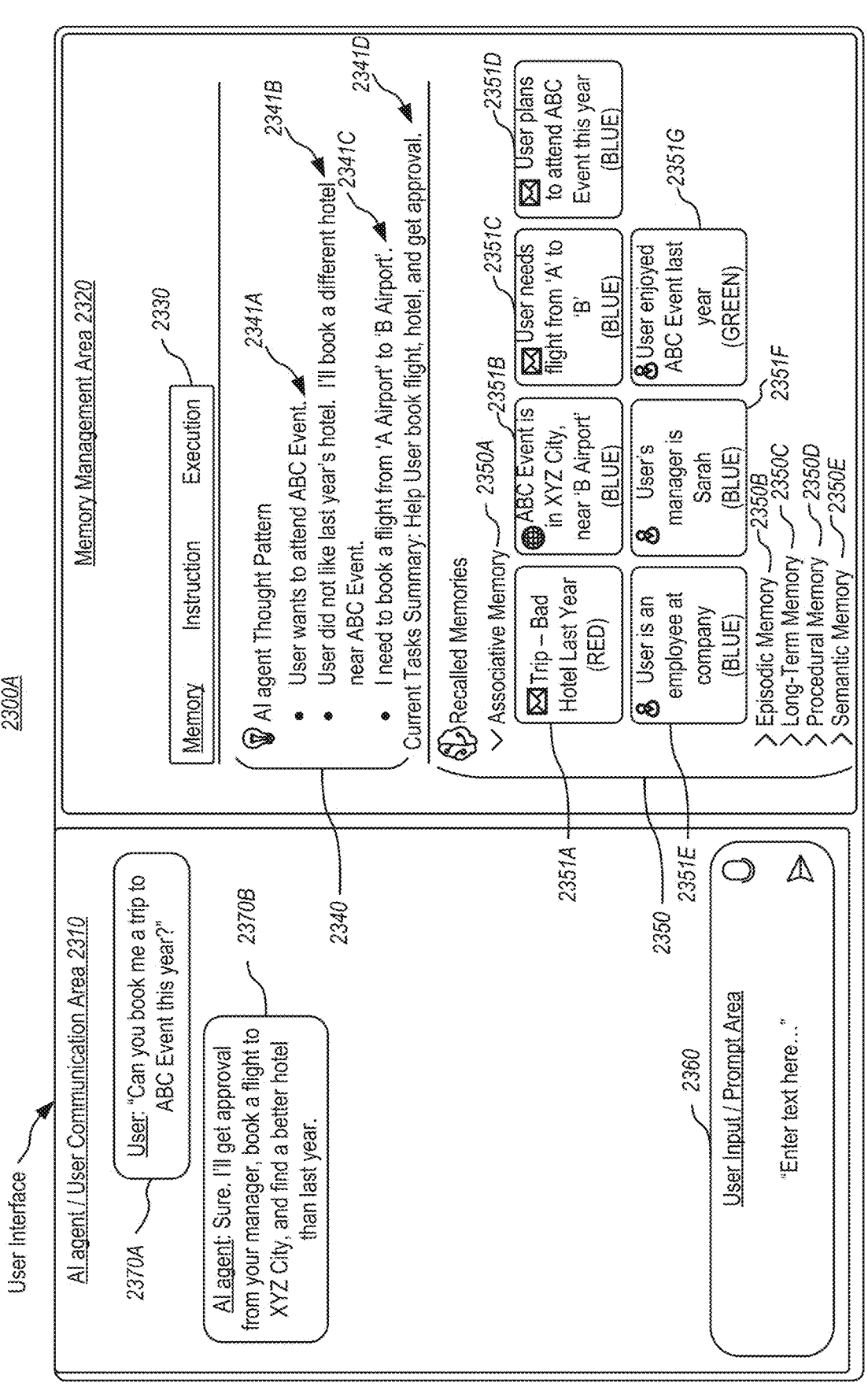
FIG. 23A illustrates an example of a user interface on which memory visualizations representing a first set of one or more memories are displayed.

Reference is now directed to FIG. 23A, which shows an example of a user interface 2300A on which memory visualizations that may represent the first set of one or more memories are displayed.

As illustrated in FIG. 23A, the user interface 2300A includes an AI agent/User Communication area 2310, and a Memory Management Area 2320. Included in the Memory Management Area 2320 is a user interface control bar 2330, an AI agent Thought Pattern section 2340, and a Recalled Memories section 2350. The user interface control bar 2330 includes various selectable options for changing the display in the Memory Management Area 2320. By way of example, the user interface control bar 2330 in FIG. 23A illustrates the selectable options of "memory", "instruction" and "execution". These various options are for illustrative purposes only, and the examples described with respect to FIGS. 23A through 23E will only illustrate the "memory" option as being selected.

An example regarding a triggering event for displaying memory visualizations on the user interface 2300A will now be described. In FIG. 23A, in the AI agent/User Communication Area 2310, a User Input/Prompt Area 2360 is provided where a user may input text for communicating with an AI agent. Text inputted into the User Input/Prompt Area 2360, as well as responses generated by the AI agent, is used to generate dialog objects 2370 that are displayed in the AI agent/User Communication Area 2310.

In FIG. 23A, a user has entered input into the User Input/Prompt Area 2360 comprising a text message (referred to as dialog object 2370A), which reads, "Can you book me a trip to ABC Event this year?". In response, the AI agent responds with dialog object 2370B, which reads, "Sure. I'll get approval from your manager, book a flight to XYZ City, and find a better hotel than last year."

The AI agent generated the response in dialog object 2370B, in part, based on a set of stored memories for the user, in combination with rules and trained behavior for generating responses based on memories. To allow the user to intuitively understand why the AI agent gave the response in dialog object 2370B, corresponding memory visualizations of the memories in the set of memories for the user are illustrated in the Recalled Memories section 2350 of the Memory Management Area 2320 of FIG. 23A.

More specifically the Recalled Memories section 2350 includes various categories of memories, such as Associate Memory 2350A, Episodic Memory 2350B, Long-Term Memory 2350C, Procedural Memory 2350D and Semantic Memory 2350E. The principles described herein are not limited to the Recalled Memories section 2350 including particularly these memory categories. Instead, these memory categories are simply examples of how various memories may be categorized for display on the user interface.

Each of the labels for the memory categories 2350A through 2350E may be interacted with via the user interface so as to expand or collapse in such a manner so as to display or hide memory visualizations for those memory categories. For purposes of explanation only, solely the Associative Memory category 2350A will be illustrated as being expanded to show its corresponding memory visualizations. That being said, each of the memory categories 2350A through 2350E may include any number of sets of memories, and memories may be organized so as to be included in multiple different memory categories.

In FIG. 23A, the Associative Memory category 2350A is expanded, and various memory visualizations 2351A through 2351G are illustrated. Each of these memory visualizations 2351A through 2351G correspond to memories that the AI agent has identified from the set of stored memories for the user as being associated with or relevant to particular events, people, places, dates, times, etc., that the AI agent identified from the input provided by the user corresponding the dialog object 2370A.

In some embodiments, the memory visualizations 2351A through 2351G are displayed in a prioritized order based on attribute weights and/or labels associated with their corresponding memories. For example, memory visualization 2351A may be deemed by the AI agent to be the most important memory of the set of memories, while memory visualization 2351G may be deemed by the AI agent to be the least important memory of the set of memories.

In some embodiments, memory visualizations are presented on the user interface in a manner so as to visually distinguish memories of different memory types. In some embodiments, memories of different memory types are displayed using different colors, icons, shapes, animations, fonts, background textures, textual descriptions, etc. For example, in some embodiments, memory visualizations corresponding to memories of a first type have textual descriptions illustrated in a first font, whereas memory visualizations corresponding to memories of a second type have textual descriptions illustrated in a second font. In another embodiment, memory visualizations corresponding to memories of the first type are illustrated using a first background texture, whereas memory visualizations corresponding to memories of the second type are illustrated using a second background texture.

In another embodiment, memories of the first type are be deemed to be of greater importance and/or higher priority than memories of the second type, and thus memory visualizations corresponding memories of the first type are illustrated using pulsating borders, and/or a running edge along their borders. In another embodiment, memory visualizations that are currently selected by user input are illustrated using pulsating borders and/or running edges so as to allow a user to more easily distinguish the selected memory visualization from non-selected memory visualizations, thus allowing for enhanced user experience.

In some embodiments, memory visualizations corresponding to memories associated positive user experiences are presented in green, and/or are presented with a smiling face icon. In some embodiments, memory visualizations corresponding to memories associated with negative user experiences are presented in red, and/or are presented with a frowning face icon. Further, in some embodiments, memory visualizations corresponding to memories associated with neutral user experiences are presented in blue and/or with a face icon that is neither smiling nor frowning. In some embodiments, memories are associated with positive, negative, and/or neutral user experiences based on user feedback or user designation. Alternatively or in addition to user designation, in other embodiments, memories are automatically associated with positive, negative and/or neutral user experiences based on AI agent language recognition during parsing/scanning of those memories and/or parsing/scanning of related memories.

In some embodiments, memories are presented with icons that represent the triggering event that initiated the creation of the memory. For example, in one embodiment, a memory created in response to an email communication as the triggering event is presented with an envelope icon. In another embodiment, to assist in performing a task, an AI agent may perform an internet search to gather information related to the task, in which case the corresponding generated memory is presented with an Internet browser icon. In one embodiment, the AI agent has information related to the company employee structure of a user, or other various information about the user, in which case corresponding generated memories are presented with a generic user icon, or an icon specialized for the user.

In some embodiments, the triggering event for displaying various memories is a keyword search performed by the user, the search being for a specific label associated with a set of memories for the user. In this case, the memories are displayed organized by attribute weight corresponding to the specific label. In one embodiment, memories may be displayed presented with associated confidence levels for information contained in the memory. For example, the confidence levels for different memories may be presented using a system of icons. In one embodiment, memories with high confidence levels are presented with four or five star icons, memories with low confidence levels are presented with one or two star icons, and memories with medium confidence levels are presented with three star icons. In another embodiment, memories are instead not to be displayed due to the age of the memory, or in a case in which the information contained within the memory is deemed to no longer be relevant.

Notwithstanding the above-described examples of ways to display memory visualizations, each of the example memory visualizations 2351A through 2351G will now be briefly described. Memory visualization 2351A corresponds to a memory relating to the fact that the user had a bad hotel experience the previous year when attending the ABC Event in XZY City. The triggering event for creating the memory corresponding to the memory visualization 2351A was an email communication, and thus the memory visualization 2351A is presented with an envelope icon representing email communication. Additionally, since memory visualization 2351A corresponds to a memory of a bad user experience, the memory visualization 2351A is illustrated in red.

Memory visualization 2351B corresponds to a memory that specifies that the ABC Event will be held this year in XZY City, which is near 'B Airport'. The triggering event for creating the memory corresponding to the memory visualization 2351B was an internet search performed by the AI agent to gather information related to the user input corresponding to dialog object 2370A, and thus the memory visualization 2351B is presented with an internet web icon representing that the AI agent acquired the information via the internet. Since the memory visualization 2351B corresponds to a memory in which there was a neutral or non-existent user experience, the memory visualization 2351B is illustrated in blue.

Memory visualization 2351C corresponds to a memory that the user needs a flight from 'A Airport', near where to the user lives, to 'B Airport', which is in XZY City near ABC Event. The triggering event for creating the memory corresponding to the memory visualization 2351C was an email communication, and thus the memory visualization 2351C is presented with an envelope icon representing email communication. The memory visualization 2351C corresponds to a memory in which there was a neutral user experience, the memory visualization 2351C is illustrated in blue.

Memory visualization 2351D corresponds to a memory that the user plans to attend ABC Event this year. This memory could have been created due to the user inputting the information corresponding to dialog object 2370A, and/ or possibly a previous email sent to a friend. Accordingly, in some embodiments, memory visualizations could be illustrated using more than one icon representing a triggering event for creating the corresponding memory. However, for purposes of simplicity, memory visualization 2351D is illustrated in FIG. 23A as being presented with the envelope icon. Suppose also that the memory corresponding to the memory visualization 2351D is of a neutral user experience, and thus the memory visualization 2351D is illustrated in blue.

Memory visualization 2351E corresponds to a memory that the user is an employee at 'company'. In this example, the AI agent has information related to company employee structure, relationships between employees at 'company', and various other information related to 'company'. Accordingly, memory visualization 2351E corresponding to a memory generated in response to receiving generic information related to the user and their relationship with 'company', the memory visualization 2351E is presented with a generic user icon. Further, there is a neutral, non-existent and/or not yet specified user experience corresponding to the memory, and thus the memory visualization 2351E is illustrated in blue.

Memory visualization 2351F corresponds to a memory that the user's manager at 'company' is Sarah. The information related to this memory was also generated in response to receiving information regarding company structure at 'company', and thus memory visualization 2351F is presented using the generic user icon. Further, there is a neutral, non-existent and/or not yet specified user experience corresponding to the memory, and thus the memory visualization 2351E is illustrated in blue. However, in the event that new information was to be acquired based on in-person or other communication experiences between the user and the user's manager Sarah, in some embodiments, the color used to illustrate the memory visualization 2351F changes. For example, if the AI agent was to receive information specifying that the user enjoyed working with Sarah, the AI agent can change the memory visualization 2351F to be illustrated in green.

Memory visualization 2351G corresponds to a memory that the user enjoyed attending the ABC Event last year. The corresponding memory may have been generated in response to the user submitting a survey that 'company' provided after completing ABC Event the previous year. Thus, as an example, the memory visualization 2351G is presented with the generic user icon. Further, due to the fact that the memory visualization 2351G corresponds to a memory in which the user had a positive user experience, the memory visualization 2351G is illustrated in green.

Based on the memories corresponding to the memory visualization 2351A through 2351G, as well as possibly being based on many additional memories for which memory visualizations are not currently being shown, the AI agent generates a thought pattern including a series of individual "ideas" (i.e., thoughts or concepts). The AI agent can then perform tasks based on these ideas. For example, based on at least the memories corresponding to the memory visualizations 2351A through 2351G, the AI agent generates ideas 2341A through 2341D. Specifically, idea 2341A is that the user wants to attend the ABC Event this year. Idea 2341B is that the user did not like the hotel last year, and so the AI agent should book a different hotel near ABC Event this year. Idea 2341C is that the AI agent should book a flight from 'A Airport' to 'B Airport'. Idea 2341D represents a summary of current tasks the AI agent should perform, namely that the AI agent should help the user book a flight, book a hotel, and get approval for the trip from the user's manager, Sarah.

Returning to the method 2200 of FIG. 22, the first set of one or more memories are also displayed with selectable controls which, when selected, enable or trigger the modification (e.g., via the Memory Modification Component of the computing system 110 of FIG. 1) of the first set of one or more of the displayed memories (also act 2215). When interaction with one or more of the selectable controls on the user interface is detected, the display of the first set of one or more memories is modified (act 2220). This allows the user to intuitively visually understand the memories that the AI agent(s) associates with a particular task, and be able to easily modify the memories how the user wishes so as to allow the AI agent(s) to perform more effectively for the user. For example, by interacting with the one or more selectable controls, the user may modify one or more displayed memories by changing the visual formatting and/ or presentation of the one or more memories, changing labels, attribute weights and/or other attributes of the one or more memories, modifying the content of the one or more memories, changing categorization of the one or more memories, or even deleting the one or more displayed memories entirely.

Figure 23B:
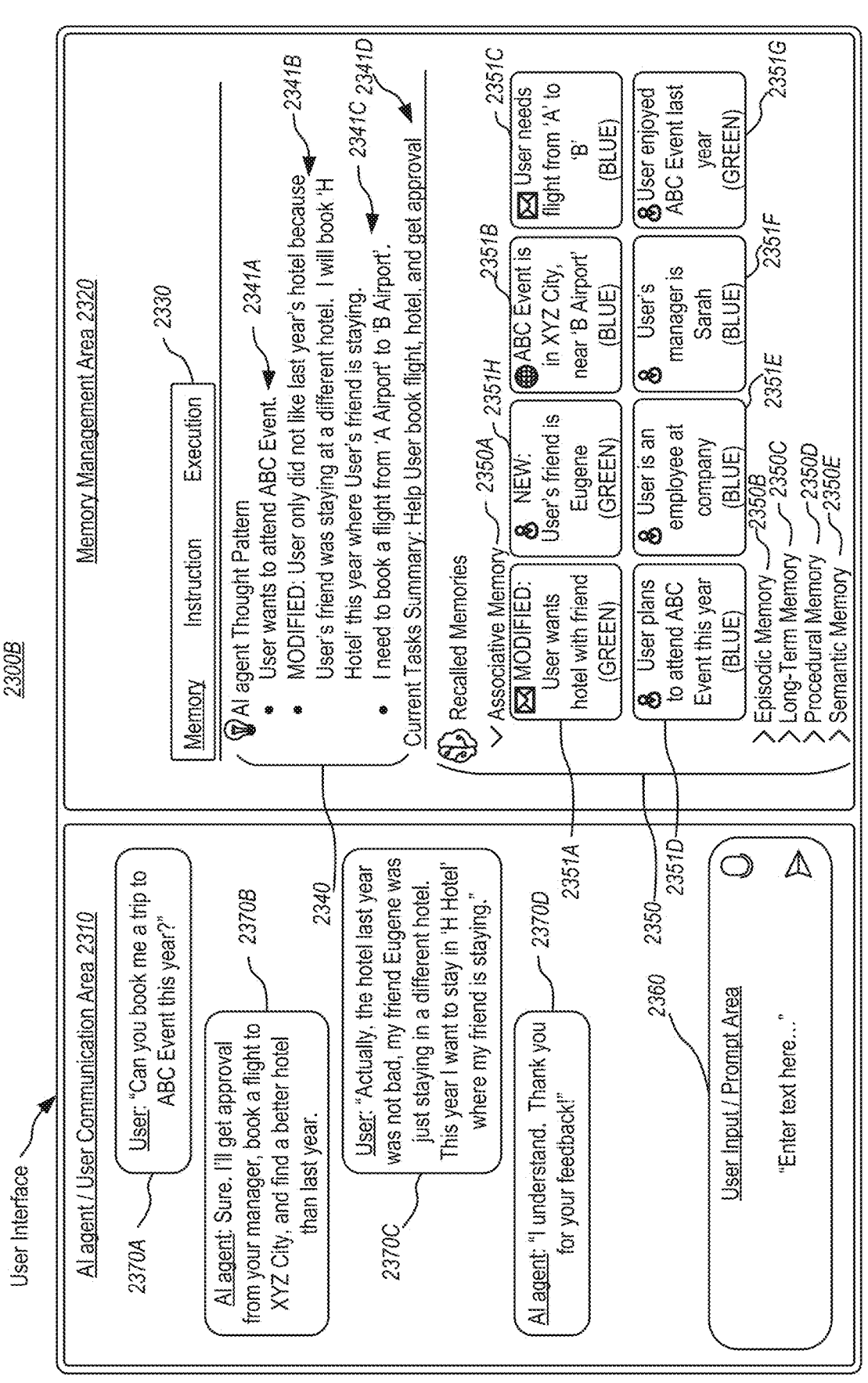
FIG. 23B illustrates a user interface, which is similar to the user interface of FIG. 23A, but illustrates an example in which memory visualizations are illustrated as being modified based on user input into a user input/prompt area.

For example, refer now to FIG. 23B. FIG. 23B illustrates a user interface 2300B, which is similar to the user interface 2300A of FIG. 23A. However, the user interface 2300B shows additional dialog objects 2370C and 2370D in the AI agent/User communication Area 2310. Due to the additional information provided in the additional dialog objects 2370C and 2370D, the user interface 2300B also shows the memory visualization 2351A having been modified, a new memory visualization 2351H having been created to the Recalled Memories section 2350, and the idea 2341B in the AI agent Thought Pattern section 2340 having been modified.

Specifically, in FIG. 23B, the user has further inputted information into the User Input/Prompt Area 2360, corresponding to the dialog object 2370C, which reads, "Actually, the hotel last year was not bad, my friend Eugene was just staying in a different hotel. This year I want to stay in 'H Hotel' where my friend is staying." In response, the AI agent replies with dialog object 2370D, stating, "I understand. Thank you for your feedback!".

Due to this new information being added by the user via the user interface, the AI agent modifies the memory visualization 2351A, which previously referred to the user having had a bad hotel experience in the previous year. With the new information, the AI agent modifies the memory corresponding to the memory visualization 2351A to specify that the user wants to stay in the same hotel as their friend, and that the hotel last year was perhaps not as bad as previously thought. Accordingly, text or labels presented on the memory visualization 2351A is changed from "Trip-Bad Hotel Last Year" to "MODIFIED: User wants hotel with friend". Further, the memory visualization 2351A is now illustrated in green, indicating that the corresponding memory is related to the user having had good experiences with their friend Eugene.

Further, the AI agent also creates a new memory corresponding to memory visualization 2351H, which the AI agent prioritizes as being the second most important memory in the set of memories. Thus, the AI agent reorders the listing of the memory visualizations so that memory visualization 2351A is first, memory visualization 2351H is second, and memory visualizations 2351B through 2351G are shifted to be slightly less prioritized compared to their prioritizations in FIG. 23A.

Memory visualization 2351H corresponds to a new memory in which the AI agent learns that the user's friend is Eugene. The AI agent may also recognize that there is a high probability that the Eugene the user referred to in dialog object 2370C is also the same Eugene as in information the AI agent has regarding the company structure previously mentioned. Accordingly, while not illustrated in FIG. 23B, the memory visualization 2351H could be illustrated as being a memory containing information that the AI agent has a high confidence level about. In any case, in FIG. 23B, the AI agent has recognized that Eugene being the user's friend corresponds to a positive user experience rating, and thus the memory visualization 2351H is illustrated in green.

Further, due to the additional information from dialog object 2370C, the AI agent updates its AI agent Thought Pattern section 2340. Specifically, idea 2341B is modified to specify that the user only did not like last year's hotel because the user's friend was staying at a different hotel, and that the AI agent should book 'H Hotel' this year because that is where the user's friend Eugene plans on staying.

While FIG. 23B illustrates an updated user interface 2300B (compared to the user interface 2300A of FIG. 23A) that was updated in response to the AI agent receiving additional information in the form of user input into the User Input/Prompt Area 2360, there are various other ways that memories could be modified that may cause the user interface to be updated. For example, refer now to FIG. 23C.

Figure 23C:
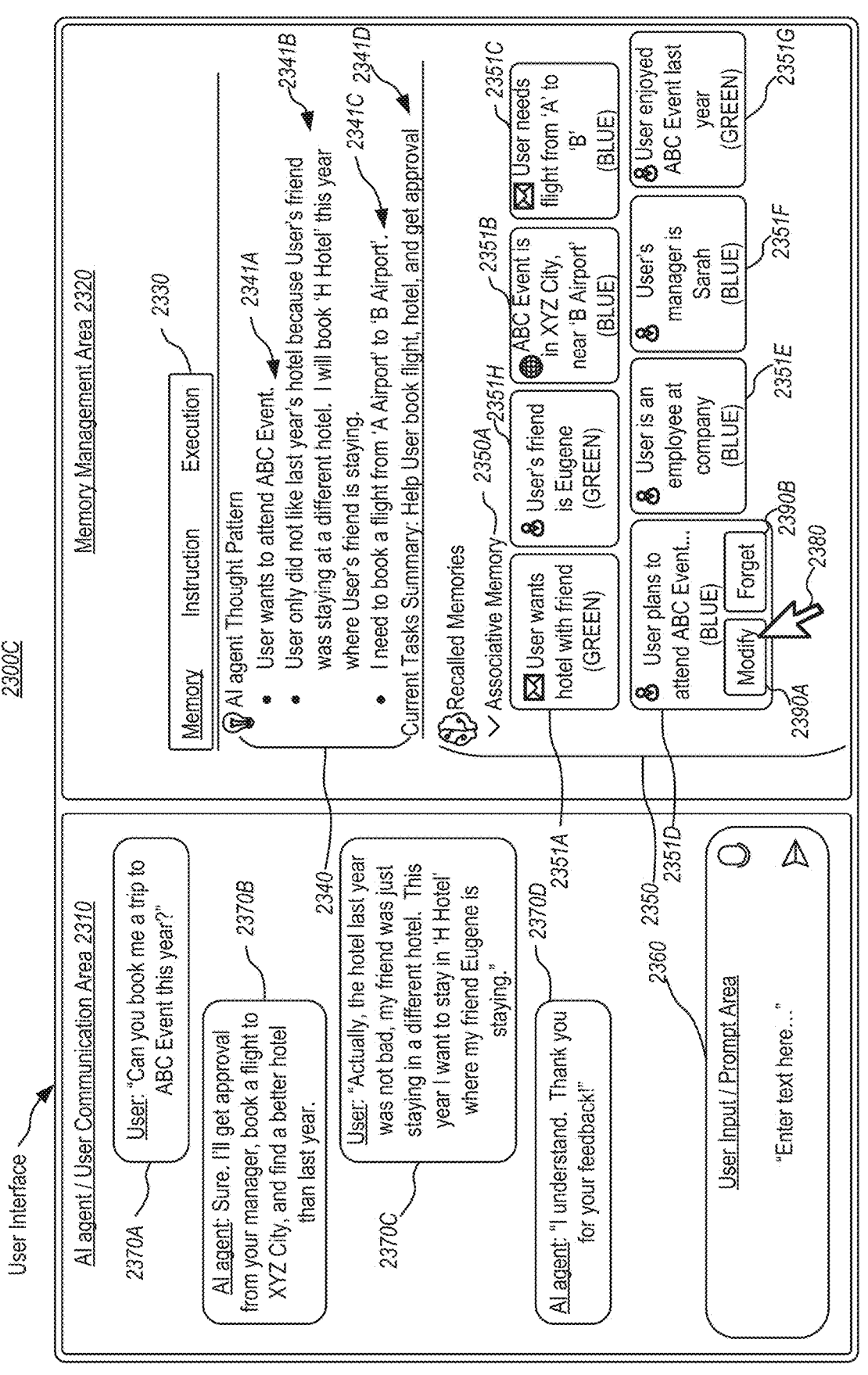
FIG. 23C illustrates an example user interface, which is similar to the user interface of FIG. 23B, but illustrates an example in which the user modifies memories by interacting with selectable controls for the memory visualizations.

FIG. 23C illustrates an example user interface 2300C, which is similar to the user interface 2300B of FIG. 23B, but illustrates an example in which the user modifies memories by interacting with selectable controls for the memory visualizations. Specifically, in FIG. 23C, the user is hovering a selector tool (e.g., a cursor prompt) 2380 over memory visualization 2351D. The selector tool 2380 may be controlled by a computer mouse or other I/O device to select and interact with selectable content (e.g., memory visualizations, user input/prompt areas, selectable controls, etc.) In the embodiments illustrated herein, the selector tool 2380 is illustrated as an icon in the shape of an arrow. However, in some embodiments (not illustrated), when using the selector tool 2380 to select an object, the shape or icon representing the selector tool 2380 changes (e.g., to a hand with a pointing finger) to provide feedback to the user that selection is occurring or has occurred.

In response to hovering the selector tool 2380 over memory visualization 2351D, the user interface 2300C updates so as to display the memory visualization 2351D in an enlarged form, and selectable controls 2390A (labelled "modify") and 2390B (labelled "forget") appear within the memory visualization 2351D. If the user uses the selector tool 2380 to select the selectable control 2390B, the memory corresponding to the memory visualization 2351D is modified so as to be forgotten or deleted from the set of memories.

On the other hand, if the user uses the selector tool 2330 to select the selectable control 2390A, the user interface 2300C updates so as to provide additional options for modifying the memory corresponding to the memory visualization 2351D. For example, refer now to FIG. 23D.

Figure 23D:
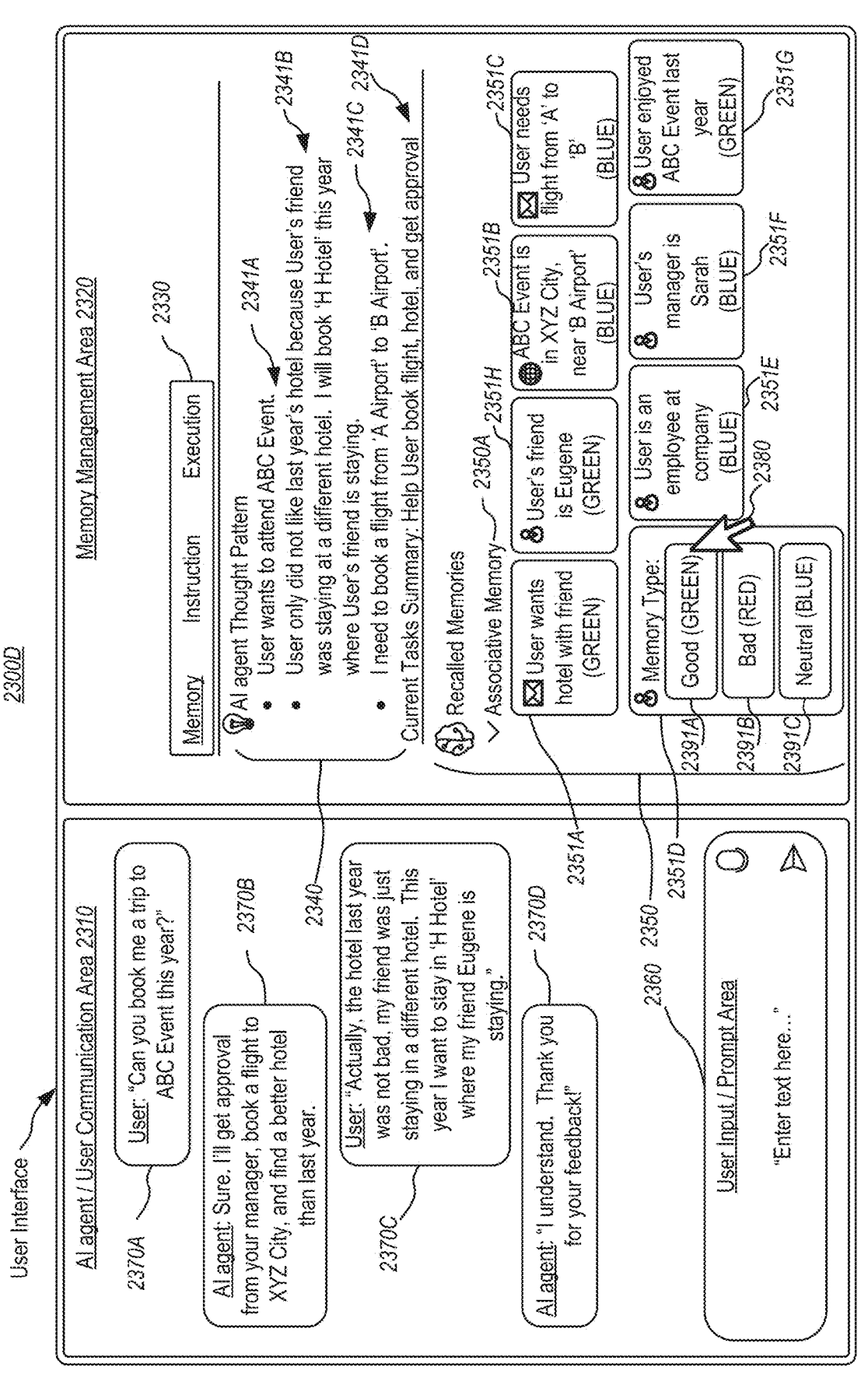
FIG. 23D illustrates an example user interface, which is similar to the user interface of FIG. 23C, but illustrates an example of how the user interface could update upon selecting the selectable control in FIG. 23C.
Figure 23E:
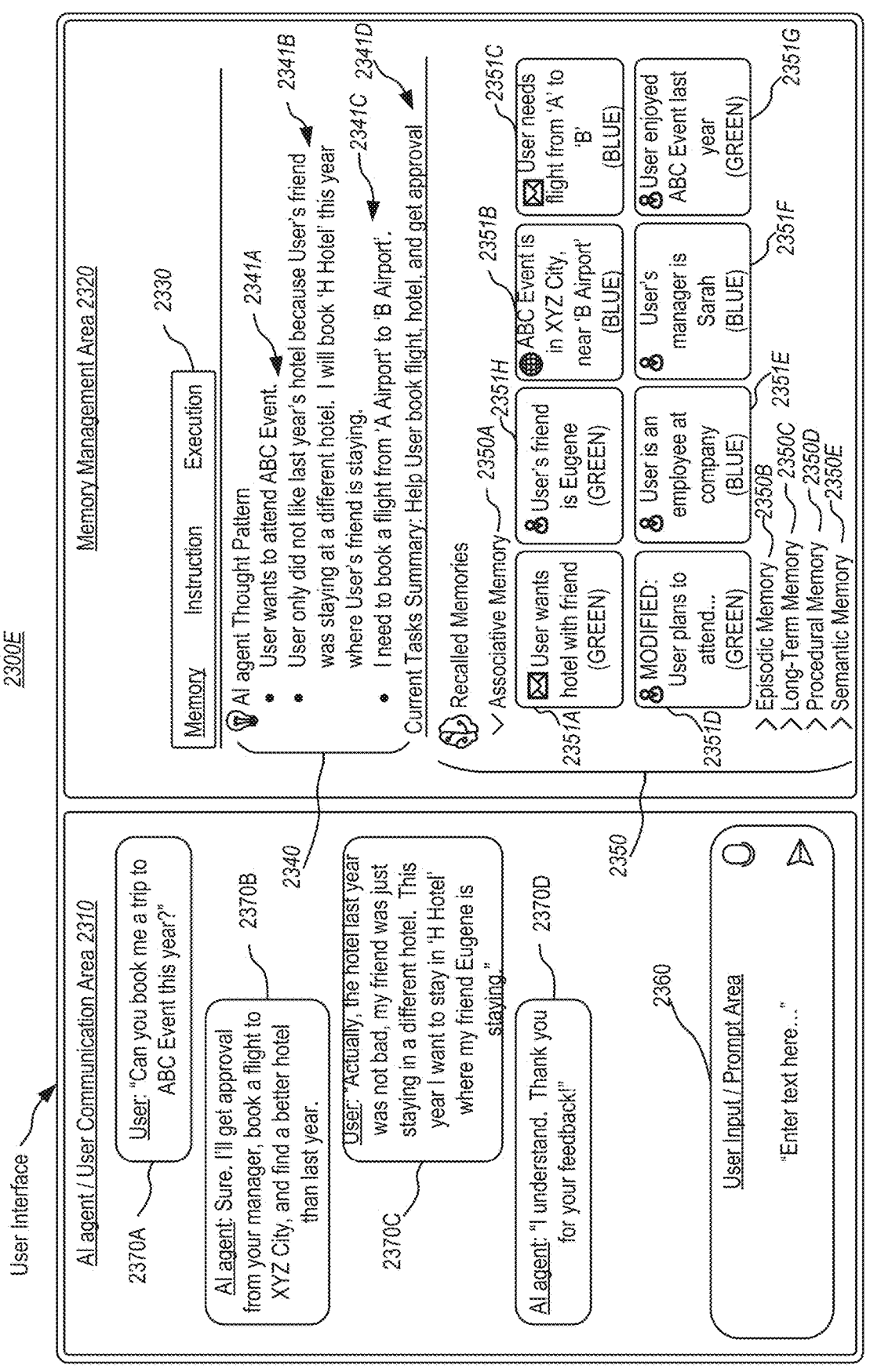
FIG. 23E illustrates an example user interface, which is similar to the user interface of FIG. 23D, which illustrates an example of how the user interface can update upon user selection to modify a memory visualization using the selectable control in FIG. 23D.

FIG. 23D illustrates the user interface 2300D, which is similar to the user interface 2300C of FIG. 23C, but illustrates an example of how the user interface could update upon selecting the selectable control 2390A in FIG. 23C. As illustrated in FIG. 23D, the memory visualization 2351D is presented further enlarged, and shows three additional selectable controls 2391A (labelled "Good", illustrated in green), 2391B (labelled "Bad", illustrated in red) and 2391C (labelled "Neutral", illustrated in blue) for modifying the memory corresponding to the memory visualization 2351D. Note that the updated presentation for the memory visualization 2351D illustrated in FIG. 23D shows only one example of how memory visualizations could be modified based on selection of selectable controls by a user. Other examples include the modification of labels, attribute weights, icons, prioritizations, etc. for the memories and their corresponding memory visualizations.

Upon selecting any one of the selectable controls 2391A through 2391C, the memory corresponding to the memory visualization 2351D would be modified to reflect the user's selection. For example, suppose that the user sees, on the user interface, the memory visualization 2351D, which is labelled with text reading "User plans to attend ABC Event this year". In FIGS. 23A through 23C, the memory visualization 2351D is illustrated in blue, indicating that the there is a neutral user experience, non-existent user experience, or not yet specified user experience associated with the corresponding memory. However, suppose that the user was very excited about their plans for attending the ABC Event this year, and wanted to the AI agent to take this factor into consideration. Accordingly, the user may use the selector tool 2380 to select the selectable control 2391A, thus changing the memory visualization 2351D to be illustrated in green, as is shown in the updated user interface 2300E of FIG. 23E.

In some embodiments, when a user causes modification to a memory visualization via interaction with selectable controls for the memory visualization, the AI agent uses this modification as a triggering event for further updating attribute weights and/or labels associated with the memory visualization. In some embodiments, this also causes the AI agent to change prioritization ordering for the set of memories and their corresponding memory visualizations. In some embodiments, the user uses the selector tool 2380 to click and drag a specific memory visualization to a new position in the user interface so as to cause reordering of prioritization of memories and their corresponding memory visualizations. In response, in response to such reordering of prioritization, the AI agent modifies attribute weights for the memories in the set of memories accordingly.

Figure 24:
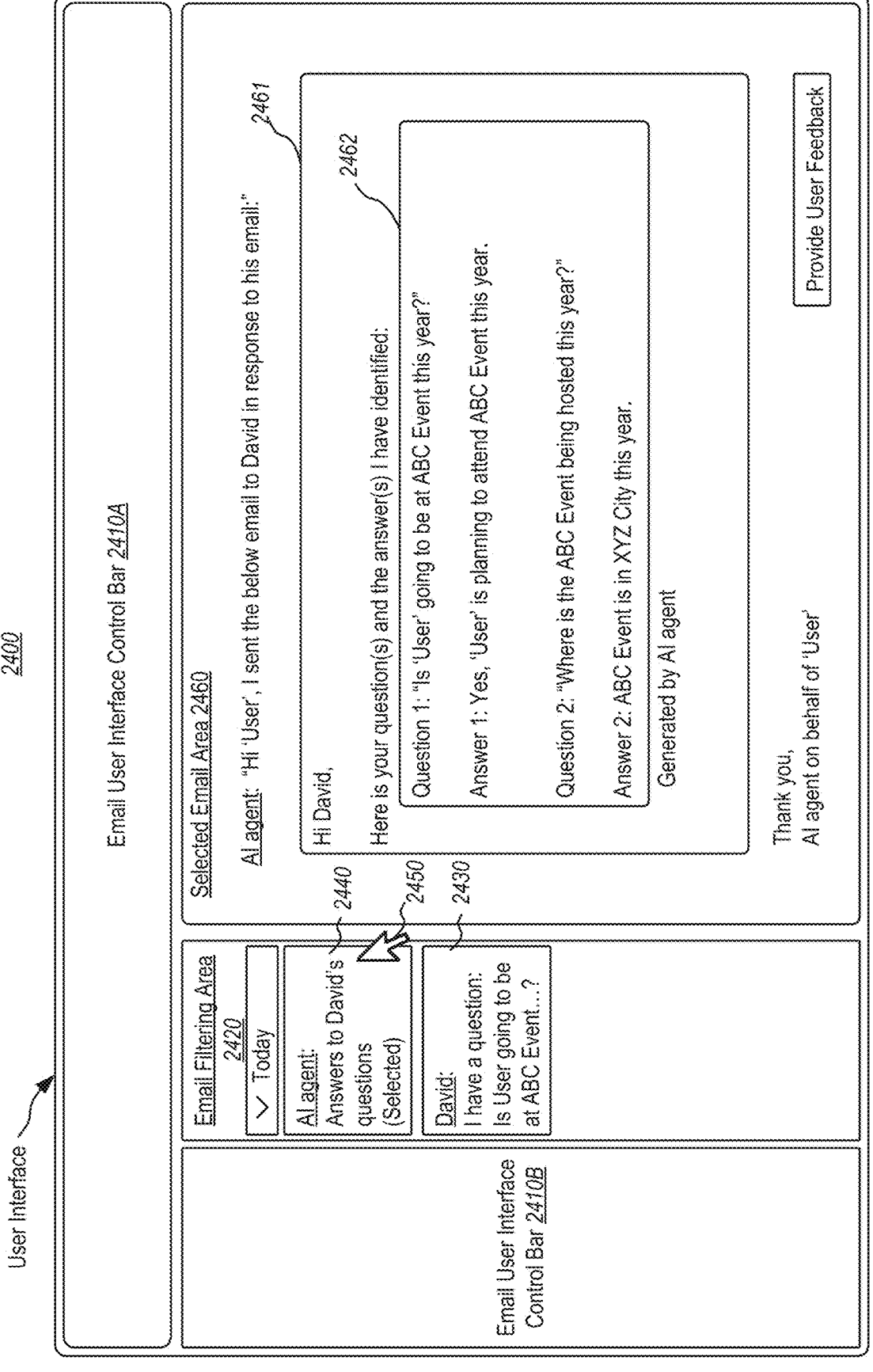
FIG. 24 illustrates an example user interface in which the AI agent generates new memories in response to email communications.

Attention will now be directed to FIG. 24, which shows an example user interface 2400 in which the AI agent generates new memories in response to email communications. Particularly, FIG. 24 shows an embodiment in which an AI agent is used to automatically answer a question sent to the user in an email communication, in which the AI agent uses the interaction to create a new memory.

The user interface 2400 includes various Email User Interface Control Bars 2410A and 2410B, each of which may include various selectable controls with which the user may interact. The user interface 2400 further includes an Email Filtering Area 2420, which represents an email inbox for the user. For example, the Email Filtering Area 2420 is illustrated as including email memory visualizations 2430 and 2440 representing emails that the user has received, which may be interacted with by a user via selector tool 2450.

In the embodiment illustrated in FIG. 24, the email memory visualization 2430 represents an email having been received by the user, the email having been sent by "David", and having a subject label reading, "I have a question: Is User going to be at ABC event . . . ?". For purposes of explanation, suppose that the email corresponding to the email memory visualization 2430 includes a variety of text, including various questions from David directed to the user.

The email visualization 2440 represents an email having been received by the user, the email having been generated and sent by an AI agent, and having a subject label reading, "Answers to David's Questions". In the embodiment illustrated in FIG. 24, the user has used the selector tool 2450 to select the email memory visualization 2440. In response, additional information regarding the email represented by the email memory visualization 2440 is displayed in a Selected Email Area 2460 of the user interface 2400.

As illustrated in the Selected Email Area 2460, a message from the AI agent is displayed, reading "Hi 'User', I sent the below email to David in response to his email.", referring to an expanded email visualization 2461, which represents the contents of an email that the AI agent automatically generated and sent to David in response to the user having received the email corresponding to the email memory visualization 2430. The expanded email visualization 2461 reads "Hi David, Here is your question(s) and the answer(s) I have identified:", referring to question-and-answer visualization 2462, "Generated by AI agent", and "Thank you, AI agent on behalf of 'User'". The question-and-answer visualization 2462 reads "Question 1: Is 'User' going to be at ABC Event this year?", "Answer 1: Yes, 'User' is planning to attend ABC Event this year.", "Question 2: Where is the ABC Event being hosted this year?", and "Answer 2: ABC Event is in XYZ City this year.".

In some embodiments, based on the email contents corresponding to email memory visualizations 2430 and 2440, and the expanded email visualization 2461, the AI agent creates one or more memories. One example of such a memory is illustrated in the form of a memory visualization in FIG. 25A.

Figure 25A:
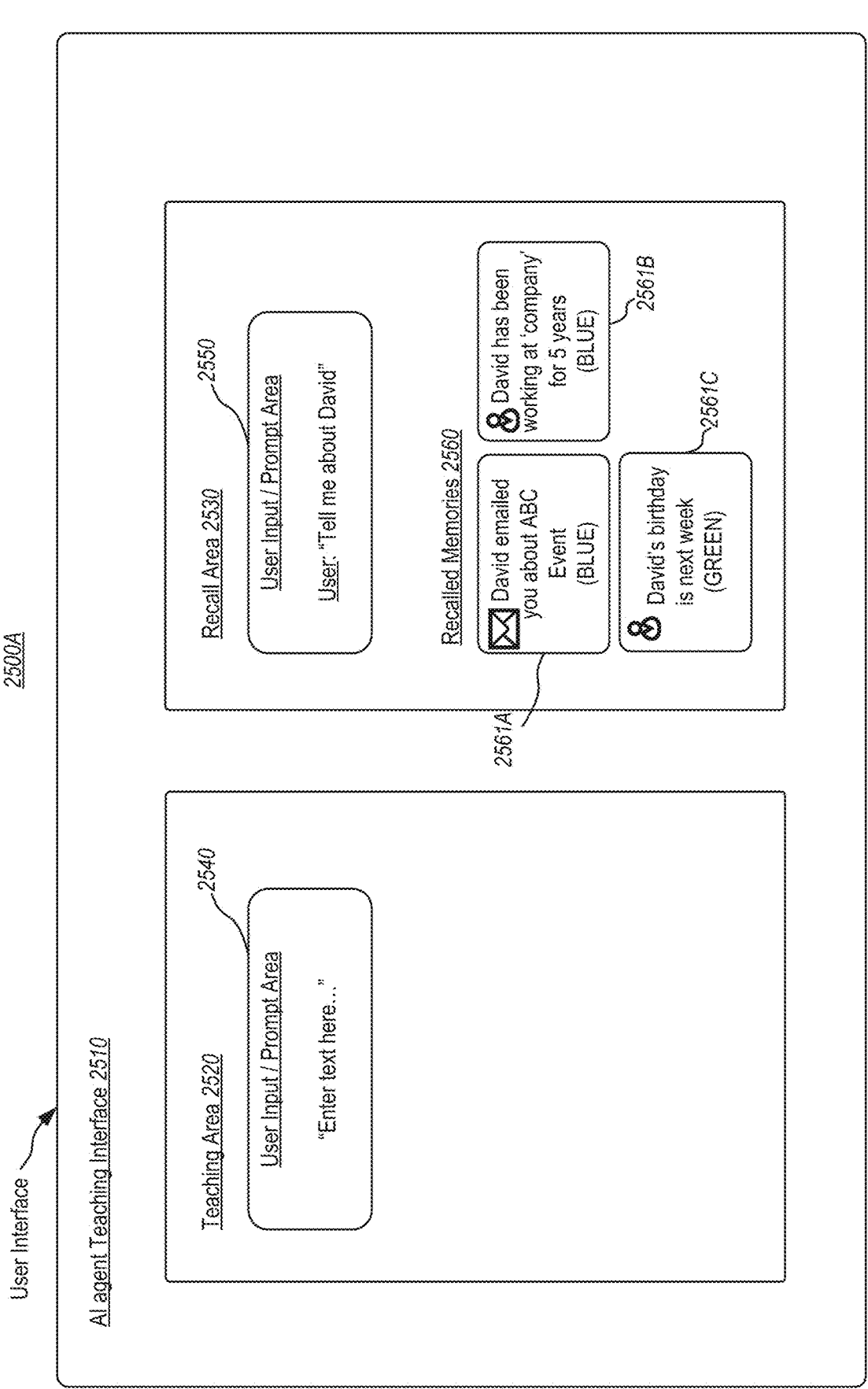
FIG. 25A illustrates an example user interface in which the user interacts with the user interface to cause AI agent to recall memories and display those memories in the form of memory visualizations, where one of the memory visualizations displayed in FIG. 25A corresponds to the memory generated in response to the email communication example of FIG. 24.

FIG. 25A illustrates a user interface 2500A which includes an AI agent Training Interface 2510. The AI agent Training Interface 2510 includes a Teaching Area 2520 and a Recall Area 730. The Teaching Area 2520 and the Recall Area 2530 include respective User Input/Prompt Areas 2540 and 2550 by which the user can interact with the AI agent by inputting text into the Prompt Areas 2540 and/or 2550. In the example shown in FIG. 25A, the user has inputted the text "Tell me about David" into the User Input/Prompt Area 2550. In response, the AI agent generates a Recalled Memories section 2560, in which memory visualizations 2561A through 2561C are presented.

Memory visualization 2561A represents a memory created in response to the email correspondences illustrated in FIG. 24. Memory visualization 2561A is presented with an envelope icon, is illustrated in blue, and reads "David emailed you about ABC event . . . ". Memory visualization 2561B corresponds to a memory related to company structure and David's relationship at the company, is presented with a generic user icon, is illustrated in blue, and reads "David has been working at 'company' for 5 years. Memory visualization 2561C represents a memory related to a document containing all of the birthdays for employees at 'company', is presented with a generic user icon, is illustrated in green, and reads "David's birthday is next week".

Accordingly, FIG. 25A and FIG. 24 together show an example in which the AI agent creates a new memory based on an email interaction, and stores that memory for later use, in which case the memory is displayed as a memory visualization for the user to interact with.

Figure 25B:
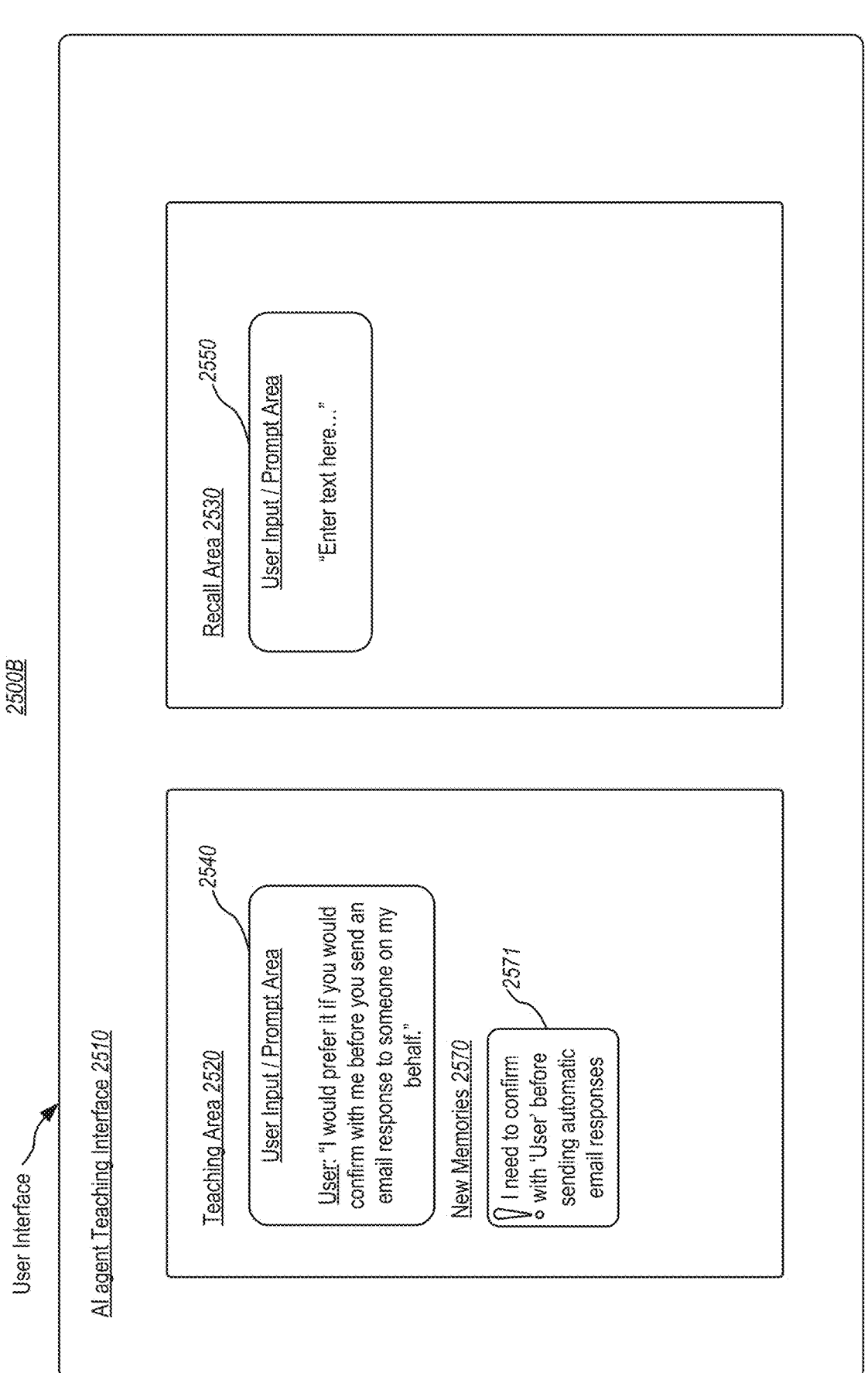
FIG. 25B illustrates an example user interface, which is similar to the user interface of FIG. 25A, but illustrates an example in which the user modifies the future behavior of AI agent(s) based on user input.

FIG. 25B illustrates an example user interface 2500B, which is similar to the user interface 2500A, but in which the user interacts with the Teaching Area 2520. In this example, suppose that, based on the interaction with the AI agent as shown in FIG. 24, the user was unpleasantly surprised that the AI agent had automatically generated and sent an email response to David. As shown in FIG. 25B, the user inputs into User Input/Prompt Area 2540 text reading "I would prefer it if you would confirm with me before you send an email response to someone on my behalf."

In response to this user input, the AI agent generates a New Memories section 2570, in which the AI agent displays a memory visualization 2571 corresponding to a newly created memory. Suppose this newly created memory is important for the AI agent to remember, and thus has high attribute weights associated with the memory. Accordingly, the memory visualization 2571 is presented with an exclamation point icon. Further, the memory visualization 2571 reads, "I need to confirm with 'User' before sending automatic email responses".

Memory visualization 2571 allows the user to easily see that the AI agent understands the user's input into the User Input/Prompt Area 2540, and gives the user higher confidence in the future behavior and performance of the AI agent.

Figure 26:
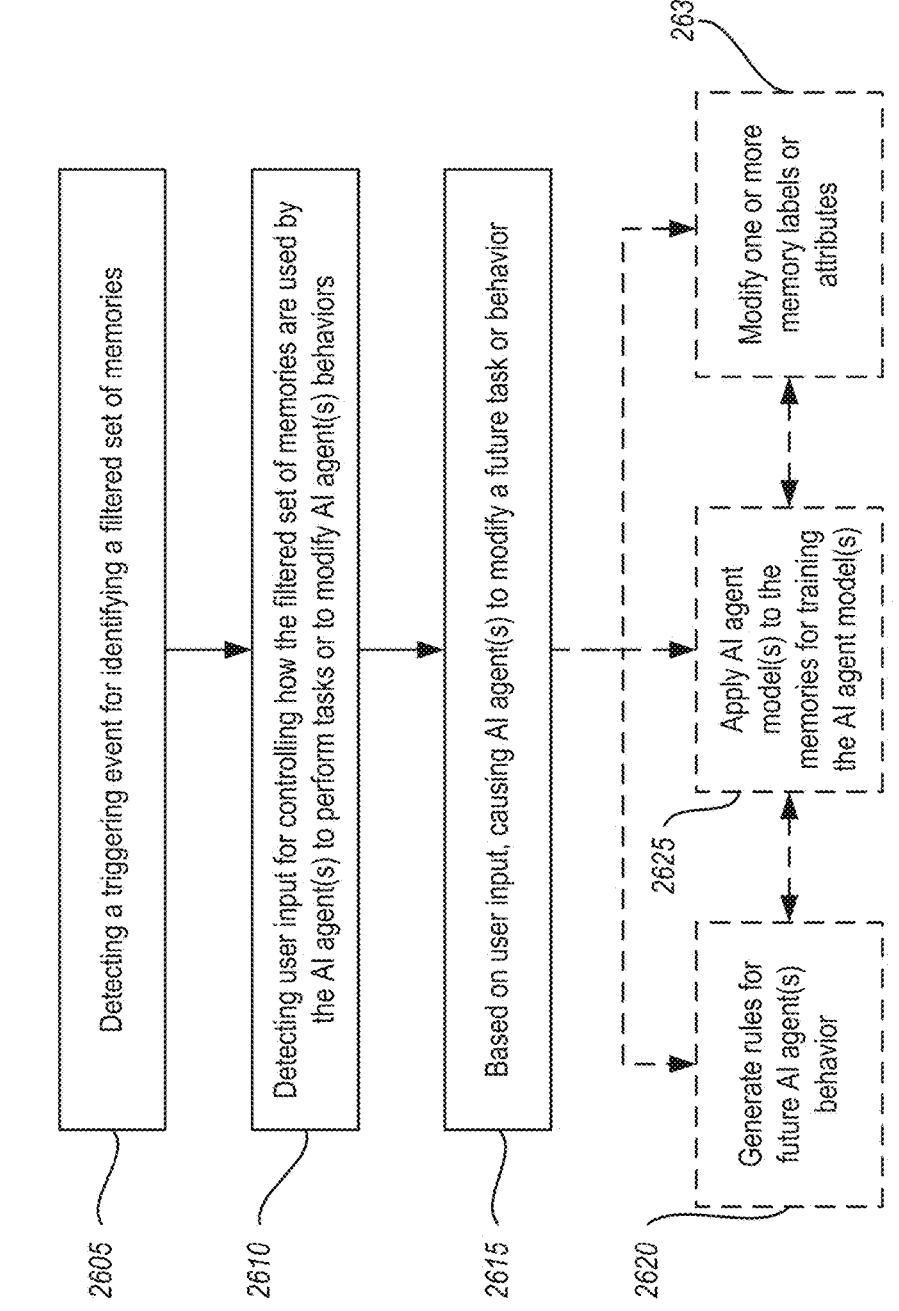
FIG. 26 illustrates a method that can be implemented by a computing system and is configured for controlling the modification of future behaviors of AI agent(s).

Example steps involved in modifying the future behavior and performance of an AI agent can be seen in the flowchart of FIG. 26.

FIG. 26 illustrates a method 2600 that can be implemented by a computing system (e.g., computing system 110) and is configured for controlling the modification of future behaviors of AI agent(s). A first illustrated act is provided for detecting a triggering event for identifying a filtered set of memories (act 2605). In some embodiments, the triggering event is a user interaction with one or more selectable controls on a user interface, or user input into a user input/prompt area on a user interface, as is the case in the example illustrated in FIG. 7B.

Upon detecting the triggering event, user input is detected for controlling how the filtered set of memories are used by the AI agent(s) to perform tasks or to modify AI agent(s) behavior (act 2610). Based on the user input detected in act 2610, the manner in which the AI agent(s) performs future tasks or the future behavior of the AI agent(s) is caused to be modified (act 2615). Take for example the embodiment illustrated in FIG. 25B. In FIG. 25B, the user gives instructions on how the user would like the AI agent to behave or perform a specific task (e.g., automatic email response) in the future, and the AI agent modifies its behavior accordingly.

After act 2615 are several optional steps that may be performed in any order with respect to each other. Based on the user input, rules for future AI agent(s) behavior may be generated (act 2620). AI agent model(s) may be applied to the memories for training the AI agent model(s) (e.g., via the AI agent Training Component and the AI agent/LLM Interface Component of the computing system 110 of FIG. 1) (act 2625). One or more memory labels, attributes, or perhaps attribute weights can be modified based on the user input (act 2630).

Accordingly, the systems and methods described herein allow for improved control over the creation, management, presentation of and user interaction with AI memory data structures for AI agent(s). The principles described herein also allow for more intuitive presentation and interaction with memory data structures (e.g., via memory visualizations) on user interfaces, such that the user can intuitively understand and modify specific memory data structures so as to train the AI agent to better perform a variety of tasks and modify the behavior of the AI agent(s) according to user preference. This also allows the user to easily resolve issues such as underfitting and overfitting of AI agent models, to better fine-tune AI agent models for future use, and to have an overall better user experience when interacting with AI agent(s).

In view of the foregoing, it will be appreciated that the embodiments disclosed herein include methods, systems and computer program products that facilitate control over the creation of, training of, management of, presentation of, user interaction with, and utilization of AI agents and AI agent data structures, such as AI agent memories.

Although the subject matter has been described in language specific to structural features and/or methodological acts, it is to be understood that the subject matter defined in the appended claims is not necessarily limited to the described features or acts described supra or the order of the acts described supra. Rather, the described features and acts are disclosed as example forms of implementing the claims.

Embodiments within the scope of the present disclosure also include physical and other computer-readable media for carrying or storing computer-executable instructions and/or data structures. Such computer-readable media can be available media that can be accessed by a general-purpose or special-purpose computer system. Computer-readable media that store computer-executable instructions are physical storage media. Computer-readable media that carry computer-executable instructions are transmission media. Thus, by way of example, embodiments of the disclosure can comprise at least two distinctly different kinds of computer-readable media: physical computer-readable storage media and transmission computer-readable media.

Embodiments within the scope of the present disclosure also include physical and other computer-readable media for carrying or storing computer-executable instructions and/or data structures. Such computer-readable media can be any available media that can be accessed by a general-purpose or special-purpose computer system. Computer-readable media that store computer-executable instructions are physical storage media. Computer-readable media that carry computer-executable instructions are transmission media. Thus, by way of example, embodiments of the disclosure can comprise at least two distinctly different kinds of computer-readable media: physical computer-readable storage media and transmission computer-readable media.

Physical computer-readable storage media includes random access memory (RAM), read-only memory (ROM), electrically erasable programmable ROM (EEPROM), compact disk ROM (CD-ROM), or other optical disk storage (such as compact disks (CDs), digital video disks (DVDs), etc.), magnetic disk storage or other magnetic storage devices, or any other hardware storage devices which can be used to store desired program code in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a transmission medium. Transmission media can include a network and/or data links that can be used to carry desired program code means in the form of computer-executable instructions or data structures and which can be accessed by a general-purpose or special-purpose computer. Combinations of the above are also included within the scope of computer-readable media.

Further, upon reaching various computer system components, program code in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a network interface card (NIC)), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAS, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present disclosure may be embodied in other specific forms without departing from its essential characteristics. The described embodiments are only illustrative and not restrictive. All changes which come within the meaning and range of equivalency of the claims are to be embraced within their scope.

When introducing elements in the appended claims, the articles "a," "an," "the," and "said" are intended to mean there are one or more of the elements. The terms "comprising," "including," and "having" are intended to be inclusive and mean that there may be additional elements other than the listed elements. Unless otherwise specified, the terms "set," "superset," and "subset" are intended to exclude an empty set, and thus "set" is defined as a non-empty set, "superset" is defined as a non-empty superset, and "subset" is defined as a non-empty subset. Unless otherwise specified, the term "subset" excludes the entirety of its superset (i.e., the superset contains at least one item not included in the subset). Unless otherwise specified, a "superset" can include at least one additional element, and a "subset" can exclude at least one element.

Numbered Clauses

The present invention can also be described in accordance with the following numbered clauses.

Clause 1. A method for managing AI (Artificial Intelligence) agent(s) interactions with electronic communications that are displayed at an electronic communications interface, the method comprising: parsing, via an AI agent, an electronic communication to determine whether the electronic communication corresponds to a new or existing request; determining, via the AI agent, in response to determining if the electronic communication corresponds to the new or the existing request, a set of actions to be performed in response to the request; causing the AI agent to determine whether any actions in the set of actions has been performed, where actions in the set of actions that have already been performed are a first group of actions; causing, when the AI agent determines that there are one or more actions in the set of actions that have not been performed, the AI agent to determine which actions in the set of actions that have not yet been performed require additional user input or authorization before the AI agent can perform the action, where actions in the set of actions that have not yet been performed but require additional user input or authorization before the AI agent can perform the action are a second group of actions, the AI agent further determining which actions in the set of actions that have not yet been performed do not require additional user input or authorization before the AI agent can perform the action, where actions in the set of actions that have not yet been performed but do not require additional user input or authorization before the AI agent can perform the action are a third group of actions; generating a notification that is displayed at the electronic communication interface, the notification identifying the set of actions with visual identifiers that visually distinguishes the set of actions, such that the first group of actions, the second group of actions and the third group of actions are visually distinguished from each other; and displaying with the notification a set of controls that include selectable controls for one or more actions in the set of actions.

Clause 2. The method according to Clause 1, where the selectable controls include controls for causing modification to one or more actions in the set of actions.

Clause 3. The method according to Clause 1, where the selectable controls include controls for authorizing the AI agent to perform one or more actions in the set of actions.

Clause 4. The method according to Clause 1, where the visual identifiers include text descriptions of one or more actions in the set of actions.

Clause 5. The method according to Clause 1, where the visual identifiers include labels for one or more of the actions in the set of actions.

Clause 6. The method according to Clause 1, where the visual identifiers include colors, such that actions in the first group of actions are displayed in a first color, actions in the second group of actions are displayed in a second color different from the first color, and actions in the third group of actions are displayed in a third color different from the first color and different from the second color.

Clause 7. The method according to Clause 1, where the electronic communication is an email communication.

Clause 8. The method according to Clause 1, where the electronic communication is a user interaction with the AI agent.

Clause 9. The method according to Clause 1, where the electronic communication is a message in a messaging application.

Clause 10. The method according to Clause 1, where the request corresponds to an instruction to the AI agent to answer a question included in the electronic communication.

Clause 11. The method according to Clause 1, where the request corresponds to an instruction to the AI agent to schedule a meeting.

Clause 12. The method according to Clause 1, where when the AI agent performs one or actions in the set of actions, the AI agent generates a report notification regarding what one or more actions the AI agent has performed and what actions remain to be performed, the report notification being displayed on the electronic communications interface.

Clause 13. The method according to Clause 12, where the report notification is displayed with selectable controls for providing user feedback to the AI agent, the selectable controls including controls for modifying the behavior or performance protocols of the AI agent in relation to the one or more actions performed by the AI agent in the report notification.

Clause 14. The method according to Clause 13, the modification of the behavior or performance protocols of the AI agent further applying to future actions similar to the one or more actions performed by the AI agent in the report notification.

Clause 15. A method for modifying an electronic communication interface to reflect AI (Artificial Intelligence) agent(s) interactions with one or more electronic communications, the method comprising: displaying, on the electronic communication interface, an electronic communication visualization representing an electronic communication that includes a new or existing request; displaying on the electronic communication interface a notification generated in response to an AI agent processing the electronic communication, the notification including identification of a set of actions to be performed in response to the request, where actions in the set of actions that have already been performed are a first group of actions, actions that have not yet been performed but require additional user input or authorization before the AI agent can perform the actions are a second group of actions, and actions that have not yet been performed but do not require additional user input or authorization before the AI agent can perform the actions are a third group of actions, where the displayed notification includes visual identifiers that visually distinguishes the first group of actions, the second group of actions and the third group of actions from each other; displaying the notification with a set of controls that include selectable controls for one or more actions in the set of actions; and detecting a user input at one of the selectable controls, which when detected, triggers an instruction to the AI agent to be generated and sent to the AI agent.

Clause 16. The method according to Clause 15, where the instruction to the AI agent is to modify the future behavior of the AI agent.

Clause 17. The method according to Clause 15, where the instruction to the AI agent is to modify one or more protocols for how to perform a task.

Clause 18. The method according to Clause 15, where the instruction to the AI agent is an authorization to perform one or more actions in the second group of actions.

Clause 19. The method according to Clause 15, where the selectable controls include controls for causing a modification to one or more actions in the set of actions.

Clause 20. The method according to Clause 15, where the selectable controls include controls for authorizing the AI agent to perform one or more actions in the set of actions.

Clause 21. A computing system comprising one or more hardware processors and one or more storage devices having stored computer-executable instructions which are executable by the one or more hardware processors for causing the computing system to perform a method of any of the preceding clauses.

What is claimed:

1. A method for managing AI (Artificial Intelligence) agent interactions with electronic communications that are displayed at an electronic communications interface, the method comprising:

parsing, via an AI agent, an electronic communication to determine whether the electronic communication corresponds to a new or existing request;

determining, via the AI agent, in response to determining if the electronic communication corresponds to the new or the existing request, a set of actions to be performed in response to the request;

causing the AI agent to determine whether any actions in the set of actions has been performed, where actions in the set of actions that have already been performed are a first group of actions;

causing, when the AI agent determines that there are one or more actions in the set of actions that have not been performed, the AI agent to determine which actions in the set of actions that have not yet been performed require additional user input or authorization before the AI agent can perform the action, where actions in the set of actions that have not yet been performed but require additional user input or authorization before the AI agent can perform the action are a second group of actions, the AI agent further determining which actions in the set of actions that have not yet been performed do not require additional user input or authorization before the AI agent can perform the action, where actions in the set of actions that have not yet been performed but do not require additional user input or authorization before the AI agent can perform the action are a third group of actions;

generating a notification that is displayed at the electronic communication interface, the notification identifying the set of actions with visual identifiers that visually distinguishes the set of actions, such that the first group of actions, the second group of actions and the third group of actions are visually distinguished from each other; and displaying with the notification a set of controls that include selectable controls for one or more actions in the set of actions.

2. The method according to claim 1, where the selectable controls include controls for causing modification to one or more actions in the set of actions.

3. The method according to claim 1, where the selectable controls include controls for authorizing the AI agent to perform one or more actions in the set of actions.

4. The method according to claim 1, where the visual identifiers include text descriptions of one or more actions in the set of actions.

5. The method according to claim 1, where the visual identifiers include labels for one or more of the actions in the set of actions.

6. The method according to claim 1, where the visual identifiers include colors, such that actions in the first group of actions are displayed in a first color, actions in the second group of actions are displayed in a second color different from the first color, and actions in the third group of actions are displayed in a third color different from the first color and different from the second color.

7. The method according to claim 1, where the electronic communication is an email communication.

8. The method according to claim 1, where the electronic communication is a user interaction with the AI agent.

9. The method according to claim 1, where the electronic communication is a message in a messaging application.

10. The method according to claim 1, where the request corresponds to an instruction to the AI agent to answer a question included in the electronic communication.

11. The method according to claim 1, where the request corresponds to an instruction to the AI agent to schedule a meeting.

12. The method according to claim 1, where when the AI agent performs one or actions in the set of actions, the AI agent generates a report notification regarding what one or more actions the AI agent has performed and what actions remain to be performed, the report notification being displayed on the electronic communications interface.

13. The method according to claim 12, where the report notification is displayed with selectable controls for providing user feedback to the AI agent, the selectable controls including controls for modifying the behavior or performance protocols of the AI agent in relation to the one or more actions performed by the AI agent in the report notification.

14. The method according to claim 13, the modification of the behavior or performance protocols of the AI agent further applying to future actions similar to the one or more actions performed by the AI agent in the report notification.

15. A method for modifying an electronic communication interface to reflect AI (Artificial Intelligence) agent interactions with one or more electronic communications, the method comprising:

displaying, on the electronic communication interface, an electronic communication visualization representing an electronic communication that includes a new or existing request;

displaying on the electronic communication interface a notification generated in response to an AI agent processing the electronic communication, the notification including identification of a set of actions to be performed in response to the request, where actions in the set of actions that have already been performed are a first group of actions, actions that have not yet been performed but require additional user input or authorization before the AI agent can perform the actions are a second group of actions, and actions that have not yet been performed but do not require additional user input or authorization before the AI agent can perform the actions are a third group of actions, where the displayed notification includes visual identifiers that visually distinguishes the first group of actions, the second group of actions and the third group of actions from each other;

displaying the notification with a set of controls that include selectable controls for one or more actions in the set of actions; and detecting a user input at one of the selectable controls, which when detected, triggers an instruction to the AI agent to be generated and sent to the AI agent.

16. The method according to claim 15, where the instruction to the AI agent is to modify the future behavior of the AI agent.

17. The method according to claim 15, where the instruction to the AI agent is to modify one or more protocols for how to perform a task.

18. The method according to claim 15, where the instruction to the AI agent is an authorization to perform one or more actions in the second group of actions.

19. The method according to claim 15, where the selectable controls include controls for causing a modification to one or more actions in the set of actions.

20. The method according to claim 15, where the selectable controls include controls for authorizing the AI agent to perform one or more actions in the set of actions.

\* \* \* \* \*